United States Patent
Babaei et al.

(10) Patent No.: US 10,887,903 B2
(45) Date of Patent: Jan. 5, 2021

(54) WIRELESS DEVICE PROCESSES WITH BANDWIDTH PART SWITCHING

(71) Applicants: Alireza Babaei, Fairfax, VA (US); Esmael Dinan, McLean, VA (US); Hua Zhou, Herndon, VA (US); Hyoungsuk Jeon, Centreville, VA (US); Kyungmin Park, Herndon, VA (US); Ali Cirik, Herndon, VA (US)

(72) Inventors: Alireza Babaei, Fairfax, VA (US); Esmael Dinan, McLean, VA (US); Hua Zhou, Herndon, VA (US); Hyoungsuk Jeon, Centreville, VA (US); Kyungmin Park, Herndon, VA (US); Ali Cirik, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 106 days.

(21) Appl. No.: 16/171,448

(22) Filed: Oct. 26, 2018

(65) Prior Publication Data
US 2019/0132857 A1 May 2, 2019

Related U.S. Application Data

(60) Provisional application No. 62/577,833, filed on Oct. 27, 2017, provisional application No. 62/577,382, filed on Oct. 26, 2017.

(51) Int. Cl.
*H04W 72/12* (2009.01)
*H04W 72/04* (2009.01)
(Continued)

(52) U.S. Cl.
CPC ..... *H04W 72/1273* (2013.01); *H04W 72/042* (2013.01); *H04W 72/0453* (2013.01);
(Continued)

(58) Field of Classification Search
None
See application file for complete search history.

(56) References Cited

U.S. PATENT DOCUMENTS

| 2012/0281566 A1* | 11/2012 | Pelletier | H04W 72/1221 370/252 |
| 2013/0190028 A1* | 7/2013 | Wang | H04W 16/14 455/509 |

(Continued)

OTHER PUBLICATIONS

R2-1711087; 3GPP TSG-RAN WG2 Meeting #99bisR2-1711087 Prague, Czech Republic, Oct. 9-13, 2017(Revision of R2-1709328); ; Agenda Item:10.3.1.5; Source: ASUSTeK; Title:C.
(Continued)

*Primary Examiner* — Xavier S Wong
(74) *Attorney, Agent, or Firm* — David Grossman; Kavon Nasabzadeh; Philip Smith

(57) ABSTRACT

A wireless device may receive at least one message comprising: first configuration parameters of a first bandwidth part, and second configuration parameters of a second bandwidth part. The second configuration parameters may comprise a scheduling request configuration indicating scheduling request resources for a logical channel. A scheduling request may be triggered in response to data becoming available for the logical channel. A random access process may be started in response to a valid scheduling request resource for the logical channel not being available on the first bandwidth part. A downlink control information may be received. The downlink control information may indicate switching from the first bandwidth part to the second bandwidth part. In response to the scheduling request resources being available on the second bandwidth part: the random access process may be cancelled, and a scheduling request signal may be transmitted via the scheduling request resources.

20 Claims, 22 Drawing Sheets

(51) Int. Cl.
 H04W 74/08 (2009.01)
 H04W 72/14 (2009.01)
 H04L 1/18 (2006.01)
(52) U.S. Cl.
 CPC ....... H04W 72/1252 (2013.01); *H04L 1/1812* (2013.01); *H04W 72/1284* (2013.01); *H04W 72/14* (2013.01); *H04W 74/0833* (2013.01)

(56) References Cited

U.S. PATENT DOCUMENTS

| | | | | |
|---|---|---|---|---|
| 2018/0324867 | A1* | 11/2018 | Basu Mallick ... | H04W 74/0833 |
| 2019/0075579 | A1* | 3/2019 | Wang ................ | H04W 72/1242 |
| 2019/0090299 | A1* | 3/2019 | Ang ...................... | H04L 5/0053 |
| 2019/0098540 | A1* | 3/2019 | Lee .................... | H04W 36/0077 |
| 2019/0098655 | A1* | 3/2019 | Shih .................... | H04B 7/0617 |
| 2019/0254074 | A1* | 8/2019 | Jeon ................... | H04W 56/001 |

OTHER PUBLICATIONS

R2-1711178—Remaining issues for Scheduling Request; 3GPP TSG-RAN WG2 #99bisTdoc R2-1711178 Prague, Czech Republic, Oct. 9-13, 2017; ; Agenda Item:10.3.1.5; Source:Er.
R2-1711179—SR failure handling for multiple pending SRs; 3GPP TSG-RAN WG2 #99bisTdoc R2-1711179 Prague, Czech Republic, Oct. 9-13, 2017Update of R2-1708197; ; Agenda.
R2-1711296 Scheduling Request Enhancement for Latency Reduction; 3GPP TSG-RAN WG2#99bisR2-1711296 Prague, Czech Republic, Oct. 9-13, 2017; ; Agenda item:10.3.1.5; Source:Spread.
R2-1711303 SR design supporting multiple configurations; 3GPP TSG-RAN WG2 Meeting #99bisR2-1711303 Prague, Czech Republic, Oct. 9-13, 2017; ; Agenda Item:10.3.1.5; So.
R2-1711696 SR procedures with multiple SR configurations; 3GPP TSG-RAN WG2 Meeting RAN2 #99R2-1711696 Prague, Czech Republic, Oct. 9-13, 2017; ; Agenda item:10.3.1.5.
R2-1711729 Multiple SR; 3GPP TSG-RAN WG2 Meeting #99bisR2-1711729 Prague, Czech Republic, Oct. 9-13, 2017in revision of R2-1709151; ; ; Agenda Item: 10.3.1.5 (NR_newRA.
R2-1711764; 3GPP TSG-RAN WG2 Meeting #99bis; Prague, Czech Republic, Oct. 9-13, 2017; ; Agenda Item:10.3.1.5; Source: ITRI; Title:Discussion on SR configuration mappi.
R2-1711765_Discussion on SR procedure; 3GPP TSG-RAN WG2 Meeting #99bisR2-1711765 Prague, Czech Republic, Oct. 9-13, 2017; ; Agenda item:10.3.1.5; Source:ITRI; Title:Di.
R2-1711864; Agreements on SR design for NR and outstanding issues, Date: Oct. 13, 2017.
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA);; Physical channels and modulation.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures; (Release 14).
3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.
3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.211 V0.2.0 (Aug. 2017); Technical Specification; 3rd Generation Partnership Project; Technical Specification Group Radio Access Network; NR; Physical channels and modulation; (Release 15).
3GPP TS 38.212 V0.1.0 (Aug. 2017); Technical Specification; 3rd Generation Partnership Project; Technical Specification Group Radio Access Network; NR; Multiplexing and channel coding; (Release 15).
3GPP TS 38.214 V0.1.0 (Aug. 2017); Technical Specification; 3rd Generation Partnership Project; Technical Specification Group Radio Access Network; NR;Physical layer procedures for data (Release 15).
3GPP TS 38.321 V1.0.0 (Sep. 2017); Technical Specification; 3rd Generation Partnership Project; Technical Specification Group Radio Access Network; NR; Medium Access Control (MAC) protocol specification; (Release 15).
R1-1717077; 3GPP TSG RAN WG1 Meeting #90bisR1-1717077 Prague, Czech Republic, Oct. 9-13, 2017; ; Agenda Item:7.3.4.1; Source:Huawei, HiSilicon; Title:Remaining issues on bandwidth part.
R1-1717400; 3GPP TSG RAN WG1 Meeting 90bis ; Prague, CZ, Oct. 9-13, 2017 ; ; Agenda Item:7.3.4.1; Source: Intel Corporation; Title:Remaining details for bandwidth par.
R1-1717504_Remaining details for bandwidth part operation; 3GPP TSG RAN WG1 Meeting 90bisR1-1717504 Prague, CZ, Oct. 9-13, 2017; ; Source:vivo; Title:Remaining details for bandwidth part operation; Agenda Item:7.3.4.1.
R1-1717675 On Bandwidth part operation; 3GPP TSG RAN WG1 NR 90bisR1-1717675 Prague, Czech Republic, Oct. 9-13, 2017; Agenda item:7.3.4.1; Source:Samsung; Title:On Bandwidth Part Operation; Document for:Discussion and decision.
R1-1717839 Remaining aspects of BWP operation; 3GPP TSG RAN WG1 Meeting #90bisR1-1717839 Prague, Czechia, Oct. 9-13, 2017; ; Source:CATT; Title:Remaining aspects of BWP operation; Agenda Item:7.3.4.1.
R1-1717972 Remaining issues on bandwidth parts_final; 3GPP TSG RAN WG1 Meeting 90bis; R1-1717972 Prague, CZ, Oct. 9-13, 2017; Agenda item: 7.3.4.1; Source: LG Electronics; Title: Remaining issues on bandwidth parts; Document for: Discussion and decision.
R1-1718050; 3GPP TSG RAN WG1 Meeting 90bisR1-1718050 Prague, CZ, Oct. 9-13, 2017; ; Source:OPPO; Title:Remaining issues on bandwidth part configuration and activation; Agenda Item:7.3.4.
R1-1718223 BW parts for NR; 3GPP TSG RAN WG1 Meeting 90bis R1-1718223 Prague, CZ, Oct. 9-13, 2017; ; Source:NTT DOCOMO, Inc.; Title:Remaing issues on bandwidth parts for NR; Agenda Item:7.3.4.
R1-1718327_remaining details on bandwidth part operation in NR; 3GPP TSG RAN WG1 Meeting 90bisR1-1718327 Prague, CZ, Oct. 9-13, 2017; Agenda Item: 7.3.4.1; Source: MediaTek Inc.; Title: Remaining Details on Bandwidth Part Operation in NR; Document for: Discussion.
R1-1718365 (R15 NR WI AI 7341 BW Adaptation); 3GPP TSG RAN WG1 Meeting AH_NR#3R1-1718365 Prague, CZ, Oct. 9-13, 2017(R1-1716258); ; ; Agenda Item:7.3.4.1; Source:InterDigital, Inc.
R1-1718404 ATT BWP; 3GPP TSG RAN WG1 Meeting 90bis R1-1718404 Prague, CZ, Oct. 9-13, 2017; ; Agenda Item:7.3.4.1; Source:AT&T Title:Remaining details for bandwidth part.
R1-1718523 On bandwidth parties; 3GPP TSG-RAN WG1 90bisR1-1718523 Prague, Czech Republic, Oct. 9-13, 2017; ; Source:Ericsson; Title:On bandwidth parties; Agenda Item:7.3.
R1-1718580 Open Issues on BWP; 3GPP TSG RAN WG1 #90bisR1-1718580 Prague, Czech Republic, Oct. 9-13, 2017; ; Agenda item:7.3.4.1; Source: Qualcomm Incorporated; Title: Open Issues on BW.
R1-1718607 On remaining aspects ofBWPs; 3GPP TSG-RAN WG1 Meeting #90bis R1-1718607 Prague, CZ, Oct. 9-13, 2017; Source:Nokia, Nokia Shanghai Bell; Title: On remaining aspects of BWPs; Agenda item:7.3.4.1.; Document for:Discussion and Decision.

(56) References Cited

OTHER PUBLICATIONS

R1-1718765; 3GPP TSG-RAN WG1 Meeting 90bisR1-1718765 Prague, CZ, Oct. 9-13, 2017; ; Source:Panasonic; Title: Discussion on relation between (group) common contol channels and DL BWP; Agenda Item:7.3.4.1.
R1-1718901_summary of BWP operation_r3; 3GPP TSG RAN WG1 Meeting 90bisR1-1718901 Prague, CZ, Oct. 9-13, 2017; Agenda Item: 7.3.4.1; Source: MediaTek Inc.; Title: Summary of Bandwidth Part Operation; Document for: Discussion.
R2-1707748 38300-060; 3GPP TS 38.300 V0.6.0 (Aug. 2017) Technical Specification; 3rd Generation Partnership Project;; Technical Specification Group Radio Access Network;; NR; NR and NG-RAN Overall Description;; Stage.
R2-1708468 38331-005; 3GPP TS 38.331 V0.0.5 (Aug. 2017) Technical Specification; 3rd Generation Partnership Project;; Technical Specification Group Radio Access Network;; NR;; Radio Resource Control (RRC).
R2-1710108 Remaining issues on SR configuration; 3GPP TSG-RAN2 Meeting #99bisR2-1710108 Prague, Czech Republic, Oct. 9-13, 2017; Agenda Item:10.3.1.5; Source: Huawei, HiSilicon; Title: Remaining issues on SR configuration; Document for:Discussion and decision.
R2-1710109 SR procedure in NR; 3GPP TSG-RAN2 Meeting #99bisR2-1710109 Prague, Czech Republic, Oct. 9-13, 2017Revision of R2-1708266; ; Agenda item:10.3.1.5; Source: Huawei, HiSilicon; Title: SR procedure in NR.
R2-1710110 SR Failure Handling; 3GPP TSG-RAN2 Meeting #99bisR2-1710110 Prague, Czech Republic, Oct. 9-13, 2017; Agenda Item:10.3.1.5; Source: Huawei, HiSilicon; Title: SR failure handling in NR; Document for:Discussion and decisio.
R2-1710111 SR configuration and transmission for CA case in NR; 3GPP TSG-RAN2 Meeting #99bisR2-1710111 Prague, Czech Republic, Oct. 9-13, 2017; Agenda Item:10.3.1.5; Source: Huawei, HiSilicon; Title: SR configuration and transmission for CA case in NR; Document for:Discussion and decision.
R2-1710128—Details of SR procedure; 3GPP TSG RAN WG2 #99-BisR2-1710128 Prague, Czech Republic, Oct. 9-13, 2017revision of R2-1707736; ; Agenda Item:10.3.1.5; Source:OPPO; Title:Details of SR procedure.
R2-1710129—SR configuration in CA case; 3GPP TSG RAN WG2 #99-Bis R2-1710129 Prague, Czech Republic, Oct. 9-13, 2017; ; Agenda Item:10.3.1.5; Source:OPPO; Title:SR configuration in CA case.
R2-1710130—SR configuration for BWP; 3GPP TSG RAN WG2 #99-Bis R2-1710130 Prague, Czech Republic, Oct. 9-13, 2017; ; Agenda Item:10.3.1.5; Source:OPPO; Title:SR configuration for BWP.
R2-1710295; 3GPP TSG-RAN WG2 #99bis Prague, Czech Republic, Oct. 9-13, 2017 ; ; Source:CATT ; Title:Further details on the SR procedure; Agenda Item:10.3.1.
R2-1710296; 3GPP TSG-RAN WG2 #99bis Prague, Czech Republic, Oct. 9-13, 2017 ; ; Source:CATT ; Title:SR configuration, mapping and transmission for CA and BWPs cases; Agenda Item:10. 3.1.5.
R2-1710319 Consideration on the SR in NR; 3GPP TSG-RAN WG2 Meeting#99bisR2-1710319 Prague, Czech Republic, Oct. 9-13, 2017 ; ; ; Agenda item:10.3.1.5 ; Source:ZTE.
R2-1710336 Text Proposal for TS 38.321 covering SR operation in NR; 3GPP TSG-RAN WG2 #99-BisR2-1710336 Prague, Czech Republic, Oct. 9-13, 2017 (revision of R2-1709683); ; Agenda item:10.3.1.5; Source: Samsung Electronics R&D Institute UK; Title: Text Proposal for TS 38321 covering SR operation in NR.
R2-1710337 Handling absence of SR resource in NR; 3GPP TSG-RAN WG2 #99-BisR2-1710337 Prague, Czech Republic, Oct. 9-13, 2017revision of R2-1708006; ; Agenda item:10.3.1.5; Source: Samsung Electronics R&D Institute UK; Title: Handling absence of SR resource in NR.
R2-1710339 Behaviour in case of multiple SR triggers and collision resolution; 3GPP TSG-RAN WG2 #99-BisR2-1710339 Prague, Czech Republic, Oct. 9-13, 2017 (revision of R2-1709466); ; Agenda item:10.3.1.5; Source: Samsung Electronics R&D Institute UK; Title: Behaviour in case of multiple SR triggers and collision resolutio.
R2-1710341 on LCH-to-SR-configuration mapping within the multi-BWP framework; 3GPP TSG-RAN WG2 #99-BisR2-1710341 Prague, Czech Republic, Oct. 9-13, 2017 ; ; Agenda item:10.3.1.5; Source: Samsung Electronics R&D Institute UK; Title: On LCH-to-SR-configuration mapping within the multi-BWP framework.
R2-1710358 SR procedure with multiple SR configurations; 3GPP TSG-RAN WG2 Meeting #99bisR2-1710358 Prague, Czech Republic, Oct. 9-13, 2017Revision of R2-1708865; Agenda Item:10.3.1.5; Source: Fujitsu; Title:SR procedure with multiple SR configurations ; Document for:Decisi.
R2-1710605 SR; 3GPP TSG RAN WG2 Meeting #99bisR2-1710605 Prague, Czech Republic, Oct. 9-13, 2017 Revision R2-1708789; ; Agenda item:10.3.1.5 ; Source:Intel Corporation; Title:Handling of multiple SR configuratio.
R2-1710658 (R15 NR WI AI10315 SR Configurations); 3GPP TSG-RAN WG2 #99bisR2-1710658 Prague, Czech Republic, Oct. 9-13, 2017; Agenda Item:10.3.1.5; Source:InterDigital Inc.; Title:Multiple SR Configurations in NR; Document for:Discussion, Decisio.
R2-1710817 SR procedure for NR; 3GPP TSG-RAN WG2 #99bisR2-1710817 Prague, Czech Republic, Oct. 9-13, 2017Update of R2-1708766; ; ; Agenda item:10.3.1.5; Source:Nokia, Nokia Shanghai B.
R2-1710824 Discussion on SR_Counter; 3GPP TSG RAN WG2 #99-Bis R2-1710824 Prague, Czech, Oct. 9-13, 2017; ; Agenda Item:10.3.1.5; Source:Potevio; Title:Discussion on SR_Counter.
R2-1710868; 3GPP TSG-RAN WG2 #99bis R2-1710868 Prague, Czech Republic, Oct. 9-13, 2017 (Resubmission of R2-1709419); ; Agenda Item: 10.3.1.5; Title:Discussion on details of SR procedures; Source: HT.
R2-1710971_Discussion on the SR configurations for CA case; 3GPP TSG-RAN WG2 Meeting #99bisR2-1710971 Prague, Czech Republic, Oct. 9-13, 2017 ; ; Source:vivo; Title:Discussion on the SR configurations for CA case; Agenda Item:10.3.1.
R2-1710974_Discussion on the SR cancellation and failure handling; 3GPP TSG-RAN WG2 Meeting #99bisR2-1710974 Prague, Czech Republic, Oct. 9-13, 2017 ; ; Source:vivo; Title:Discussion on the SR cancellation and failure handling; Agenda Item:10.3.1.5.

* cited by examiner

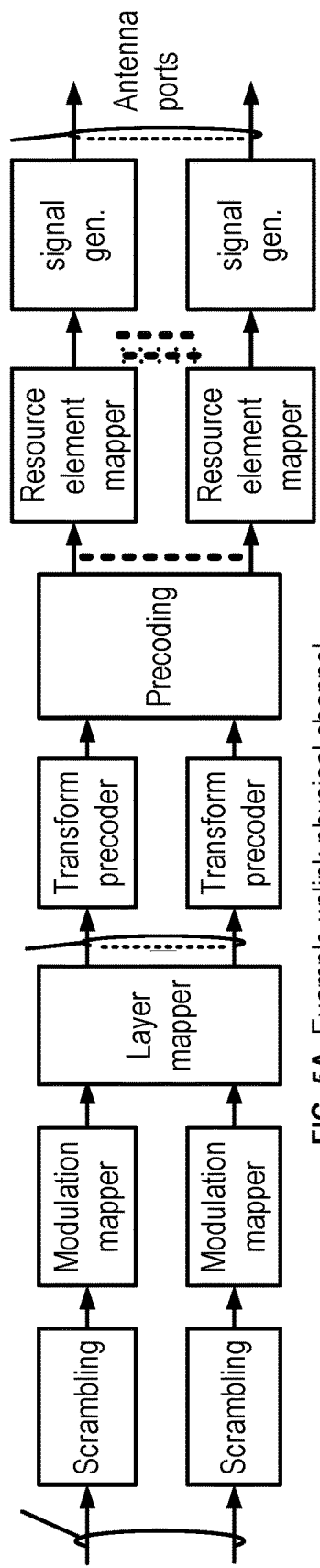
FIG. 5A Example uplink physical channel
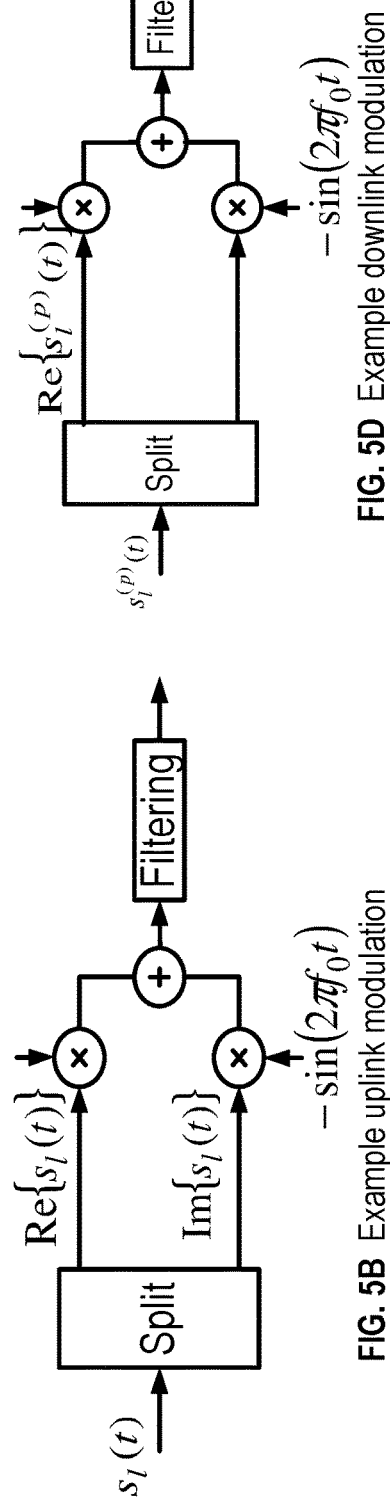
FIG. 5B Example uplink modulation
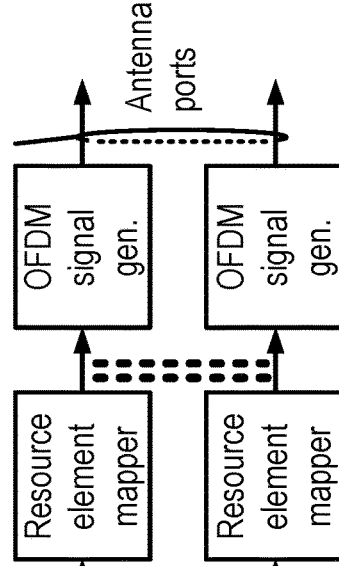
FIG. 5D Example downlink modulation
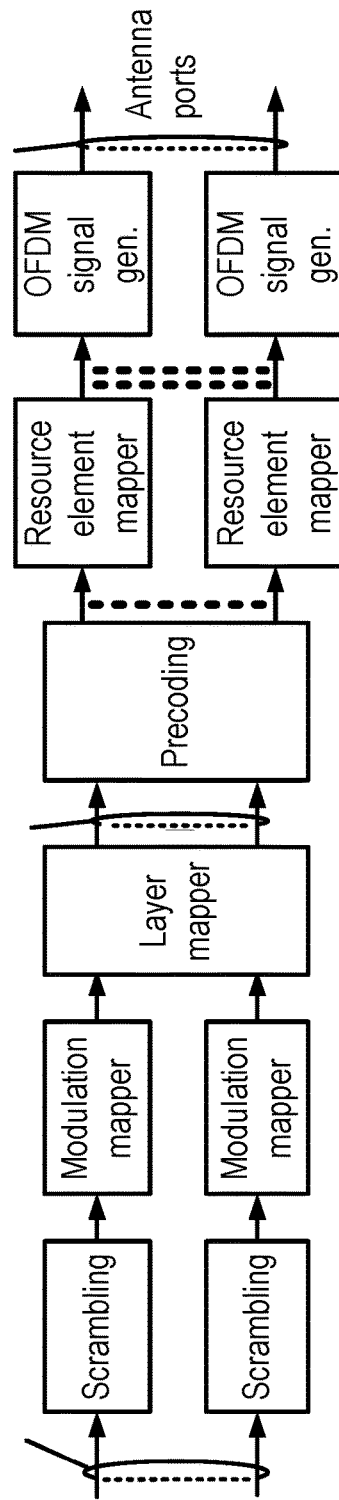
FIG. 5C Example downlink physical channel FIG. 7  Dual-Connectivity- two MAC entities at UE side gNB connected to NGC eLTE eNB connected to NGC

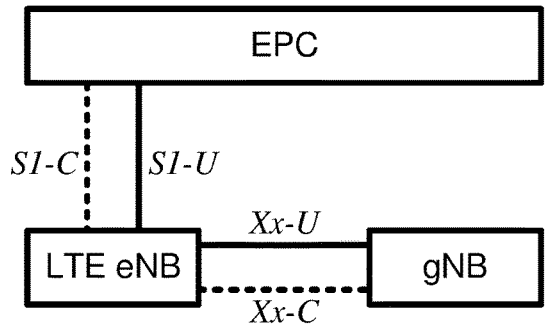

LTE eNB connected to EPC with non-standalone gNB. gNB user plane connected to EPC via LTE eNB.

FIG. 11A

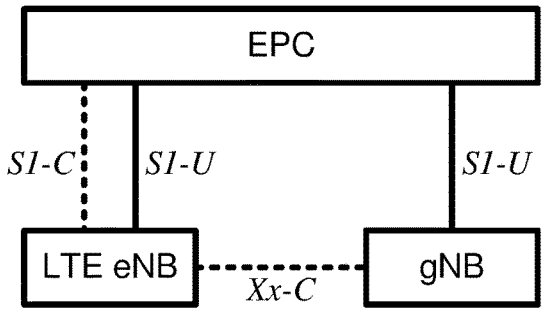

LTE eNB connected to EPC with non-standalone gNB. gNB user plane connected to EPC directly.

FIG. 11B

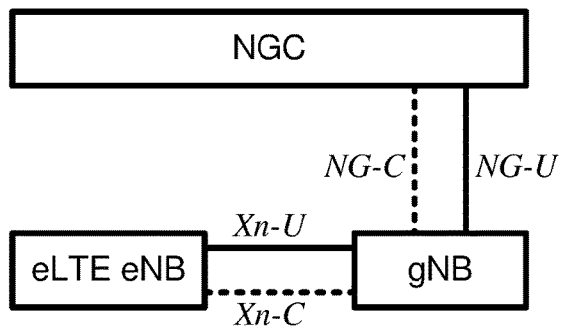

gNB connected to NGC with non-standalone eLTE eNB. eLTE eNB user plane connected to NGC via gNB.

FIG. 11C

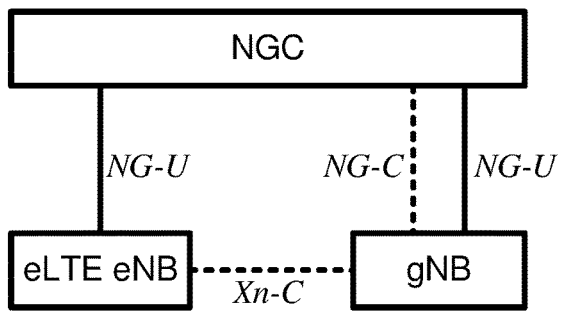

gNB connected to NGC with non-standalone eLTE eNB. eLTE eNB user plane connected to NGC directly.

FIG. 11D

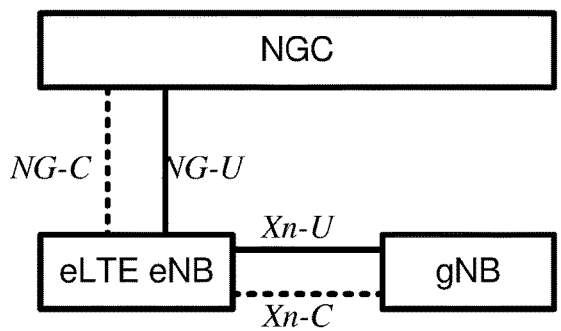

eLTE eNB connected to NGC with non-standalone gNB. gNB user plane connected to NGC via eLTE eNB.

FIG. 11E

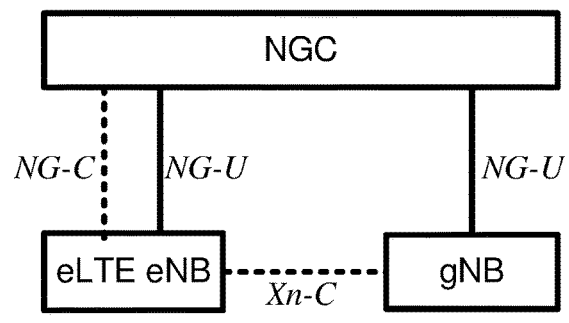

eLTE eNB connected to NGC with non-standalone gNB. gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

```
┌─────────────────────────────────────────────────────────────┐
│ Receive, by a wireless device, configuration parameters of: a 1st │
│   bandwidth part corresponding to a 1st numerology; a 2nd    │
│     bandwidth part corresponding to a 2nd numerology; and    │
│              one or more logical channels                    │
│                         2210                                 │
└─────────────────────────────────────────────────────────────┘
                              │
                              ▼
┌─────────────────────────────────────────────────────────────┐
│ Receive a 1st downlink control information indicating an uplink │
│ grant for transmission of a transport block via the 1st bandwidth │
│   part, where the transport block comprises data from logical │
│                        channel(s)                            │
│                          2220                                │
└─────────────────────────────────────────────────────────────┘
                              │
                              ▼
┌─────────────────────────────────────────────────────────────┐
│ Receive a 2nd downlink control information indicating switching │
│     from the 1st bandwidth part to the 2nd bandwidth part    │
│                          2230                                │
└─────────────────────────────────────────────────────────────┘
                              │
                              ▼
┌─────────────────────────────────────────────────────────────┐
│ flush a buffer associated with the transport block in response to: │
│        receiving the 2nd downlink control information; and   │
│ at least one of the logical channel(s) cannot be transmitted via a │
│    transmission duration corresponding to the 2nd numerology │
│                          2240                                │
└─────────────────────────────────────────────────────────────┘
```

FIG. 22

WIRELESS DEVICE PROCESSES WITH BANDWIDTH PART SWITCHING

This application claims the benefit of U.S. Provisional Application No. 62/577,382, filed Oct. 26, 2017, and U.S. Provisional Application No. 62/577,833, filed Oct. 27, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 22 is a flow diagram of an aspect of an embodiment of the present disclosure.

DETAILED DESCRIPTION OF EMBODIMENTS

Figure 1:
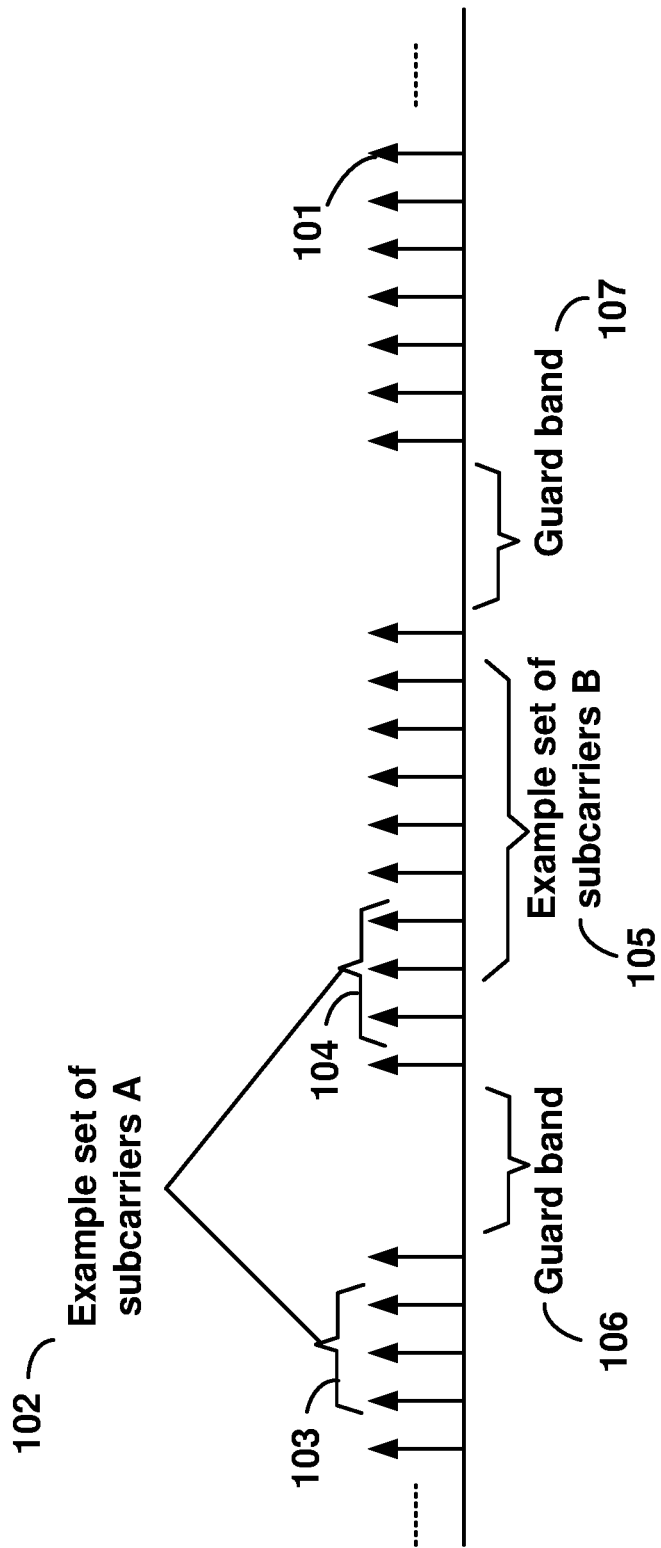
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to scheduling request and HARQ buffer management in a multicarrier communication systems.

The following Acronyms are used throughout the present disclosure:

| Acronym | Definition |
| --- | --- |
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| CP | cyclic prefix |
| DL | downlink |
| DCI | downlink control information |
| DC | dual connectivity |
| eMBB | enhanced mobile broadband |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| mMTC | massive machine type communications |
| NAS | non-access stratum |
| NR | new radio |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | resource block groups |
| RLC | radio link control |
| RRC | radio resource control |
| RA | random access |
| RB | resource blocks |

| | |
|---|---|
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TTI | transmission time intervalTB transport block |
| UL | uplink |
| UE | user equipment |
| URLLC | ultra-reliable low-latency communications |
| VHDL | VHSIC hardware description language |
| CU | central unit |
| DU | distributed unit |
| Fs-C | Fs-control plane |
| Fs-U | Fs-user plane |
| gNB | next generation node B |
| NGC | next generation core |
| NG CP | next generation control plane core |
| NG-C | NG-control plane |
| NG-U | NG-user plane |
| NR | new radio |
| NR MAC | new radio MAC |
| NR PHY | new radio physical |
| NR PDCP | new radio PDCP |
| NR RLC | new radio RLC |
| NR RRC | new radio RRC |
| NSSAI | network slice selection assistance information |
| PLMN | public land mobile network |
| UPGW | user plane gateway |
| Xn-C | Xn-control plane |
| Xn-U | Xn-user plane |
| Xx-C | Xx-control plane |
| Xx-U | Xx-user plane |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
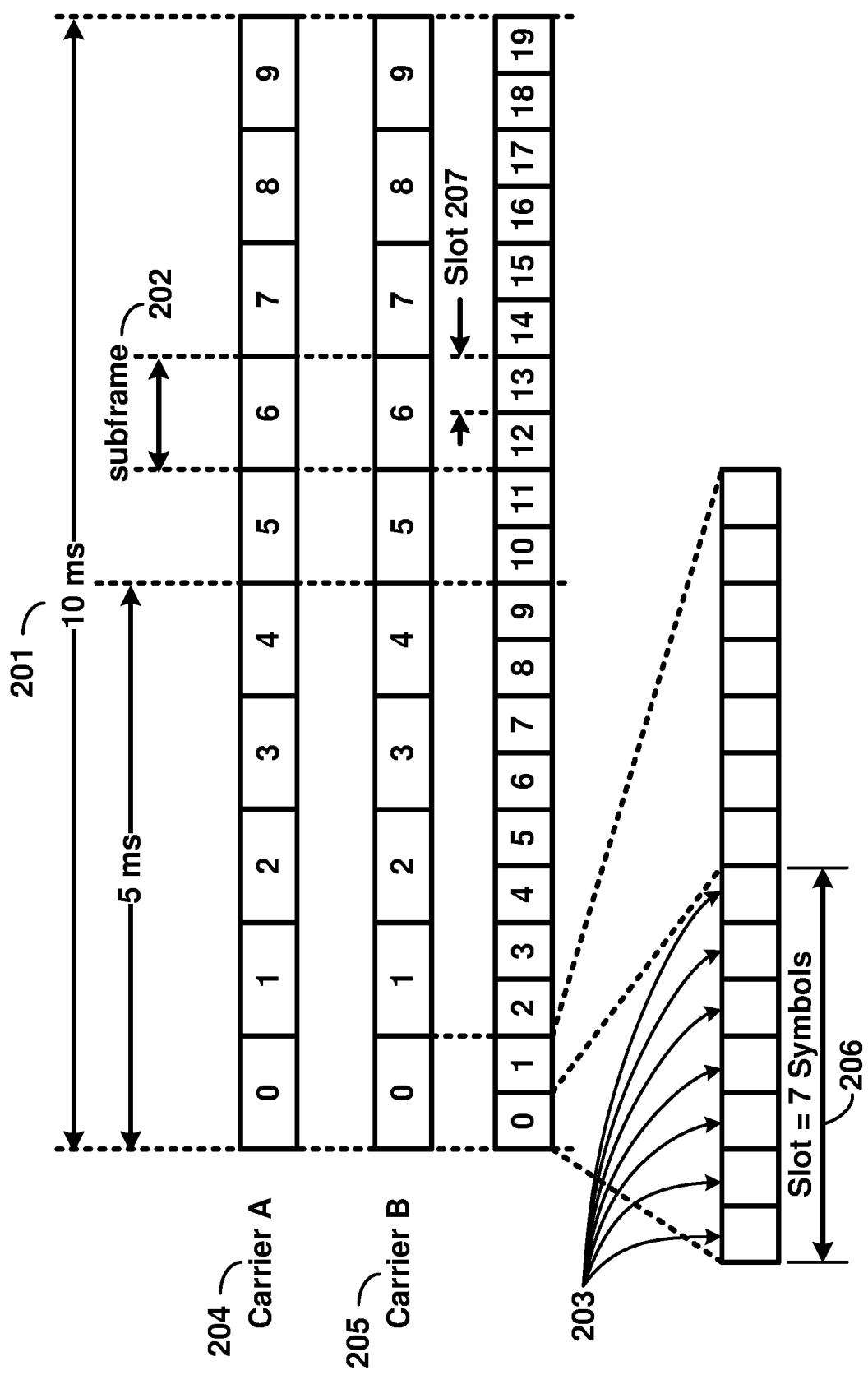
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
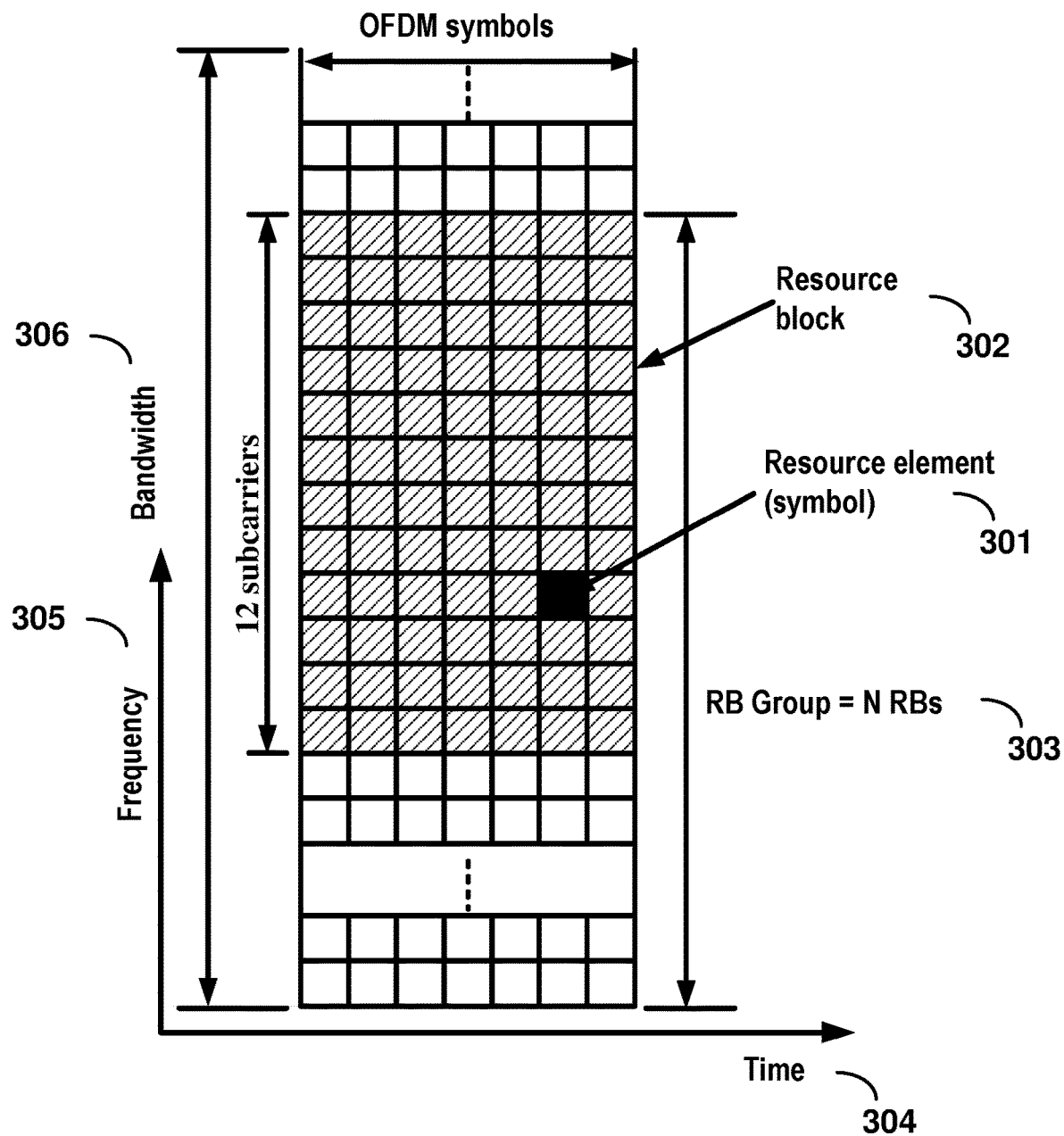
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
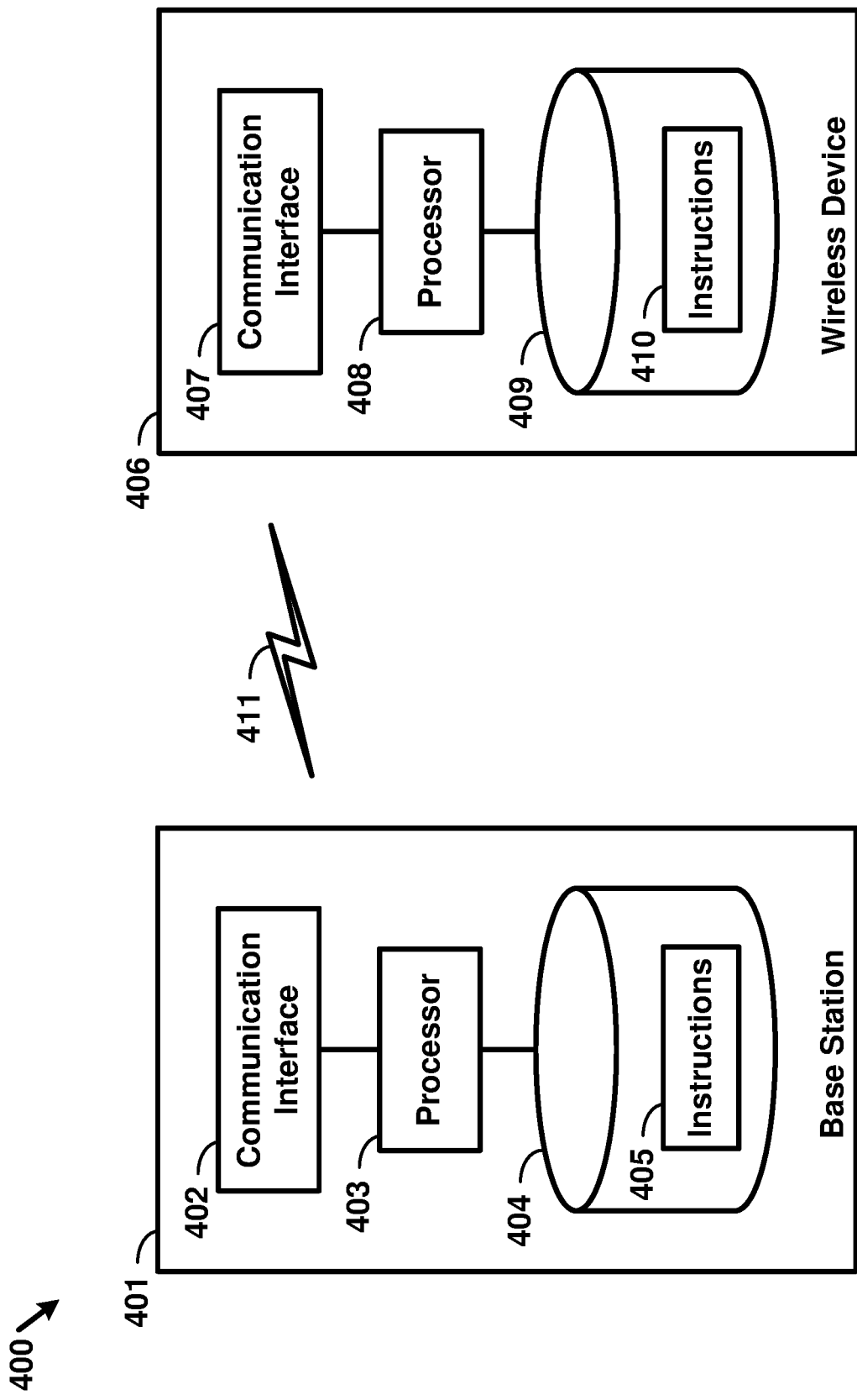
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
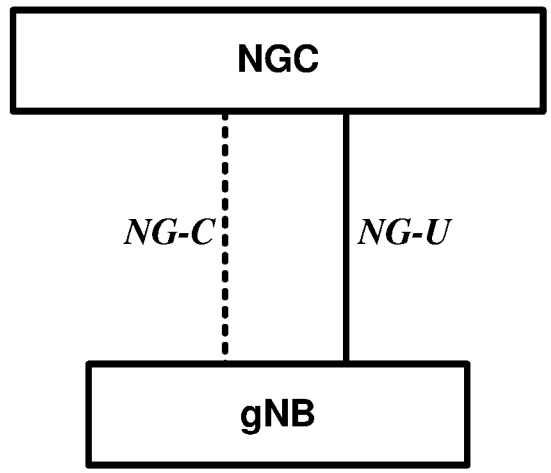
FIG. 10A and FIG. 10B are example diagrams for interfaces between a 5G core network (e.g. NGC) and base stations (e.g. gNB and eLTE eNB) as per an aspect of an embodiment of the present invention.
Figure 10B:
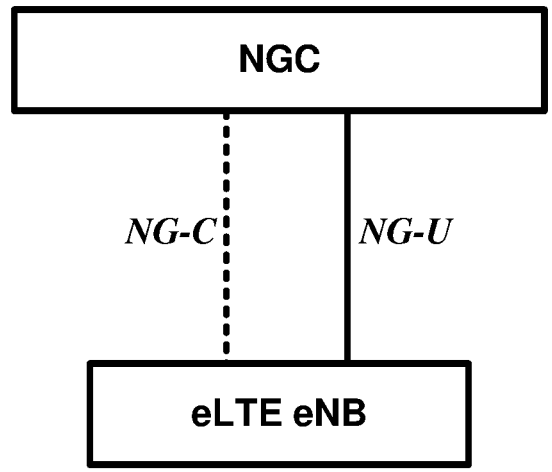

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
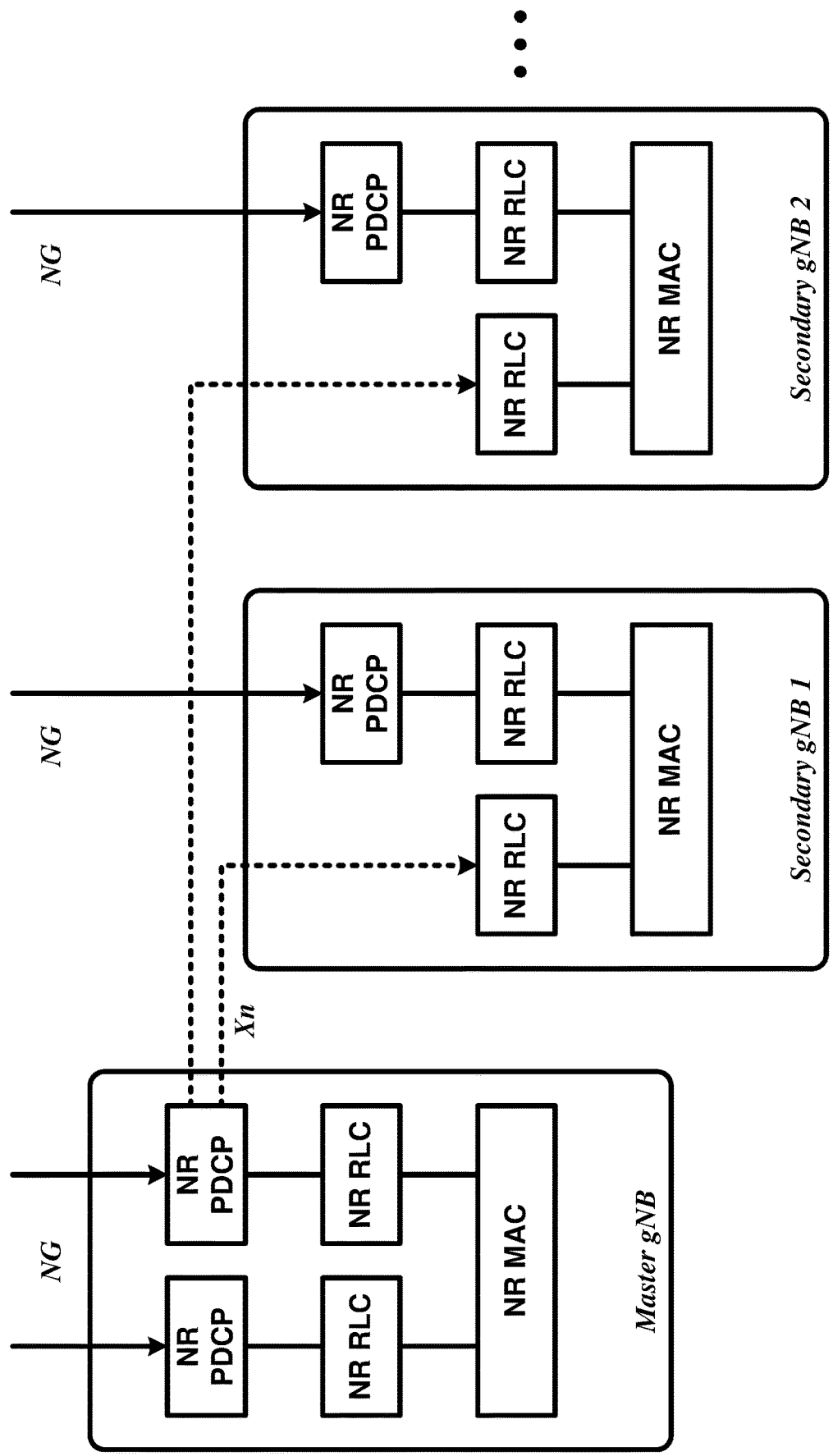
FIG. 6 is an example diagram for a protocol structure with multi-connectivity as per an aspect of an embodiment of the present invention.
Figure 7:
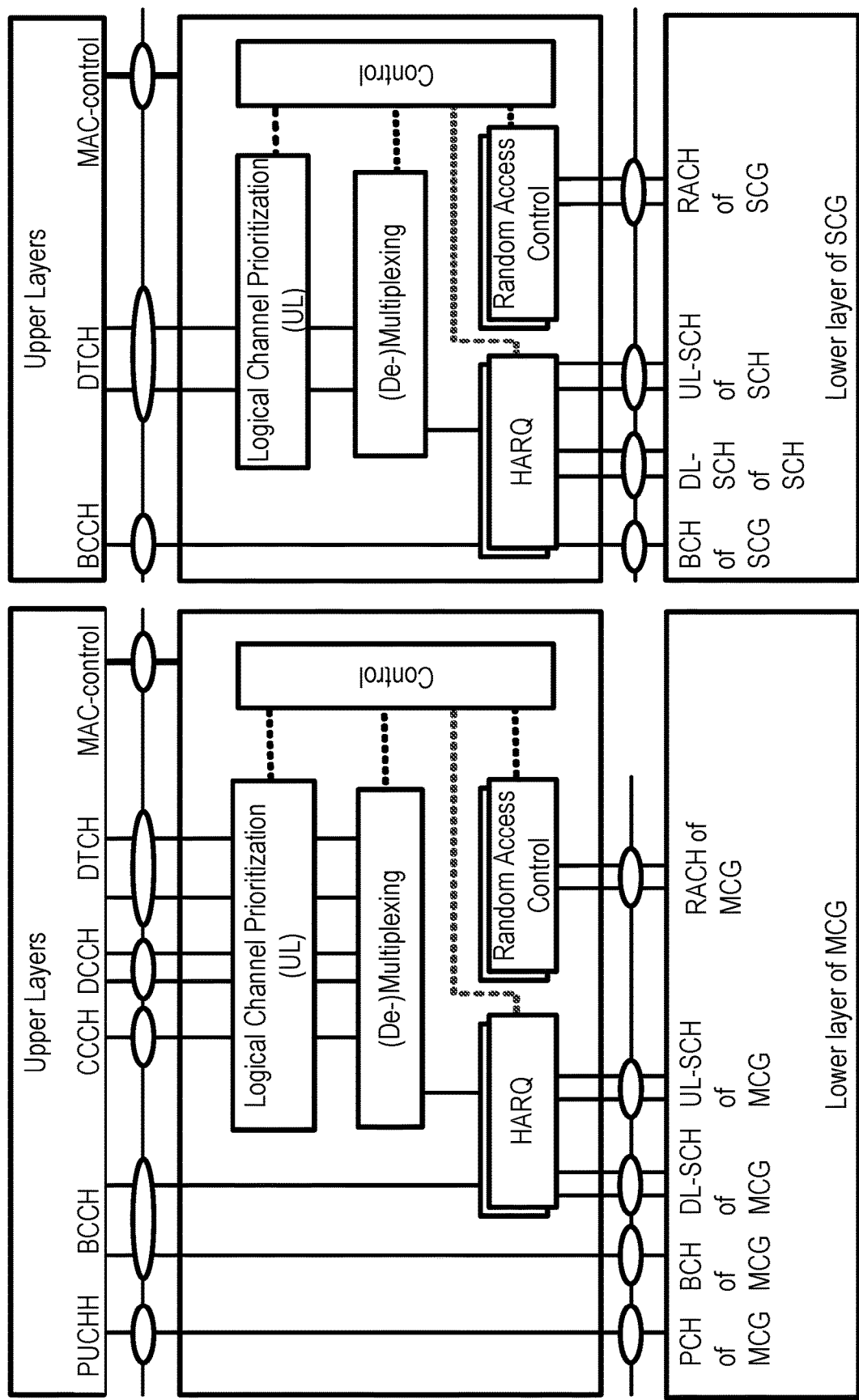
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB;

the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
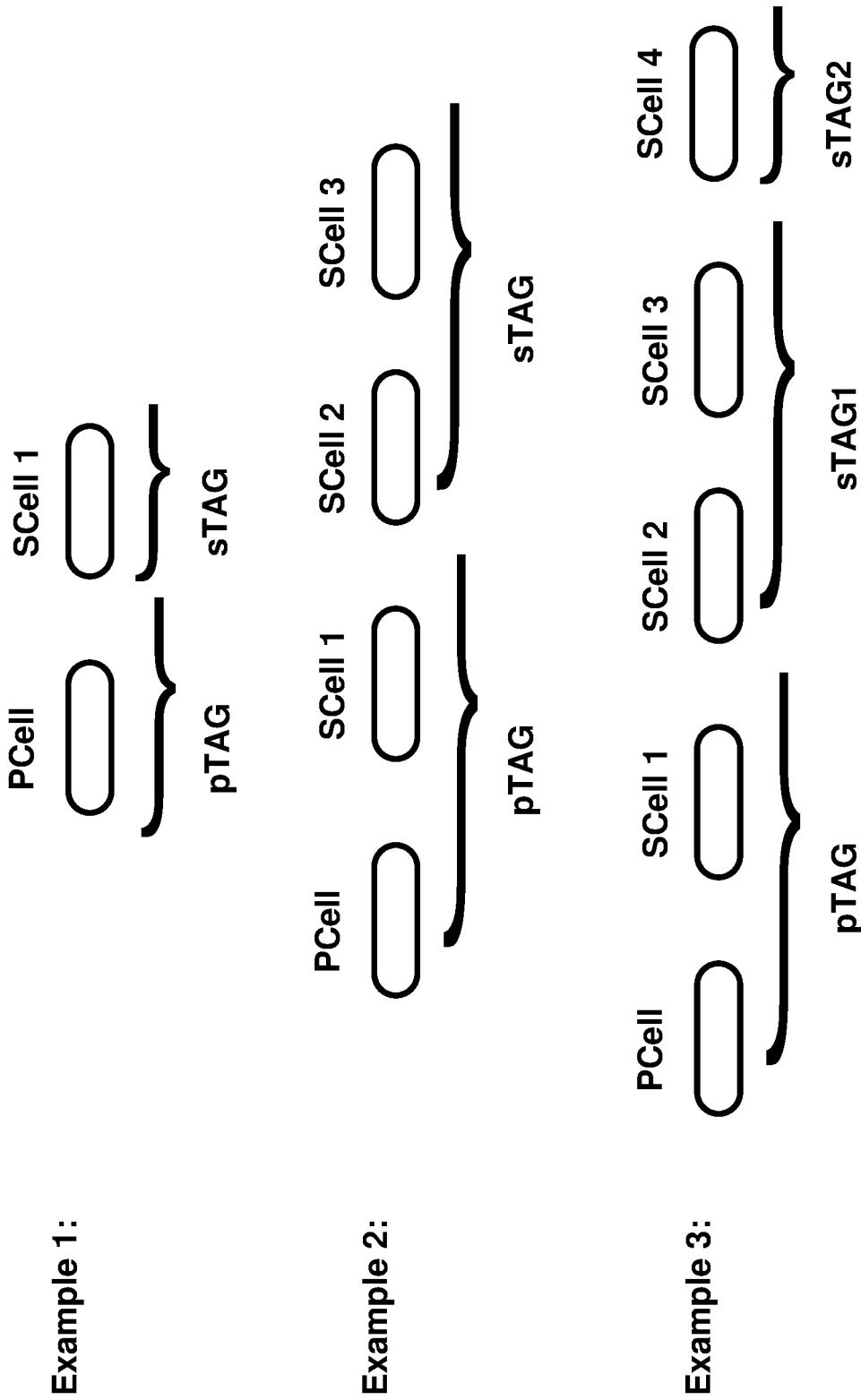
FIG. 8 shows example TAG configurations as per an aspect of an embodiment of the present invention.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
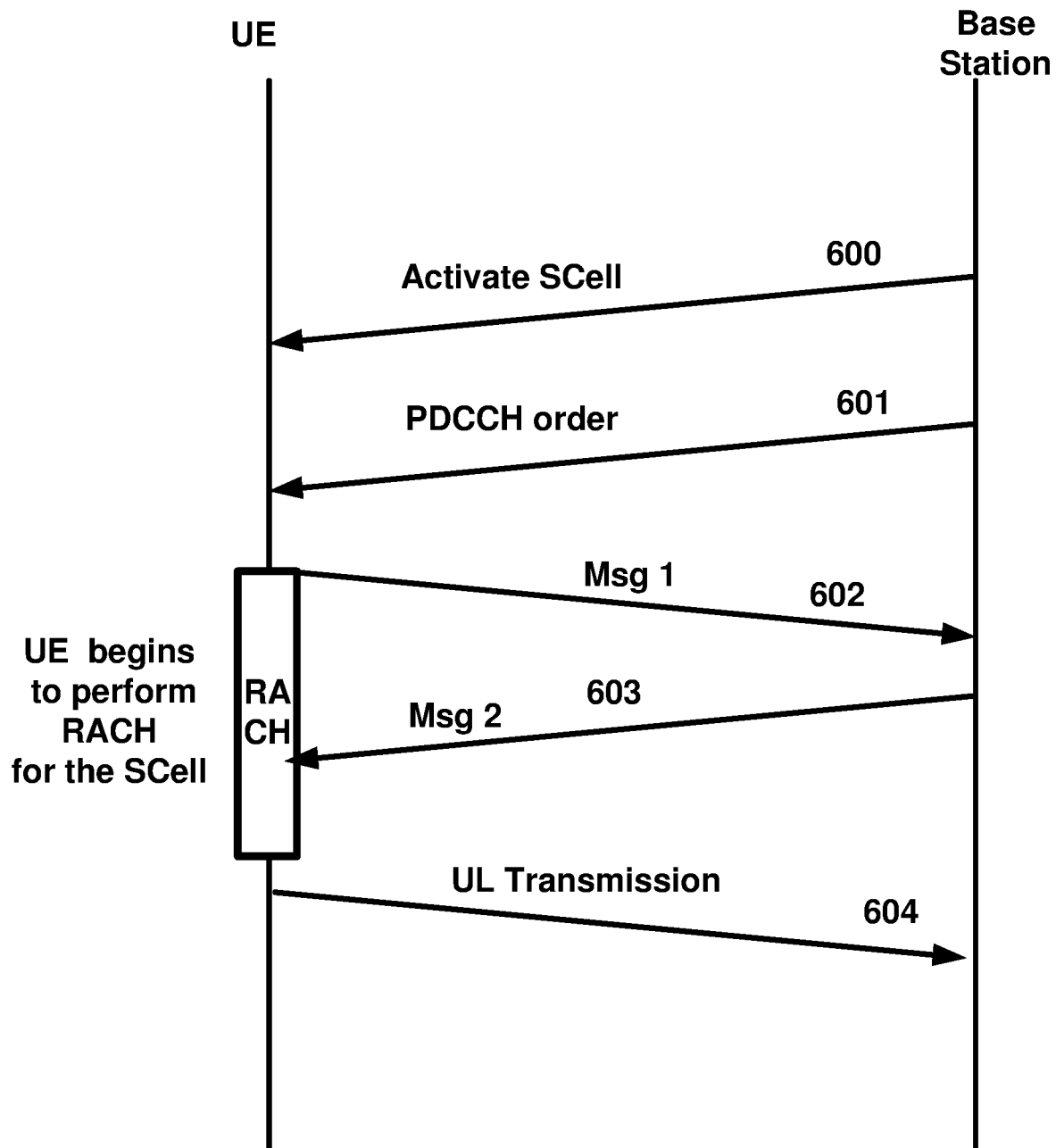
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
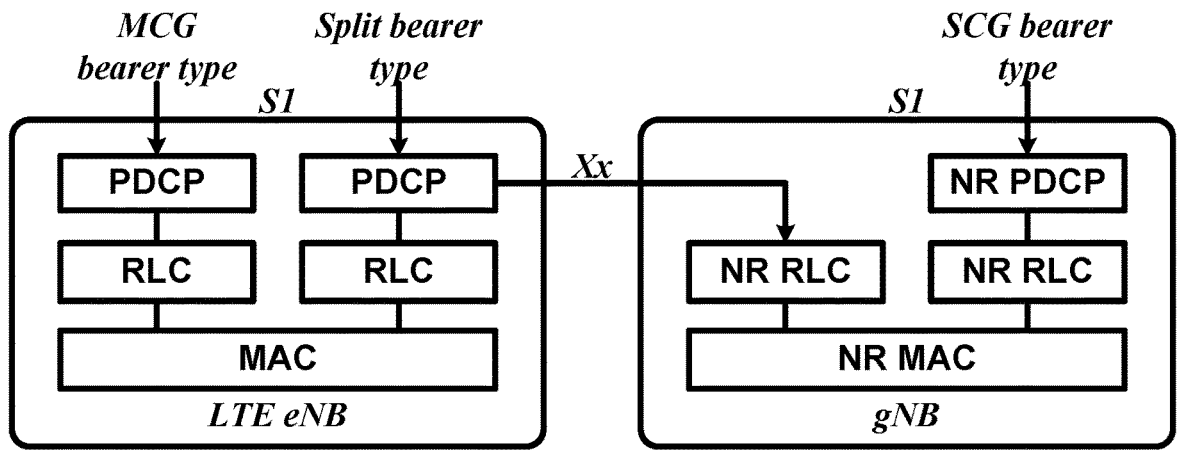
FIG. 12A, FIG. 12B, and FIG. 12C are example diagrams for radio protocol structures of tight interworking bearers as per an aspect of an embodiment of the present invention.
Figure 12B:
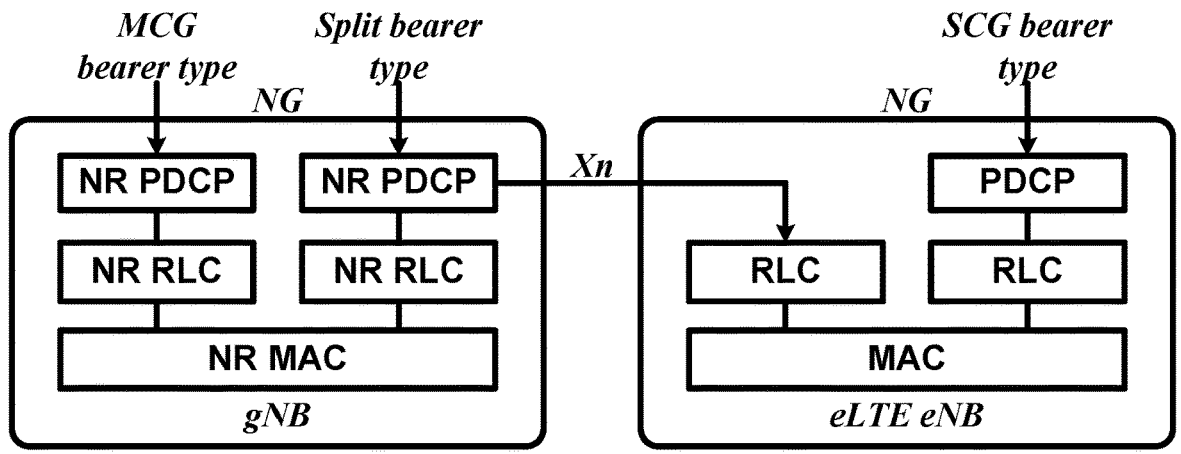
Figure 12C:
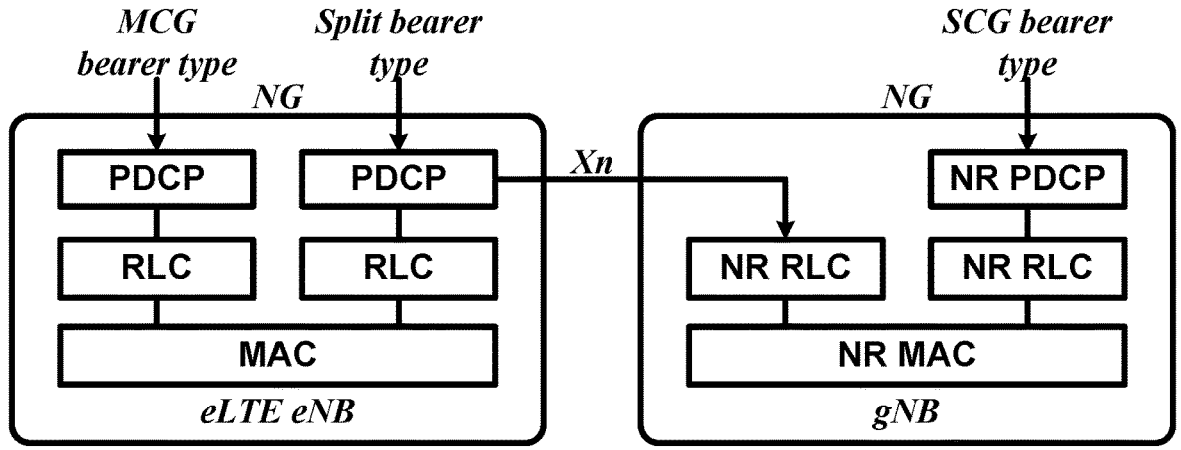

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
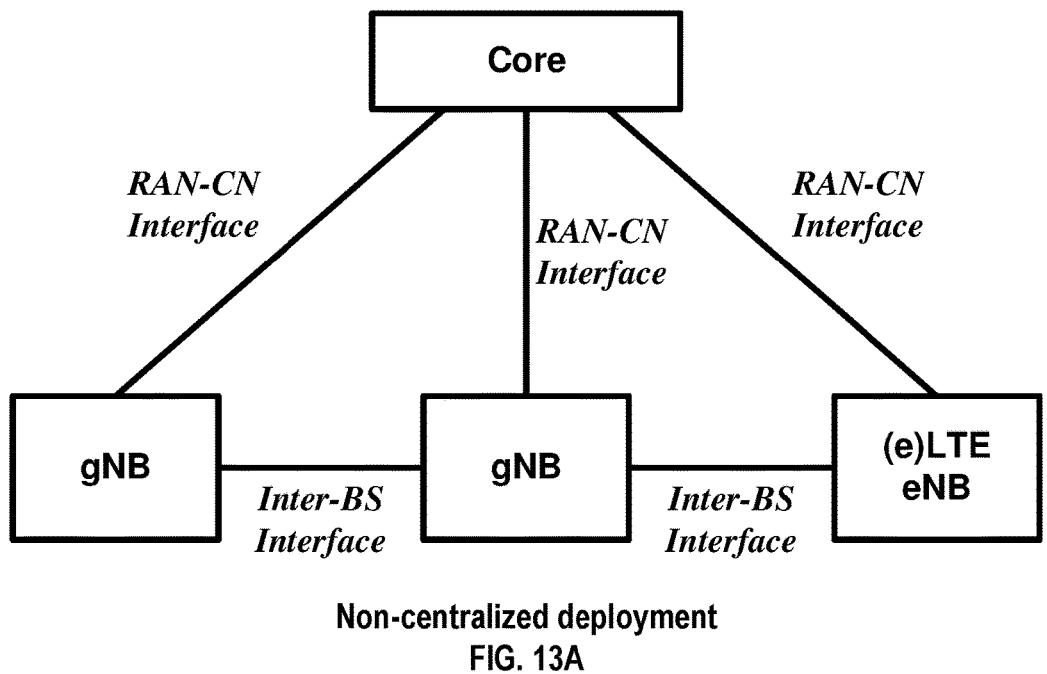
FIG. 13A and FIG. 13B are example diagrams for gNB deployment scenarios as per an aspect of an embodiment of the present invention.
Figure 13B:
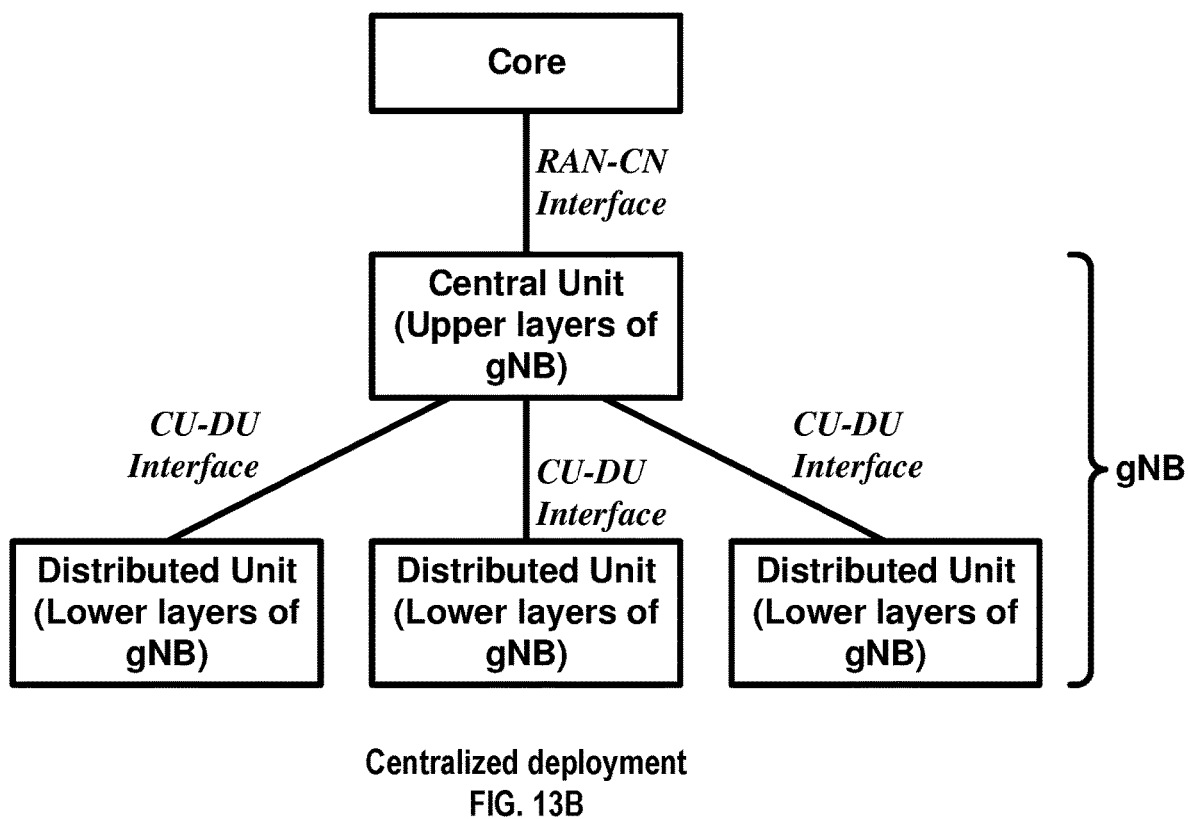

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
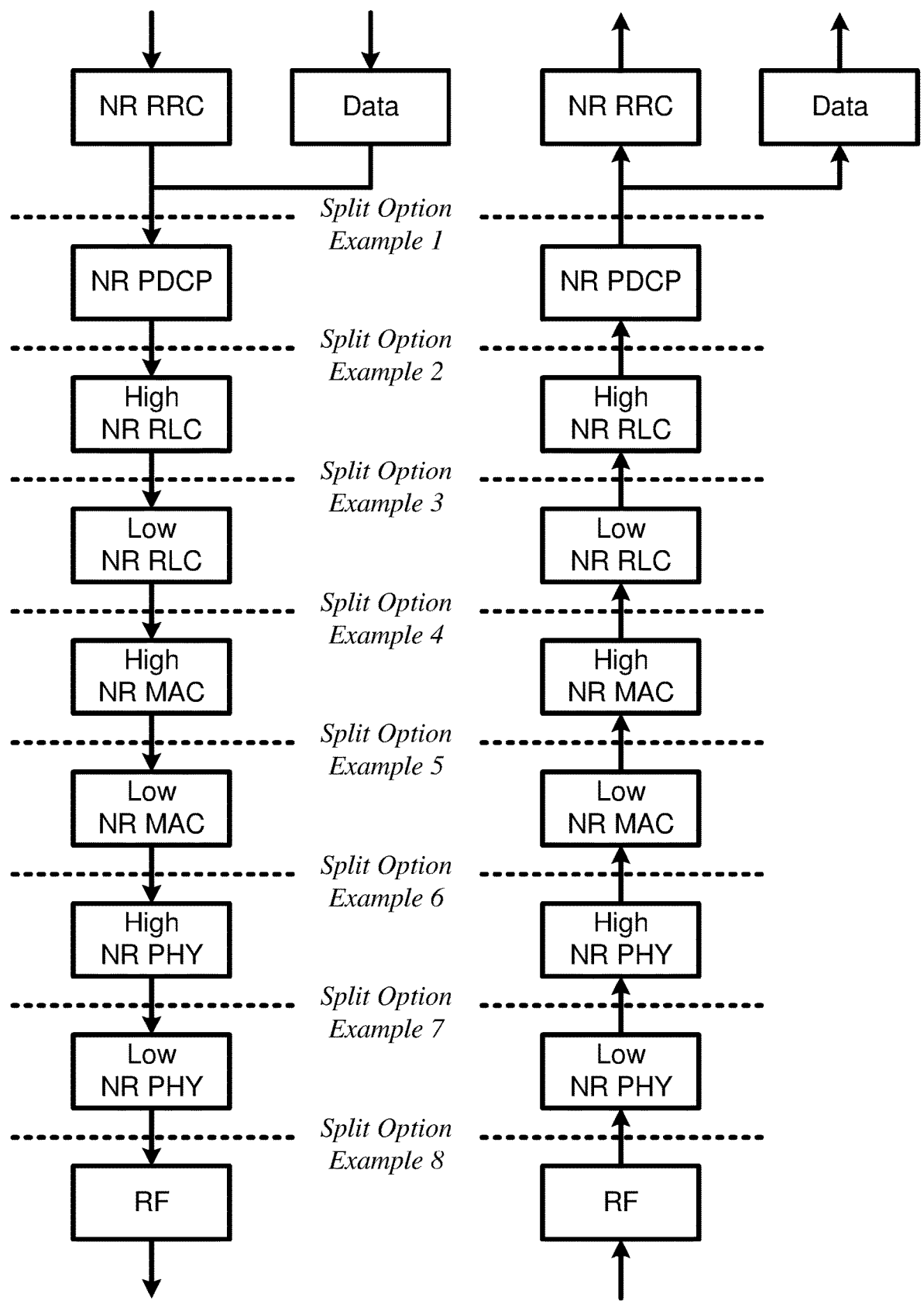
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologies and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate maping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, a UE configured for operation in bandwidth parts (BWPs) of a serving cell, may be configured by higher layers for the serving cell a set of bandwidth parts (BWPs) for receptions by the UE (DL BWP set) or a set of BWPs for transmissions by the UE (UL BWP set). In an example, for a DL BWP or UL BWP in a set of DL BWPs or UL BWPs, respectively, the UE may be configured at least one of following for the serving cell: a subcarrier spacing for DL and/or UL provided by higher layer parameter, a cyclic prefix for DL and/or UL provided by higher layer parameter, a number of contiguous PRBs for DL and/or UL provided by higher layer parameter, an offset of the first PRB for DL and/or UL in the number of contiguous PRBs relative to the first PRB by higher layer, or Q control resource sets if the BWP is a DL BWP.

In an example embodiment, for each serving cell, higher layer signalling may configure a UE with Q control resource sets. In an example, for control resource set q, $0 \le q < Q$, the configuration may comprise at least one of following: a first OFDM symbol provided by one or more higher layer parameters, a number of consecutive OFDM symbols provided by one or more higher layer parameters, a set of resource blocks provided by one or more higher layer parameters, a CCE-to-REG mapping provided by one or more higher layer parameters, a REG bundle size, in case of interleaved CCE-to-REG mapping, provided by one or more higher layer parameters, or antenna port quasi-collocation provided by higher layer parameter.

In an example embodiment, a control resource set may comprise a set of CCEs numbered from 0 to $N_{CCE,q}-1$ where $N_{CCE,q}$ may be the number of CCEs in control resource set q.

In an example embodiment, the sets of PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example embodiment, in non-DRX mode operation, a UE may monitor one or more PDCCH candidate in control resource set q according to a periodicity of $W_{PDCCH,q}$ symbols that may be configured by one or more higher layer parameters for control resource set q.

In an example embodiment, if a UE is configured with higher layer parameter, e.g., cif-InSchedulingCell, the carrier indicator field value may correspond to cif-InSchedulingCell.

In an example embodiment, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example embodiment, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example embodiment, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example embodiment, a UE may be configured, by one or more higher layer parameters, a DL BWP from a configured DL BWP set for DL receptions. A UE may be configured by one or more higher layer parameters, an UL BWP from a configured UL BWP set for UL transmissions. If a DL BWP index field is configured in a DCI format scheduling PDSCH reception to a UE, the DL BWP index field value may indicate the DL BWP, from the configured DL BWP set, for DL receptions. If an UL-BWP index field is configured in a DCI format scheduling PUSCH transmission from a UE, the UL-BWP index field value may indicate the UL BWP, from the configured UL BWP set, for UL transmissions.

In an example embodiment, for TDD, a UE may expect that the center frequency for the DL BWP is same as the center frequency for the UL BWP.

In an example embodiment, a UE may not monitor PDCCH when the UE performs measurements over a bandwidth that is not within the DL BWP for the UE.

In an example embodiment, for an initial active DL BWP, UE may identify the bandwidth and frequency of the initial active DL BWP in response to receiving the NR-PBCH.

In an example embodiment, a bandwidth of an initial active DL BWP may be confined within the UE minimum bandwidth for the given frequency band. For example, for flexible for DL information scheduling, the bandwidth may be indicated in PBCH, and/or some bandwidth candidates may be predefined. For example, x bits may be employed for indication. This enables.

In an example embodiment, a frequency location of initial active DL BWP may be derived from the bandwidth and SS block, e.g. center frequency of the initial active DL BWP. For example, a SS block may have a frequency offset, as the edge of SS block PRB and data PRB boundary may not be aligned. Predefining the frequency location of SS block and initial active DL BWP may reduce the PBCH payload size, additional bits are not needed for indication of frequency location of initial active DL BWP.

In an example, for the paired UL BWP, the bandwidth and frequency location may be informed in RMSI.

In an example embodiment, for a UE, gNB may configure a set of BWPs by RRC. The UE may transmit or receive in an active BWP from the configured BWPs in a given time instance. For example, an activation/deactivation of DL bandwidth part by means of timer for a UE to switch its active DL bandwidth part to a default DL bandwidth part may be supported. In this case, when the timer at the UE side expires, e.g. the UE has not received scheduling DCI for X ms, the UE may switch to the default DL BWP.

In an example, a new timer, e.g., BWPDeactivationTimer, may be defined to deactivate the original BWP and switch to the default BWP. The BWPDeactivationTimer may be started when the original BWP is activated by the activation/deactivation DCI. If PDCCH on the original BWP is received, a UE may restart the BWPDeactivationTimer associated with the original BWP. For example, if the BWPDeactivationTimer expires, a UE may deactivate the original BWP and switch to the default BWP, may stop the BWPDeactivationTimer for the original BWP, and may (or may not) flush all HARQ buffers associated with the original BWP.

In an example embodiment, gNB and UE may have different understanding of the starting of the timer since the UE may miss scheduling grants. In an example, the UE may be triggered to switch to the default BWP, but gNB may schedules the UE in the previous active BWP. For example, in the case that the default BWP is nested within other BWPs, gNB may restrict the location of the CORESET of BWP2 to be within BWP1 (e.g., the narrow band BWP1 may be the default BWP). Then the UE may receive CORESET and switch back to BWP2 if it mistakenly switches to the default BWP.

In an example embodiment, for a case that the default BWP and the other BWPs are not overlapped in frequency domain, it may not solve a miss switching problem by restricting the location of the CORESET. For example, the gNB may maintain a timer for a UE. When the timer expires, e.g. there is no data scheduling for the UE for Y ms, or gNB has not received feedback from the UE for Y' ms, the UE may switch to the default BWP to send paging signal or re-schedule the UE in the default BWP.

In an example embodiment, gNB may not fix the default bandwidth part to be the same as initial active bandwidth part it. Since the initial active DL BWP may be the SS block bandwidth which is common to UEs in the cell, the traffic load may be very heavy if many UEs fall back to such small bandwidth for data transmission. Configuring the UEs with different default BWPs may help to balance the load in the system bandwidth.

In an example embodiment, on a Scell, there may be no initial active BWP since the initial access is performed on the Pcell. For example, the initially activated DL BWP and/or UL BWP when the Scell is activated may be configured or reconfigured by RRC signaling. In an example, the default BWP of the Scell may also be configured or reconfigured by RRC signaling. To strive for a unified design for both Pcell and Scell, the default BWP may be configured or reconfigured by the RRC signalling, and the default BWP may be one of the configured BWPs of the UE.

In an example embodiment, gNB may configure UE-specific default DL BWP other than initial active BWP after RRC connection, e.g., for the purpose of load balancing. The default BWP may support other connected mode operations (besides operations supported by initial active BWP) for example fall back and connected mode paging. In this case, the default BWP may comprise common search space, at least the search space needed for monitoring the pre-emption indications. For example, for FDD, the default DL and UL BWPs may be independently configured to the UE.

In an example, the initial active DL/UL BWP may be set as default DL/UL BWP. In an example, a UE may return to default DL/UL BWP in some cases. For example, if a UE does not receive control for a long time, the UE may fallback to default BWP.

In an example embodiment, gNB may configure UE with multiple BWPs. For example, the multiple BWPs may share at least one CORESET including default BWP. For example, CORESET for RMSI may be shared for all configured BWP. Without going back to another BWP or default BWP, the UE may receive control information via the common CORE- SET. To minimize the ambiguity of resource allocation, the common CORESET may schedule data within only default BWP. For example, frequency region of default BWP may belong to all the configured BWPs.

In an example embodiment, when the configured BWP is associated with a different numerology from default BWP, a semi-static pattern of BWP switching to default BWP may be considered. For example, to check RMSI at least periodically, switching to default BWP may be considered. This may be necessary particularly when BWPs use different numerologies.

In an example embodiment, in terms of reconfiguration of default BWP from initial BWP, it may be considered for RRC connected UEs. For RRC IDLE UEs, default BWP may be same as initial BWP (or, RRC IDLE UE may fallback to initial BWP regardless of default BWP). If a UE performs measurement based on SS block, reconfiguration of default BWP outside of initial BWP may become very inefficient due to frequent measurement gap. In this sense, if default BWP is reconfigured to outside of initial BWP, the following conditions may be satisfied: a UE is in CONNECTED mode, and a UE is not configured with SS block based measurement for both serving cell and neighbor cells.

In an example embodiment, a DL BWP other than the initial active DL BWP may be configured to a UE as the default DL BWP. The reconfiguring the default DL BWP may be due to load balancing and/or different numerologies employed for active DL BWP and initial active DL BWP.

In an example embodiment, a default BWP on Pcell may be an initial active DL BWP for transmission of RMSI, comprising RMSI CORESET with CSS. The RMSI CORESET may comprise USS. The initial active/default BWP may remain active BWP for the user also after UE becomes RRC connected.

In an example embodiment, for a paired spectrum, downlink and uplink bandwidth parts may be independently activated while, for an unpaired spectrum downlink and uplink bandwidth parts are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, there may be an association of DL BWP and UL BWP in RRC configuration. For example, in case of TDD, a UE may not retune the center frequency of channel BW between DL and UL. In this case, since the RF is shared between DL and UL in TDD, a UE may not retune the RF BW for every alternating DL-to-UL and UL-to-DL switching.

In an example embodiment, making an association between DL BWP and UL BWP may allow that one activation/deactivation command may switch both DL and UL BWPs at once. Otherwise, separate BWP switching commands may be necessary.

In an example embodiment, a DL BWP and a UL BWP may be configured to the UE separately. Pairing of the DL BWP and the UL BWP may impose constrains on the configured BWPs, e.g., the paired DL BWP and UL BWP may be activated simultaneously. For example, gNB may indicate a DL BWP and a UL BWP to a UE for activation in a FDD system. In an example, gNB may indicate a DL BWP and a UL BWP with the same center frequency to a UE for activation in a TDD system. Since the activation/deactivation of the BWP of the UE is instructed by gNB, no paring or association of the DL BWP and UL BWP may be mandatory even for TDD system. It may be up to gNB implementation.

In an example embodiment, the association between DL carrier and UL carrier within a serving cell may be done by carrier association. For example, for TDD system, UE may not be expected to retune the center frequency of channel BW between DL and UL. To achieve it, an association between DL BWP and UL BWP may be needed. For example, a way to associate them may be to group DL BWP configurations with same center frequency as one set of DL BWPs and group UL BWP configurations with same center frequency as one set of UL BWPs. The set of DL BWPs may be associated with the set of UL BWPs sharing the same center frequency.

For an FDD serving cell, there may be no association between DL BWP and UL BWP if the association between DL carrier and UL carrier within a serving cell may be done by carrier association.

In an example embodiment, UE may identify a BWP identity from DCI to simplify the indication process. The total number of bits for BWP identity may depend on the number of bits that may be employed within the scheduling DCI (or switching DCI) and the UE minimum BW. The number of BWPs may be determined by the UE supported minimum BW along with the network maximum BW. For instance, in a similar way, the maximum number of BWP may be determined by the network maximum BW and the UE minimum BW. In an example, if 400 MHz is the network maximum BW and 50 MHz is the UE minimum BW, 8 BWP may be configured to the UE which means that 3 bits may be needed within the DCI to indicate the BWP. In an example, such a split of the network BW depending on the UE minimum BW may be useful for creating one or more default BWPs from the network side by distributing UEs across the entire network BW, e.g., load balancing purpose.

In an example embodiment, at least 2 DL and 2 UL BWP may be supported by a UE for a BWP adaption. For example, the total number of BWP supported by a UE may be given by 2≤Number of DL/UL BWP≤floor (Network maximum BW/UE minimum DL/UL BW). For example, a maximum number of configured BWPs may be 4 for DL and UL respectively. For example, a maximum number of configured BWPs for UL may be 2.

In an example embodiment, different sets of BWPs may be configured for different DCI formats/scheduling types respectively. For example, some larger BWPs may be configured for non-slot-based scheduling than that for slot-based scheduling. If different DCI formats are defined for slot-based scheduling and non-slot-based scheduling, different BWPs may be configured for different DCI formats. This may provide flexibility between different scheduling types without increasing DCI overhead. The 2-bit bitfield may be employed to indicate a BWP among the four for the DCI format. For example, 4 DL BWPs or [2 or 4] UL BWPs may be configured for each DCI formats. Same or different BWPs may be configured for different DCI formats.

In an example embodiment, a required maximum number of configured BWPs (may be not comprising the initial BWP) may depend on the flexibility needed for a BWP functionality. For example, in the minimal case of supporting bandlimited devices, it may be sufficient to be able to configure one DL BWP and one UL BWP (or a single DL/UL BWP pair in case of unpaired spectrum). For example, to support bandwidth adaptation, there may be a need to configure (at least) two DL BWPs and a single uplink BWP for paired spectrum (or two DL/UL BWP pairs for unpaired spectrum). For example, to support dynamic load-balancing between different parts of the spectrum, there may be a need to configure one or more DL (UL) BWPs that jointly cover different parts of the downlink (uplink) carrier. In an example, for dynamic load balancing, it may be sufficient with two bandwidth parts. In addition to the two bandwidth parts, two additional bandwidth parts may be needed for bandwidth adaptation. For example, a Maximum number of configured BWPs may be four DL BWPs and two UL BWPs for a paired spectrum. For example, a Maximum number of configured BWPs may be four DL/UL BWP pairs for an unpaired spectrum.

In an example embodiment, UE may monitor for RMSI and broadcast OSI which may be transmitted by the gNB within the common search space (CSS) on the PCell. In an example, RACH response and paging control monitoring on the PCell may be transmitted within the CSS. In an example, when a UE is allowed to be on an active BWP configured with UE-specific search space (USSS or USS), the UE may not monitor the common search space.

In an example, for a PCell, at least one of configured DL bandwidth parts may comprise at least one CORESET with a CSS type. For example, to monitor RMSI and broadcast OSI, UE may periodically switch to the BWP containing the CSS. In an example, the UE may periodically switch to the BWP containing the CSS for RACH response and paging control monitoring on the PCell.

In an example, if BWP switching to monitor the CSS happens frequently, it may result in increasing overhead. In an example, the overhead due to the CSS monitoring may depends on overlapping in frequency between any two BWPs. In an example, in a nested BWP configuration where one BWP is a subset of another BWP, the same CORESET configuration may be employed across the BWPs. In this case, unless reconfigured otherwise, a default BWP may be the one containing the CSS, and another BWP may contain the CSS. In an example, the BWPs may be partially overlapping. If the overlapping region is sufficient, a CSS may be across a first BWP and a second BWP. In an example, two non-overlapping BWP configurations may exist.

In an example embodiment, there may be one or more benefits of configuring the same CORESET containing the CSS across BWPs. For example, RMSI and broadcast OSI monitoring may be handled without necessitating BWP switching. In an example, RACH response and paging control monitoring on the PCell may also be handled without switching. For example, if CORESET configuration is the same across BWPs, robustness for BWP switching may improve, because even if gNB and UE are out-of-sync as to which BWP is currently active, the DL control channel may work. In an example, one or more constraints on BWP configuration may not be too much, considering that BWP may be for power saving, even the nested configuration may be very versatile for different applications.

In an example embodiment, for the case where the BWP configurations are non-overlapping in frequency, there may not be spec mandate for UE to monitor RMSI and broadcast OSI in the CSS. It may be left to implementation to handle this case.

In an example embodiment, NR may support group-common search space (GCSS). For example, the GCSS may be employed as an alternative to CSS for certain information. In an example, gNB may configure GCSS within a BWP for a UE, and information such as RACH response and paging control may be transmitted on GCSS. For example, the UE may monitor GCSS instead of switching to the BWP containing the CSS for such information.

In an example embodiment, for pre-emption indication and other group-based commands on a serving cell, gNB may transmit the information on GCSS. UE may monitor the GCSS for the information. For example, for SCell which may not have CSS.

In an example embodiment, NR may configure a CORESET without using a BWP. For example, NR support to configure a CORESET based on a BWP to reduce signaling overhead. In an example, a first CORESET for a UE during an initial access may be configured based on its default BWP. In an example, a CORESET for monitoring PDCCH for RAR and paging may be configured based on a DL BWP. In an example, the CORESET for monitoring group common (GC)-PDCCH for SFI may be configured based on a DL BWP. In an example, the CORESET for monitoring GC-DCI for pre-emption indication may be configured based on a DL BWP. In an example, the BWP index may be indicated in the CORESET configuration. In an example, the default BWP index may not be indicated in the CORESET configuration.

In an example embodiment, the contention-based random access (CBRA) RACH procedure may be supported via an initial active DL and UL BWPs since the UE identity is unknown to the gNB. In an example, the contention-free random access (CFRA) RACH procedure may be supported via the USS configured in an active DL BWP for the UE. For example, in this case, an additional CSS for RACH purpose may not need to be configured per BWP. For example, idle mode paging may be supported via an initial active DL BWP and the connected mode paging may be supported via a default BWP. No additional configurations for the BWP for paging purposes may not be needed for paging. For the case of pre-emption, a configured BWP (on a serving cell) may have the CSS configured for monitoring the pre-emption indications.

In an example embodiment, for a configured DL BWP, a group-common search space may be associated with at least one CORESET configured for the same DL BWP. For example, depending on the monitoring periodicity of different group-common control information types, it may not be practical for the UE to autonomously switch to a default BWP where a group-common search space is available to monitor for such DCI. In this case, if there is at least one CORESET configured on a DL BWP, it may be possible to configure a group-common search space in the same CORESET.

In an example embodiment, a center frequency of the activated DL BWP may not be changed. In an example, the center frequency of the activated DL BWP may be changed. For example, For TDD, if the center frequency of the activated DL BWP and deactivated DL BWP is not aligned, the active UL BWP may be switched implicitly.

In an example embodiment, BWPs with different numerologies may be overlapped, and rate matching for CSI-RS/SRS of another BWP in the overlapped region may be employed to achieve dynamic resource allocation of different numerologies in FDM/TDM fashion. In an example, for the CSI measurement within one BWP, if the CSI-RS/SRS is collided with data/RS in another BWP, the collision region in another BWP may be rate matched. For example, CSI information over the two BWPs may be known at a gNB side by UE reporting. Dynamic resource allocation with different numerologies in a FDM manner may be achieved by gNB scheduling.

In an example embodiment, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example embodiment, if a configured SCell is activated for a UE, a DL BWP may be associated with an UL BWP at least for the purpose of PUCCH transmission, and a default DL BWP may be activated. If the UE is configured for UL transmission in same serving cell, a default UL BWP may be activated.

In an example embodiment, at least one of configured DL BWPs comprises one CORESET with common search space (CSS) at least in primary component carrier. The CSS may be needed at least for RACH response (msg2) and pre-emption indication.

In an example, for the case of no periodic gap for RACH response monitoring on Pcell, for Pcell, one of configured DL bandwidth parts may comprise one CORESET with the CSS type for RMSI & OSI. For Pcell, a configured DL bandwidth part may comprise one CORESET with the CSS type for RACH response & paging control for system information update. For a serving cell, a configured DL bandwidth part may comprise one CORESET with the CSS type for pre-emption indication and other group-based commands.

In an example, for the case of a presence of periodic gap for RACH response monitoring on Pcell, for Pcell, one of configured DL bandwidth parts may comprise one CORESET with CSS type for RMSI, OSI, RACH response & paging control for system information update. For a serving cell, a configured DL bandwidth part may comprise one CORESET with the CSS type for pre-emption indication and other group-based commands.

In an example embodiment, BWPs may be configured with respect to common reference point (PRB 0) on a NW carrier. In an example, the BWPs may be configured using TYPE1 RA as a set of contiguous PRBs, with PRB granularity for the START and LENGTH, and the minimum length may be determined by the minimum supported size of a CORESET.

In an example embodiment, a CSS may be configured on a non-initial BWP for RAR and paging.

In an example embodiment, to monitor (group) common channel for RRC CONNECTED UE, an initial DL BWP may comprise control channel for RMSI, OSI and paging and UE switches BWP to monitor such channel. In an example, a configured DL BWP may comprise control channel for Msg2. In an example, a configured DL BWP may comprise control channel for SFI. In an example, a configured DL BWP may comprise pre-emption indication and other group common indicators like power control.

In an example embodiment, a DCI may explicitly indicate activation/deactivation of BWP.

For example, a DCI without data assignment may comprise an indication to activate/deactivate BWP. In an example, UE may receive a first indication via a first DCI to activate/deactivate BWP. In order for the UE to start receiving data, a second DCI with a data assignment may be transmitted by the gNB. A UE may receive the first DCI in a target CORESET in a target BWP. In an example, until there is CSI feedback provided to a gNB, the gNB scheduler may make conservative scheduling decisions.

In an example, a DCI without scheduling for active BWP switching may be transmitted to measure the CSI before scheduling. It may be taken as an implementation issue of DCI with scheduling, for example, the resource allocation field may be set to zero, which means no data may be scheduled. Other fields in this DCI may comprise one or more CSI/SRS request fields.

In an example embodiment, support for a single scheduling DCI to trigger active BWP switching may be motivated by dynamic BWP adaptation for UE power saving during active state (which may comprise ON duration and when inactivity timer is running when C-DRX is configured). For example, with a C-DRX enabled, a UE may consume significant amount of power monitoring PDCCH without decoding any grant. To reduce the power consumption during PDCCH monitoring, two BWPs may be configured: a narrower BWP for PDCCH monitoring, and a wider BWP for scheduled data. In such a case, the UE may switch back-and-forth between the narrower BWP and the wider BWP, depending on the burstiness of the traffic. For example, the UE may be revisiting a BWP that it has dwelled on previously. For this case, combining a BWP switching indication and a scheduling grant may result in low latency and reduced signalling overhead for BWP switching.

In an example embodiment, a SCell activation and deactivation may trigger the corresponding action for its configured BWP. In an example, a SCell activation and deactivation may not trigger the corresponding action for its configured BWP.

In an example embodiment, a dedicated BWP activation/deactivation DCI may impact a DCI format. For example, a scheduling DCI with a dummy grant may be employed. the dummy grant may be constructed by invalidating one or some of the fields, for example, the resource allocation field. In an example, it may be feasible to leverage a fallback scheduling DCI format (which contains a smaller payload) to improve the robustness for BWP DCI signalling, without incurring extra work on introducing a new DCI format.

In an example embodiment, a DCI with data assignment may comprise an indication to activate/deactivate BWP along with a data assignment. For example, a UE may receive a combined data allocation and BWP activation/deactivation message. For example, a DCI format may comprise a field to indicate BWP activation/deactivation along with a field indicating UL/DL grant. In this case, the UE may start receiving data with a single DCI. In this case, the DCI may need indicate one or more target resources of a target BWP. A gNB scheduler may have little knowledge of the CSI in the target BW and may have to make conservative scheduling decisions.

In an example embodiment, for the DCI with data assignment, the DCI may be transmitted on a current active BWP and scheduling information may be for a new BWP. For example, there may be a single active BWP. There may be one DCI in a slot for scheduling the current BWP or scheduling another BWP. The same CORESET may be employed for the DCI scheduling the current BWP and the DCI scheduling another BWP. For example, to reduce the number of blind decoding, the DCI payload size for the DCI scheduling current BWP and the scheduling DCI for BWP switching may be the same.

In an example embodiment, to support the scheduling DCI for BWP switching, a BWP group may be configured by gNB, in which a numerology in one group may be the same. In an example, the BWP switching for the BWP group may be configured, in which BIF may be present in the CORESETs for one or more BWPs in the group. For example, scheduling DCI for BWP switching may be configured per BWP group, in which an active BWP in the group may be switched to any other BWP in the group.

In an example, embodiment, a DCI comprising scheduling assignment/grant may not comprise active-BWP indicator. For a paired spectrum, a scheduling DCI may switch UEs active BWP for the transmission direction that the scheduling is valid for. For an unpaired spectrum, a scheduling DCI may switch the UEs active DL/UL BWP pair regardless of the transmission direction that the scheduling is valid for. There may be a possibility for downlink scheduling assignment/grant with "zero" assignment, in practice allowing for switch of active BWP without scheduling downlink or uplink transmission In an example embodiment, a timer-based activation/deactivation BWP may be supported. For example, a timer for activation/deactivation of DL BWP may reduce signalling overhead and may enable UE power savings. The activation/deactivation of a DL BWP may be based on an inactivity timer (referred to as a BWP inactive (or inactivity) timer). For example, a UE may start and reset a timer upon reception of a DCI. When the UE is not scheduled for the duration of the timer, the timer may expire. In this case, the UE may activate/deactivate the appropriate BWP in response to the expiry of the timer. For example, the UE may activate for example the Default BWP and may deactivate the source BWP.

For example, a BWP inactive timer may be beneficial for power saving for a UE switching to a default BWP with smaller BW and fallback for a UE missing DCI based activation/deactivation signaling to switch from one BWP to another BWP.

In an example embodiment, triggering conditions of the BWP inactive timer may follow the ones for the DRX timer in LTE. For example, an On-duration of the BWP inactive timer may be configured and the timer may start when a UE-specific PDCCH is successfully decoded indicating a new transmission during the On-duration. The timer may restart when a UE-specific PDCCH is successfully decoded indicating a new transmission. The timer may stop once the UE is scheduled to switch to the default DL BWP.

In an example embodiment, for fallback, the BWP inactive timer may start once the UE switches to a new DL BWP. The timer may restart when a UE-specific PDCCH is successfully decoded, wherein the UE-specific PDCCH may be associated with a new transmission, a retransmission or some other purpose, e.g., SPS activation/deactivation if supported.

In an example embodiment, a UE may switch to a default BWP if the UE does not receive any control/data from the network during a BWP inactive timer running. The timer may be reset upon reception of any control/data. For example, the timer may be triggered when UE receives a DCI to switch its active DL BWP from the default BWP to another. For example, the timer may be reset when a UE receives a DCI to schedule PDSCH(s) in the BWP other than the default BWP.

In an example embodiment, a DL BWP inactive timer may be defined separately from a UL BWP inactive timer. For example, there may be some ways to set the timer, e.g., independent timer for DL BWP and UL BWP, or a joint timer for DL and UL BWP. In an example, for the separate timers, assuming both DL BWP and UL BWP are activated, if there is DL data and UL timer expires, UL BWP may not be deactivated since PUCCH configuration may be affected. For example, for the uplink, if there is UL feedback signal related to DL transmission, the timer may be reset (Or, UL timer may not be set if there is DL data). On the other hand, if there is UL data and the DL timer expires, there may be no issue if the DL BWP is deactivated since UL grant is transmitted in the default DL BWP.

In an example embodiment, a BWP inactivity-timer may enable the fall-back to default BWP on Pcell and Scell.

In an example embodiment, a timer-based activation/deactivation of BWP may be similar to a UE DRX timer. For example, there may not be a separate inactivity timer for BWP activation/deactivation for the UE DRX timer. For example, one of the UE DRX inactivity timer may trigger BWP activation/deactivation.

For example, there may be a separate inactivity timer for BWP activation/deactivation for the UE DRX timer. For example, the DRX timers may be defined in a MAC layer, and the BWP timer may be defined in a physical layer. In an example, If the same DRX inactivity timer is employed for BWP activation/deactivation, UE may stay in a wider BWP for as long as the inactivity timer is running, which may be a long time. For example, the DRX inactivity timer may be set to a large value of 100-200 milliseconds for C-DRX cycle of 320 milliseconds, larger than the ON duration (10 milliseconds). This may imply that power saving due to narrower BWP may not be achievable. To realize potential of UE power saving promised by BWP switching, a new timer may be defined and it may be configured to be smaller than the DRX inactivity timer. From the point of view of DRX operation, BWP switching may allow UE to operate at different power levels during the active state, effectively providing some more intermediate operating points between the ON and OFF states.

In an example embodiment, with a DCI explicit activation/deactivation of BWP, a UE and a gNB may not be synchronized with respect to which BWP is activated/deactivated. The gNB scheduler may not have CSI information related to a target BWP for channel-sensitive scheduling. The gNB may be limited to conservative scheduling for one or more first several scheduling occasions. The gNB may rely on periodic or aperiodic CSI-RS and associated CQI report to perform channel-sensitive scheduling. Relying on periodic or aperiodic CSI-RS and associated CQI report may delay channel-sensitive scheduling and/or lead to signaling overhead (e.g. in the case where we request aperiodic CQI). To mitigate a delay in acquiring synchronization and channel state information, a UE may transmit an acknowledgement upon receiving an activation/deactivation of BWP. For example, a CSI report based on the provided CSI-RS resource may be transmitted after activation of a BWP and is employed as acknowledgment of activation/deactivation.

In an example embodiment, a gNB may provide a sounding reference signal for a target BWP after a UE tunes to a new bandwidth. In an example, the UE may report the CSI, which is employed as an acknowledgement by the gNB to confirm that the UE receive an explicit DCI command and activates/deactivates the appropriate BWPs. In an example, for the case of an explicit activation/deactivation via DCI with data assignment, a first data assignment may be carried out without a CSI for the target BWP In an example embodiment, a guard period may be defined to take RF retuning and the related operations into account. For example, a UE may neither transmit nor receive signals in the guard period. A gNB may need to know the length of the guard period. For example, the length of the guard period may be reported to the gNB as a UE capability. The length of the guard period may be closely related on the numerologies of the BWPs and the length of the slot. For example, the length of the guard period for RF retuning may be reported as a UE capability. In an example, the UE may report the absolute time in µs. in an example, the UE may report the guard period in symbols.

In an example embodiment, after the gNB knows the length of the guard period by UE reporting, the gNB may want to keep the time domain position of guard period aligned between the gNB and the UE. For example, the guard period for RF retuning may be predefined for time pattern triggered BWP switching. In an example, for the BWP switching triggered by DCI and timer, the guard period for DCI and timer based BWP switching may be an implementation issue. In an example, for BWP switching following some time pattern, the position of the guard period may be defined. For example, if the UE is configured to switch periodically to a default BWP for CSS monitoring, the guard period may not affect the symbols carrying CSS.

In an example embodiment, a single DCI may switch the UE's active BWP form one to another (of the same link direction) within a given serving cell. A separate field may be employed in the scheduling DCI to indicate the index of the BWP for activation, such that UE may determine the current DL/UL BWP according to a detected DL/UL grant without requiring any other control information. In case the BWP change does not happen during a certain time duration, the multiple scheduling DCIs transmitted in this duration may comprise the indication to the same BWP. During the transit time when potential ambiguity may happen, gNB may send scheduling grants in the current BWP or together in the other BWPs containing the same target BWP index, such that UE may obtain the target BWP index by detecting the scheduling DCI in either one of the BWPs. The duplicated scheduling DCI may be transmitted K times. When UE receive one of the K times transmissions, UE may switch to the target BWP and start to receive or transmit (UL) in the target BWP according to the BWP indication field.

In an example embodiment, switching between BWPs may not introduce large time gaps when UE may not be able to receive due to re-tuning, neither after detecting short inactivity (Case 1) or when data activity is reactivated (Case 2). For example, in Case 2, long breaks of several slots may severely impact the TCP ramp up as UE may not be able to transmit and receive during those slots, impacting obtained RTT and data rate. Case 1 may be seen less problematic at first glance but similarly long break in reception may make UE out of reach from network point of view reducing network interest to utilize short inactivity timer.

In an example, if BWP switching takes significant time, and UE requires new reference symbols to update AGC, channel estimation etc, the system may have less possibilities/motivation to utilize active BWP adaption in the UE. This may be achieved by preferring configuration where BWP center frequency remains the same when switching between BWPs.

In an example embodiment, a frequency location of UE RF bandwidth may be indicated by gNB. For example, considering the UE RF bandwidth capability, the RF bandwidth of the UE may be usually smaller than the carrier bandwidth. The supported RF bandwidth for a UE is usually a set of discrete values (e.g., 10 MHz, 20 MHz, 50 MHz and so on), for energy saving purpose, the UE RF bandwidth may be determined as the minimum available bandwidth supporting the BWP bandwidth. But the granularity of BWP bandwidth is PRB level, which is decoupled with UE RF bandwidth and more flexible. As a result, in most cases the UE RF bandwidth is larger than the BWP bandwidth. The UE may receive the signal outside the carrier bandwidth, especially if the configured BWP is configured near the edge of the carrier bandwidth. And the inter-system interference or the interference from the adjacent cell outside the carrier bandwidth may impact the receiving performance of the BWP. Thus, to keep the UE RF bandwidth in the carrier bandwidth, it may be necessary to indicate the frequency location of the UE RF bandwidth by gNB.

In an example embodiment, in terms of measurement gap configuration, the gap duration may be determined based on the measurement duration and necessary retuning gap. For example, different retuning gap may be needed depending on the cases. For example, if a UE does not need to switch its center, the retuning may be small such as 20 us. For the case that the network may not know whether the UE needs to switch its center or not to perform measurement, a UE may indicate the necessary retuning gap for a measurement configuration.

In an example embodiment, the necessary gap may depend on the current active BWP which may be dynamically switched via switching mechanism. In this case, for example, UEs may need to dynamically indicate the necessary gap.

In an example embodiment, the measurement gap may be implicitly created, wherein the network may configure a certain gap (which may comprise the smallest retuning latency, for example, the network may assume small retuning gap is necessary if both measurement bandwidth and active BWP may be included within UE maximum RF capability assuming center frequency of current active BWP is not changed). In this case, for example, if a UE needs more gap than the configured, the UE may skip receiving or transmitting.

In an example embodiment, different measurement gap and retuning latency may be assumed for RRM and CSI respectively. For CSI measurement, if periodic CSI measurement outside of active BWP is configured, a UE may need to perform its measurement periodically per measurement configuration. For RRM, it may be up to UE implementation where to perform the measurement as long as it satisfies the measurement requirements. In this case, for example, the worst case retuning latency for a measurement may be employed. In an example, as the retuning latency may be different between intra-band and inter-band retuning, separate measurement gap configuration between intra-band and inter-band measurement may be considered.

In an example embodiment, for multiple DCI formats with the same DCI size of a same RNTI, a respective DCI format may comprise an explicit identifier to distinguish them. For example, a same DCI size may come from a few (but not a large number of) zero-padding bits at least in UE-specific search space.

In an example embodiment, when there is a BWP switching, a DCI in the current BWP may need to indicate resource allocation in the next BWP that the UE is expected to switch. For example, the resource allocation may be based on the UE-specific PRB indexing, which may be per BWP. A range of the PRB indices may change as the BWP changes. In an example, the DCI to be transmitted in current BWP may be based on the PRB indexing for the current BWP. The DCI may need to indicate the RA in the new BWP, which may arouse a conflict. To resolve the conflict without significantly increasing UEs blind detection overhead, the DCI size and bit fields may not change per BWP for a given DCI type.

In an example embodiment, as the range of the PRB indices may change as the BWP changes, one or more employed bits among the total bit field for RA may be dependent on the employed BWP. For example, UE may employ the indicated BWP ID that the resource allocation is intended to identify the resource allocation bit field.

In an example embodiment, a DCI size of the BWP may consider two cases. One case may be a normal DCI detection without BWP retuning, and the other case may be a DCI detection during the BWP retuning.

For example, in some cases, a DCI format may be independent of the BW of the active DL/UL BWP (which may be called as fallback DCI). In an example, at least one of DCI formats for DL may be configured to have the same size to a UE for one or more configured DL BWPs of a serving cell. In an example, at least one of the DCI formats for UL may be configured to have the same size to a UE for one or more configured UL BWPs of a serving cell. In an example embodiment, a BWP-dependent DCI format may be monitored at the same time (which may be called as normal DCI) for both active DL BWP and active UL BWP. For example, UE may be configured to monitor both DCI formats at the same time. During the BWP activation/deactivation, gNB may assign the fallback DCI format to avoid ambiguity during the transition period.

In an example embodiment, if a UE is configured with multiple DL or UL BWPs in a serving cell, an inactive DL/UL BWP may be activated by a DCI scheduling a DL assignment or UL grant respectively in this BWP. As the UE is monitoring the PDCCH on the currently active DL BWP, the DCI may comprise an indication to a target BWP that the UE may switch to for PDSCH reception or UL transmission. A BWP indication may be inserted in the UE-specific DCI format for this purpose. The bit width of this field may depend on either the maximum possible or presently configured number of DL/UL BWPs. Similar to CIF, it may be simpler to set the BWP indication field to a fixed size based on the maximum number of configured BWPs.

In an example, a DCI format size may match the BW of the BWP in which the PDCCH is received. To avoid an increase in the number of blind decodes, the UE may identify the RA field based on the scheduled BWP. For example, for a transition from a small BWP to a larger BWP, the UE may identify the RA field as being the LSBs of the required RA field for scheduling the larger BWP.

In an example embodiment, a same DCI size for scheduling different BWPs may be defied by keeping a same size of resource allocation field for one or more configured BWPs. For example, gNB may not be aware of whether UE switches BWPs if gNB does not receive at least one response from the UE (e.g., gNB may be aware of if UE switches BWPs based on a reception of ACK/NACK from the UE). In an example, to avoid such a mismatch between gNB and UE, NR may define fallback mechanism. For example, if there is no response from the UE, gNB may transmit the scheduling DCI for previous BWPs and that for newly activated BWP since the UE may receive the DCI on either BWP. When the gNB receives a response from the UE, the gNB may confirm that the active BWP switching is completed. In an example, if a same DCI size for scheduling different BWPs is considered and COREST configuration is also the same for different BWPs, gNB may not transmit multiple DCIs.

In an example embodiment, DCI format(s) may be configured user-specifically per cell, e.g., not per BWP. For example, after the UE syncs to the new BWP, the UE may start to monitor pre-configured search-space on the CORESET. If the DCI formats may be configured per cell to keep the number of DCI formats, the corresponding header size in DCI may be small.

In an example embodiment, a size of DCI format in different BWPs may vary and may change at least due to different size of RA bitmap on different BWPs. For example, the size of DCI format configured in a cell for a UE may be dependent on BWP it schedules.

In an example embodiment, the monitored DCI format size on a search-space of a CORESET may be configurable with the sufficiently fine granularity (the granularity may be predefined). For example, the monitored DCI format size with sufficient granularity may be beneficial when a gNB may have the possibility to set freely the monitoring DCI format size on a search-spaces of a CORESET, such that it may accommodate the largest actual DCI format size variant among one or more BWPs configured in a serving cell.

In an example embodiment, for a UE-specific serving cell, one or more DL BWPs and one or more UL BWPs may be configured by dedicated RRC for a UE. For the case of PCell, this may be done as part of the RRC connection establishment procedure. For the SCell, this may be done via RRC configuration which may indicate the SCell parameters.

In an example embodiment, when a UE receives SCell activation command, there may be a default DL and/or UL BWP which may be activated since there may be at least one DL and/or UL BWP which may be monitored by the UE depending on the properties of the SCell (DL only or UL only or both). This BWP which may be activated upon receiving SCell activation command, may be informed to the UE via the a RRC configuration which configured the BWP on this serving cell.

For example, for SCell, RRC signalling for SCell configuration/reconfiguration may be employed to indicate which DL BWP and/or which UL BWP may be activated when the SCell activation command is received by the UE. The indicated BWP may be the initially active DL/UL BWP on the SCell. Therefore, SCell activation command may activate DL and/or UL BWP.

In an example embodiment, for a SCell, RRC signaling for the SCell configuration/reconfiguration may be employed for indicating a default DL BWP on the SCell which may be employed for fall back purposes. For example, the default DL BWP may be same or different from the initially activated DL/UL BWP which is indicated to UE as part of the SCell configuration. In an example, a default UL BWP may be configured to UE for the case of transmitting PUCCH for SR (as an example), in case the PUCCH resources are not configured in every BWP for the sake of SR.

In an example, a Scell may be for DL only. For the Scell for DL only, UE may keep monitoring an initial DL BWP (initial active or default) until UE receives SCell deactivation command.

In an example, a Scell may be for UL only. For the Scell for UL only, when UE receives a grant, UE may transmit on the indicated UL BWP. In an example, the UE may not maintain an active UL BWP if UE does not receive a grant. In an example, not mainlining the active UL BWP due to no grant receive may not deactivate the SCell.

In an example, a Scell may be for UL and DL. For the Scell for UL and DL, a UE may keep monitoring an initial DL BWP (initial active or default) until UE receives SCell deactivation command and. The UL BWP may be employed when there is a relevant grant or an SR transmission.

In an example, a BWP deactivation may not result in a SCell deactivation. For example, when the UE receives the SCell deactivation command, the active DL and/or UL BWPs may be considered deactivated.

In an example embodiment, if the SCell has its associated UL and/or a UE is expected to perform RACH procedure on SCell during activation, activation of UL BWP may be needed. For example, at SCell activation, DL only (only active DL BWP) or DL/UL (both DL/UL active BWP) may be configured. Regarding SUL band as a SCell, a UE may select default UL BWP based on measurement or the network configures which one in its activation.

In an example embodiment, one or more BWPs are semi-statically configured via UE-specific RRC signaling. In a CA system, if a UE maintains RRC connection with the primary component carrier (CC), the BWP in secondary CC may be configured via RRC signaling in the primary CC.

In an example embodiment, one or more BWPs may be semi-statically configured to a UE via RRC signaling in PCell. A DCI transmitted in SCell may indicate a BWP among the one or more configured BWP, and grant detailed resource based on the indicated BWP.

In an example embodiment, for a cross-CC scheduling, a DCI transmitted in PCell may indicate a BWP among the one or more configured BWPs, and grants detailed resource based on the indicated BWP.

In an example embodiment, when a SCell is activated, a DL BWP may be initially activated for configuring CORESET for monitoring the first PDCCH in Scell. The DL BWP may serve as a default DL BWP in the SCell. In an example, since the UE performs initial access via a SS block in PCell, the default DL BWP in SCell may not be derived from SS block for initial access. The default DL BWP in Scell may be configured by RRC signaling in the PCell.

In an example embodiment, when an Scell is activated, an indication indicating which DL BWP and/or which UL BWP are active may be in RRC signalling for Scell configuration/reconfiguration. For example, the RRC signalling for Scell configuration/reconfiguration may be employed for indicating which DL BWP and/or which UL BWP are initially activated when the Scell is activated.

In an example embodiment, when an Scell is activated, an indication indicating which DL BWP and/or which UL BWP are active may be in Scell activation signaling. For example, Scell activation signaling may be employed for indicating which DL BWP and/or which UL BWP are initially activated when the Scell is activated.

In an example embodiment, for PCells and pSCells, an initial default bandwidth parts for DL and UL (e.g., for RMSI reception and PRACH transmission) may be valid until at least one bandwidth part is configured for the DL and UL via RRC UE-specific signaling, respectively, at what time the initial default DL/UL bandwidth parts may become invalid and new default DL/UL bandwidth parts may take effect. In an example, for an Scell, the SCell configuration may comprise default DL/UL bandwidth parts.

In an example embodiment, an initial BWP on Pcell may be defined by MIB. In an example, an initial BWP and default BWP may be separately configurable for the Scell. For an Scell if the Scell is activated, an initial BWP may be the widest configured BWP of the Scell. For example, after the traffic burst is served, and an inactivity timer expires, a UE may retune to default BWP which may be the narrow BWP, for power savings, keeping the Scell active and may be ready to be opened briskly when additional data burst arrives.

In an example embodiment, a BWP on Scell may be activated by means of cross-cell scheduling DCI, if cross-cell scheduling is configured to a UE. In this case, the gNB may activate a BWP on the Scell by indicating CIF and BWPI in the scheduling DCI.

In an example embodiment, UE and/or gNB may perform synchronization tracking within an active DL BWP without SS block. For example, TRS along with DL BWP configuration may be configured. For example, a DL BWP with SS block or TRS may be configured as a reference for synchronization tracking, which may be similar to the design of CSS monitoring when the BWP does not comprise a common CORESET.

In an example embodiment, SS-block based RRM measurements may be decoupled with BWP framework. For example, measurement configurations for each RRM and CSI feedback may be independently configured from bandwidth part configurations. CSI and SRS measurements/transmissions may be performed within the BWP framework.

In an example embodiment, for a MCS assignment of the first one or more DL data packets after active DL BWP switching, the network may assign robust MCS to a UE for the first one or more DL data packets based on RRM measurement reporting. In an example, for a MCS assignment of the first one or more DL data packets after active DL BWP switching, the network may signal to a UE by active DL BWP switching DCI to trigger aperiodic CSI measurement/reporting to speed up link adaptation convergence. For a UE, periodic CSI measurement outside the active BWP in a serving cell may not supported. For a UE, RRM measurement outside active BWP in a serving cell may be supported. For a UE, RRM measurement outside configured BWPs in a serving cell may be supported.

In an example embodiment, the RRM measurements may be performed on a SSB and/or CSI-RS. The RRM/RLM measurements may be independent of BWPs.

In an example embodiment, UE may not be configured with aperiodic CSI reports for non-active DL BWPs. For example, the CSI measurement may be obtained after the BW opening and the wide-band CQI of the previous BWP may be employed as starting point for the other BWP on the NW carrier.

In an example embodiment, UE may perform CSI measurements on the BWP before scheduling. For example, before scheduling on a new BWP, the gNB may intend to find the channel quality on the potential new BWPs before scheduling the user on that BWP. In this case, the UE may switch to a different BWP and measure channel quality on the BWP and then transmit the CSI report. There may be no scheduling needed for this case.

In an example embodiment, resource allocation for data transmission for a UE not capable of supporting the carrier bandwidth may be derived based on a two-step frequency-domain assignment process. In an example, a first step may indicate a bandwidth part, and a second step may indicate one or more PRBs within the bandwidth part.

In an example embodiment, One or multiple bandwidth part configurations for each component carrier may be semi-statically signalled to a UE. A bandwidth part may comprise a group of contiguous PRBs, wherein one or more reserved resources maybe be configured within the bandwidth part. The bandwidth of a bandwidth part may be equal to or be smaller than the maximal bandwidth capability supported by a UE. The bandwidth of a bandwidth part may be at least as large as the SS block bandwidth. The bandwidth part may or may not contain the SS block. A Configuration of a bandwidth part may comprise at least one of following properties: Numerology, Frequency location (e.g. center frequency), or Bandwidth (e.g. number of PRBs).

In an example embodiment, a bandwidth part may be associated with one or more numerologies, wherein the one or more numerologies may comprise sub-carrier spacing, CP type, or slot duration indication. In an example, an UE may expect at least one DL bandwidth part and at least one UL bandwidth part being active among a set of configured bandwidth parts for a given time instant. A UE may be assumed to receive/transmit within active DL/UL bandwidth part(s) using the associated numerology, for example, at least PDSCH and/or PDCCH for DL and PUCCH and/or PUSCH for UL, or combination thereof.

In an example, multiple bandwidth parts with same or different numerologies may be active for a UE simultaneously. The active multiple bandwidth parts may not imply that it is required for UE to support different numerologies at the same instance. The active DL/UL bandwidth part may not span a frequency range larger than the DL/UL bandwidth capability of the UE in a component carrier.

In an example embodiment, NR may support single and multiple SS block transmissions in wideband CC in the frequency domain. For example, for non-CA UE with a smaller BW capability and potentially for CA UE, NR may support a measurement gap for RRM measurement and potentially other purposes (e.g., path loss measurement for UL power control) using SS block (if it is agreed that there is no SS block in the active BW part(s)). UE may be informed of the presence/parameters of the SS block(s) and parameters necessary for RRM measurement via at least one of following: RMSI, other system information, and/or RRC signaling In an example embodiment, a maximum bandwidth for CORESET for RMSI scheduling and NR-PDSCH carrying RMSI may be equal to or smaller than a certain DL bandwidth of NR that one or more UEs may support in a frequency range. For example, at least for one RACH preamble format, the bandwidth may be equal to or smaller than a certain UL bandwidth of NR that one or more UEs may support in a frequency range. There may be other RACH preamble format with larger bandwidth than a certain bandwidth of NR that one or more UEs may support.

In an example embodiment, CORESET for RMSI scheduling and NR-PDSCH for RMSI may be confined within the BW of one NR-PBCH. In an example, CORESET for RMSI scheduling is confined within the BW of one NR-PBCH and NR-PDSCH for RMSI may not be confined within the BW of one NR-PBCH. In an example, CORESET for RMSI scheduling and NR-PDSCH for RMSI may not be confined within the BW of one NR-PBCH.

In an example embodiment, there may be one active DL BWP for a given time instant. For example, a configuration of a DL bandwidth part may comprise at least one CORESET. PDSCH and corresponding PDCCH (PDCCH carrying scheduling assignment for the PDSCH) may be transmitted within the same BWP if PDSCH transmission starts no later than K symbols after the end of the PDCCH transmission. In case of PDSCH transmission starting more than K symbols after the end of the corresponding PDCCH, PDCCH and PDSCH may be transmitted in different BWPs. The value of K may depend on at least one of following numerology or possibly reported UE retuning time. In an example, for the indication of active DL/UL bandwidth part(s) to a UE, DCI (explicitly and/or implicitly), MAC CE, Time pattern (e.g. DRX like) and/or combinations thereof may be considered.

In an example embodiment, NR may support switching between partial bands for SRS transmissions in a CC. For example, when an UE is not capable of simultaneous transmission in partial bands in a CC, RF retuning requirement for partial band switching may be considered, wherein the partial band may indicate a bandwidth part.

In an example embodiment, Common PRB indexing may be employed at least for DL BWP configuration in RRC connected state. For example, a reference point may be PRB 0, which may be common to one or more UEs sharing a wideband CC from network perspective, regardless of whether they are NB, CA, or WB UEs. In an example, an offset from PRB 0 to the lowest PRB of the SS block accessed by a UE may be configured by high layer signaling, e.g., via RMSI and/or UE-specific signaling. In an example, a common PRB indexing may be for maximum number of PRBs for a given numerology, wherein the common PRB indexing may be for RS generation for UE-specific PDSCH and/or may be for UL.

In an example embodiment, there may be an initial active DL/UL bandwidth part pair to be valid for a UE until the UE is explicitly (re)configured with bandwidth part(s) during or after RRC connection is established. For example, the initial active DL/UL bandwidth part may be confined within the UE minimum bandwidth for the given frequency band. NR may support activation/deactivation of DL and UL bandwidth part by explicit indication at least in DCI. MAC CE based approach may be employed for the activation/deactivation of DL and UL bandwidth part. In an example, NR may support an activation/deactivation of DL bandwidth part by means of timer for a UE to switch its active DL bandwidth part to a default DL bandwidth part. For example, a default DL bandwidth part may be the initial active DL bandwidth part defined above. The default DL bandwidth part may be reconfigured by the network.

In an example embodiment, when a UE performs measurement or transmit SRS outside of its active BWP, it may be considered as a measurement gap. For example, during the measurement gap, UE may not monitor CORESET.

In an example embodiment, a SRS transmission in an active UL BWP may employ the same numerology as that configured for that BWP. For example, for LTE SRS sequences, NR may support UE specific configured bandwidth based on tree-like SRS bandwidth sets (e.g., analogues to LTE). Parameters employed for configuring bandwidth allocation, e.g. whether or not CSRS and BSRS may be reused in a UE specific manner. For example, for LTE SRS sequences, NR may support to sound substantially all UL PRBs in a BWP.

In an example embodiment, a frequency-hopping for a PUCCH may occur within an active UL BWP for the UE, wherein there may be multiple active BWPs, and the active BWP may refer to BWP associated with the numerology of PUCCH In an example embodiment, for paired spectrum, gNB may configure DL and UL BWPs separately and independently for a UE-specific serving cell for a UE. For example, for active BWP switching using at least scheduling DCI, a DCI for DL may be employed for DL active BWP switching and a DCI for UL may be employed for UL active BWP switching. For example, NR may support a single DCI switching DL and UL BWP jointly.

In an example, embodiment, for unpaired spectrum, gNB may jointly configure a DL BWP and an UL BWP as a pair, with the restriction that the DL and UL BWPs of a DL/UL BWP pair may share the same center frequency but may be of different bandwidths for a UE-specific serving cell for a UE. For example, for active BWP switching using at least scheduling DCI, a DCI for either DL or UL may be employed for active BWP switching from one DL/UL BWP pair to another pair. This may apply to at least the case where both DL & UL are activated to a UE in the corresponding unpaired spectrum. In an example, there may not be a restriction on DL BWP and UL BWP pairing.

In an example embodiment, for a UE, a configured DL (or UL) BWP may overlap in frequency domain with another configured DL (or UL) BWP in a serving cell.

In an example embodiment, for a serving cell, a maximal number of DL/UL BWP configurations may be for paired spectrum, for example, 4 DL BWPs and 4 UL BWPs. In an example, a maximal number of DL/UL BWP configurations may be for unpaired spectrum, for example, 4 DL/UL BWP pairs. In an example, a maximal number of DL/UL BWP configurations may be for SUL, for example, 4 UL BWPs.

In an example embodiment, for paired spectrum, NR may support a dedicated timer for timer-based active DL BWP switching to the default DL BWP. For example, a UE may start the timer when it switches its active DL BWP to a DL BWP other than the default DL BWP. In an example, a UE may restart the timer to the initial value when it successfully decodes a DCI to schedule PDSCH(s) in its active DL BWP. For example, a UE may switch its active DL BWP to the default DL BWP when the timer expires.

In an example embodiment, for unpaired spectrum, NR may support a dedicated timer for timer-based active DL/UL BWP pair switching to the default DL/UL BWP pair. For example, a UE may start the timer when it switches its active DL/UL BWP pair to a DL/UL BWP pair other than the default DL/UL BWP pair. For example, a UE may restart the timer to the initial value when it successfully decodes a DCI to schedule PDSCH(s) in its active DL/UL BWP pair. In an example, a UE may switch its active DL/UL BWP pair to the default DL/UL BWP pair when the timer expires.

In an example embodiment, for an Scell, RRC signaling for Scell configuration/reconfiguration may indicate a first active DL BWP and/or a first active UL BWP when the Scell is activated. In an example, NR may support a Scell activation signaling that doesn't contain any information related to the first active DL/UL BWP. In an example, for an Scell, an active DL BWP and/or UL BWP may be deactivated when the Scell is deactivated. In an example, the Scell may be deactivated by an Scell deactivation timer.

In an example embodiment, for an Scell, a UE may be configured with at least one of following: a timer for timer-based active DL BWP (or DL/UL BWP pair) switching, and/or a default DL BWP (or the default DL/UL BWP pair) which may be employed when the timer is expired, wherein the default DL BWP may be different from the first active DL BWP.

In an example, for Pcell, a default DL BWP (or DL/UL BWP pair) may be configured/reconfigured to a UE. In an example, if no default DL BWP is configured, the default DL BWP may be an initial active DL BWP.

In an example embodiment, in a serving cell where PUCCH is configured, a configured UL BWP may comprise PUCCH resources.

In an example embodiment, for a UE in Pcell, a common search space for at least RACH procedure may be configured in one or more BWPs. For example, for a UE in a serving cell, a common search space for group-common PDCCH (e.g. SFI, pre-emption indication, etc.) may be configured in one or more BWPs In an example embodiment, a DL (or UL) BWP may be configured to a UE by resource allocation Type 1 with 1PRB granularity of starting frequency location and 1PRB granularity of bandwidth size, wherein the granularity may not imply that a UE may adapt its RF channel bandwidth accordingly.

In an example embodiment, for a UE, DCI format size itself may not be a part of RRC configuration irrespective of BWP activation & deactivation in a serving cell. For example, the DCI format size may depend on different operations and/or configurations (if any) of different information fields in the DCI.

In an example embodiment, an initial active DL BWP may be defined as frequency location and bandwidth of RMSI CORESET and numerology of RMSI, wherein PDSCH delivering RMSI may be confined within the initial active DL BWP.

In an example embodiment, a UE may be configured with PRB bundling size(s) per BWP.

In an example embodiment, NR may support configuring CSI-RS resource on BWP with a transmission BW equal to or smaller than the BWP. For example, when the CSI-RS BW is smaller than the BWP, NR may support at least the case that CSI-RS spans contiguous RBs in the granularity of N RBs. When CSI-RS BW is smaller than the corresponding BWP, it may be at least larger than X RBs, wherein value of X is predefined. For example, the value of X may be the same or different for beam management and CSI acquisition. For example, the value of X may or may not be numerology-dependent.

In an example embodiment, for a UE with a RRC connected mode, RRC signalling may support to configure one or more BWPs (both for DL BWP and UL BWP) for a serving cell (PCell, PSCell). For example, RRC signalling may support to configure 0, 1 or more BWPs (both for DL BWP and UL BWP) for a serving cell SCell (at least 1 DL BWP). In an example, for a UE, the PCell, PSCell and each SCell may have a single associated SSB in frequency. A cell defining SS block may be changed by synchronous reconfiguration for PCell/PSCell and SCell release/add for the SCell. For example, a SS block frequency which needs to be measured by the UE may be configured as individual measurement object (e.g., one measurement object corresponds to a single SS block frequency). the cell defining SS block may be considered as the time reference of the serving cell, and for RRM serving cell measurements based on SSB, for example, irrespective of which BWP is activated.

In an example, embodiment, one or more RRC timers and counters related to RLM may not be reset when the active BWP is changed.

In an example embodiment, an SR configuration may comprise a collection of sets of PUCCH resources across different BWPs and cells, wherein per cell, at any given time there may be at most one usable PUCCH resource per LCH, and/or this may be applicable to the case of one single LTE-like set of SR PUCCH resources being configured per LCH per BWP, and one BWP being active at a time.

In an example embodiment, BWP switching and cell activation/deactivation may not interfere with the operation of the counter and timer. For example, when a BWP is deactivated, the UE may or may not stop using configured downlink assignments and/or configured uplink grants using resources of the BWP. In an example, the UE may suspend the configured grants of the or clear it. In an example, the UE may not suspend the configured grants of the or may not clears it.

In an example embodiment, a new timer (BWP inactivity timer) may be employed to switch active BWP to default BWP after a certain inactive time. The BWP inactivity timer may be independent from the DRX timers.

In an example embodiment, on the BWP that is deactivated, UE may not transmit on UL-SCH on the BWP. In an example, on the BWP that is deactivated, UE may not monitor the PDCCH on the BWP. In an example, on the BWP that is deactivated, UE may not transmit PUCCH on the BWP. In an example, on the BWP that is deactivated, UE may not transmit on PRACH on the BWP. In an example, on the BWP that is deactivated, UE may not flush HARQ buffers when doing BWP switching.

In an example embodiment, for FDD, gNB may configure separate sets of bandwidth part (BWP) configurations for DL & UL per component carrier. In an example, a numerology of DL BWP configuration may be applied to at least PDCCH, PDSCH & corresponding DMRS. A numerology of UL BWP configuration may be applied to at least PUCCH, PUSCH & corresponding DMRS. In an example, for TDD, gNB may configure separate sets of BWP configurations for DL & UL per component carrier. In an example, a numerology of DL BWP configuration is applied to at least PDCCH, PDSCH & corresponding DMRS. A numerology of UL BWP configuration is applied to at least PUCCH, PUSCH & corresponding DMRS. For example, when different active DL and UL BWPs are configured, UE may not retune the center frequency of channel BW between DL and UL.

In an example, a plurality of scheduling request (SR) configurations may be configured for a bandwidth part (BWP) of a cell for a wireless device. In an example, a wireless device may use SR resources configured by a SR resource in the plurality of SR configurations in a BWP to indicate to the base station the numerology/TTI/service type of a logical channel (LCH) or logical channel group (LCG) that triggered the SR. In an example, the maximum number of SR configurations may be the maximum number of logical channels/logical channel groups.

In an example, there may be at most one active DL BWP and at most one active UL BWP at a given time for a serving cell. A BWP of a cell may be configured with a specific numerology/TTI. In an example, a logical channel and/or logical channel group that triggers SR transmission while the wireless device operates in one active BWP, the corresponding SR may remain triggered in response to BWP switching.

In an example, the logical channel and/or logical channel group to SR configuration mapping may be (re)configured in response to switching of the active BWP. In an example, when the active BWP is switched, the RRC dedicated signalling may (re-)configure the logical channel and/or logical channel group to SR configuration mapping on the new active BWP.

In an example, mapping between the logical channel and/or logical channel group to SR configuration may be configured when BWP is configured. RRC may pre-configure mapping between logical channel and/or logical channel group to SR configurations for all the configured BWPs. In response to the switching of the active BWP, the wireless device may employ the RRC configured mapping relationship for the new BWP. In an example, when BWP is configured, RRC may configure the mapping between logical channel and SR configurations for the BWP.

In an example, sr-ProhibitTimer and SR_COUNTER corresponding to a SR configuration may continue and the value of the sr-ProhibitTimer and the value of the SR_COUNTER may be their values before the BWP switching.

In an example, a plurality of logical channel/logical channel group to SR-configuration mappings may be configured in a serving cell. A logical channel/logical channel group may be configured to be mapped to at most one SR configuration per Bandwidth Part. In an example, a logical channel/logical channel group configured to be mapped onto multiple SR configurations in a serving cell may have one SR configuration active at a time, e.g., that of the active BWP. In an example, a plurality of logical channel/logical channel group to SR-configuration mappings may be supported in carrier aggregation (CA). A logical channel/logical channel group may be configured to be mapped to one (or more) SR configuration(s) in each of both PCell and PUCCH-SCell. In an example, in CA, a logical channel/logical channel group configured to be mapped to one (or more) SR configuration(s) in each of both PCell and PUCCH-SCell may have two active SR configurations (one on PCell and one on PUCCH-SCell) at a time. In an example, The SR resource which comes first may be used.

In an example, a base station may configure one SR resource per BWP for the same logical channel/logical channel group. If a SR for one logical channel/logical channel group is pending, it may be possible for UE to transmit SR with the SR configuration in another BWP after BWP switching. In an example, the sr-ProhibitTimer and SR_COUNTER for the SR corresponding to the logical channel/logical channel group may continue in response to BWP swithing. In an example, when a SR for one logical channel/logical channel group is pending, the UE may transmit the SR in another SR configuration corresponding to the logical channel/logical channel group in another BWP after BWP switching.

In an example, if multiple SRs for logical channels/logical channel groups mapped to different SR configurations are triggered, the UE may transmit one SR corresponding to the highest priority logical channel/logical channel group. In an example, the UE may transmit multiple SRs with different SR configurations. In an example, SRs triggered at the same time (e.g., in the same NR-UNIT) by different logical channels/logical channel groups mapped to different SR configurations may be merged into a single SR corresponding to the SR triggered by the highest priority logical channel/logical channel group.

In an example, when an SR of a first SR configuration is triggered by a first logical channel/logical channel group while an SR procedure triggered by a lower priority logical channel/logical channel group is on-going on another SR configuration, the later SR may be allowed to trigger another SR procedure on its own SR configuration, independently of the other on-going SR procedure. In an example, a UE may be allowed to send triggered SRs for logical channels/logical channel groups mapped to different SR configurations independently. In an example, UE may be allowed to send triggered SRs for LCHs corresponding to different SR configurations independently.

In an example, dsr-TransMax may be independently configured per SR configuration. In an example, SR_COUNTER may be maintained for each SR configuration independently. In an example, a common SR_COUNTER may be maintained for all the SR configurations per BWP.

In an example, PUCCH resources may be configured per BWP. The PUCCH resources in the currently active BWP may be used for UCI transmission. In an example, PUCCH resource may be configured per BWP. In an example, it may be necessary to use PUCCH resources in a BWP not currently active for UCI transmission. In an example, PUCCH resources may be configured in a default BWP and BWP switching may be necessary for PUCCH transmission. In an example, a UE may be allowed to send SR1 in BWP1, even though BWP1 is no longer active. In an example, the network may reconfigure (e.g., pre-configure) the SR resources so that both SR1 and SR2 may be supported in the active BWP. In an example, an anchor BWP may be used for SR configuration. In an example, the UE may send SR2 as "fallback".

In an example, a logical channel/logical channel group mapped to a SR configuration in an active BWP may also be mapped to the SR configuration in another BWP to imply same or different information (e.g., numerology/TTI and priority).

In an example, a MAC entity can be configured with a plurality of SR configurations within the same BWP. In an example, the plurality of the SR configurations may be on the same BWP, on different BWPs, or on different carriers. In an example, the numerology of the SR transmission may not be the same as the numerology that the logical channel/logical channel group that triggered the SR is mapped to.

In an example, for a LCH mapped to multiple SR configurations, the PUCCH resources for transmission of the SR may be on different BWPs or different carriers. In an example, if multiple SRs are triggered, the selection of which configured SR configuration within the active BWP to transmit one SR may be up to UE implementation.

In an example, a single BWP can support multiple SR configurations. In an example, multiple sr-ProhibitTimers (e.g., each for one SR configuration) may be running at the same time. In an example, drs-TransMax may be independently configured per SR configuration. In an example, SR_COUNTER may be maintained for each SR configuration independently.

In an example, a single logical channel/logical channel group may be mapped to zero or one SR configuration. In an example, PUCCH resource configuration may be associated with a UL BWP. In an example, in CA, one logical channel may be mapped to none or one SR configuration per BWP.

In an example, the bandwidth part (BWP) may consist of a group of contiguous PRBs in the frequency domain. The parameters for each BWP configuration may include numerology, frequency location, bandwidth size (e.g., in terms of PRBs), CORESET (e.g., required for each BWP configuration in case of single active DL bandwidth part for a given time instant). In an example, one or multiple BWPs may be configured for each component carrier when the UE is in RRC connected mode.

In an example, when a new BWP is activated, the configured downlink assignment may be initialized (if not active) or re-initialized (if already active) using PDCCH.

In an example, for uplink SPS, the UE may have to initialize or re-initialize the configured uplink grant when switching from one BWP to anther BWP. When a new BWP is activated, the configured uplink grant may be initialized (if not active) or re-initialized (if already active) using PDCCH.

In an example, for type 1 uplink data transmission without grant, there may be no L1 signalling to initialize or re-initialize the configured grant. The UE may not assume the type 1 configured uplink grant is active when the BWP is switched even if it's already active in the previous BWP. The type 1 configured uplink grant may be re-configured using RRC dedicated signalling when the BWP is switched. In an example, when a new BWP is activated, the type 1 configured uplink grant may be re-configured using dedicated RRC signalling.

In an example, if SPS is configured on the resources of a BWP and that BWP is subsequently deactivated, the SPS grants or assignments may not continue. In an example, when a BWP is deactivated, all configured downlink assignments and configured uplink grants using resources of this BWP may be cleared.

In an example, the MAC entity may clear the configured downlink assignment or/and uplink grants upon receiving activation/deactivation of BWP.

In an example, the unit of drx-RetransmissionTimer and drx-ULRetransmissionTimer may be OFDM symbol corresponding to the numerology of the active BWP.

In an example, if a UE is monitoring an active DL BWP for a long time without activity, the UE may move to default BWP for power saving. In an example, a BWP inactivity timer may be introduced to switch active BWP to default BWP after a certain inactive time.

In an example, autonomous switching to DL default BWP may consider both DL BWP inactivity timer and/or DRX timers (e.g., HARQ RTT and DRX retransmission timers). In an example, DL BWP inactivity timer may be configured per MAC entity. In an example, a UE may be configured to monitor PDCCH in a default BWP at least when UE uses long DRX cycle.

In an example, PHR may not be triggered due to the switching of BWP. In an example, the support of multiple numerologies/BWPs may not impact PHR triggers. In an example, PHR may be triggered upon BWP activation. In an example, a prohibit timer may start upon PHR triggering due to BWP switching. PHR may not be triggered due to BWP switching while the prohibit timer is running. In an example, PHR may be reported per activated/deactivated BWP.

In an example, PDCP duplication may be in an activated state while the UE receives the BWP deactivation command. In an example, when the BWP which the PDCP duplication is operated on is deactivated, the PDCP duplication may not be deactivated, but the PDCP entity may stop sending the data to the deactivated RLC buffer.

In an example, RRC signalling may configure one BWP to be activated when the SCell is activated. Activation/deactivation MAC CE may be used to activate both the SCell and the configured BWP. In an example, one HARQ entity can serve different BWP within one carrier.

In an example, for a UE-specific serving cell, one or more DL BWPs and one or more UL BWPs may be configured by dedicated RRC for a UE. In an example, a single scheduling DCI may switch the UE's active BWP from one to another. In an example, an active DL BWP may be deactivated by means of timer for a UE to switch its active DL bandwidth part to a default DL bandwidth part.

In an example, narrower BWP may be used for DL control monitoring and wider BWP may be used for scheduled data. In an example, small data may be allowed in narrower BWP without triggering BWP switching.

In an example embodiment, a wireless device may receive one or more messages comprising one or more radio resource control (RRC) messages. The one or more RRC messages may comprise configuration parameters for one or more cells. The one or more cells may comprise a first cell. In an example, the first cell may be a primary cell. In an example, the first cell may be a secondary cell. In an example, the first cell may be a secondary cell configured with PUCCH resources. The one or more messages may configure a plurality of bandwidth parts (BWPs) for one or more cells in the one or more cells configured for the wireless device. In an example, a wireless device may be configured with a DL BWP and an UL BWP to form a DL/UL BWP pair on a cell. A wireless device may be configured with a plurality of DL/UL BWPs in a cell. In an example, for paired spectrum, the DL and UL BWPs may be configured separately and independently for a serving cell. In an example, for unpaired spectrum, a DL BWP and an UL BWP may be jointly configured as a pair. The DL BWP and the UL BWP of a DL/UL BWP pair may share the same center frequency. In an example, the DL BWP and the UL BWP of a DL/UL BWP in a serving cell may be have different bandwidths. A bandwidth part may comprise a plurality of frequency resources, e.g., resource blocks (e.g., contiguous resource blocks) within a cell. Two or more DL (or UL) BWPs configured for a cell may overlap in frequency domain. In an example, for paired spectrum up to four DL BWPs and up to four UL BWPs may be configured for a cell. For unpaired spectrum, up to four DL/UL BWP pair may be configured for a cell. In an example, at a given time, one BWP may be active within a cell. In an example, two or more BWPs may be active in a cell at a given time.

The plurality of bandwidth parts of a cell may comprise a default bandwidth part and a first/initial active bandwidth part. The first/initial active bandwidth part of a SCell may indicate the BWP that is activated in response to the SCell activation (e.g., in response to receiving a MAC CE activating the SCell). The default BWP may indicate a BWP that the wireless device switches to, from an active BWP, in response to inactivity on the active BWP (e.g., in response to a BWP inactivity timer expiring). In an example, for a secondary cell, RRC signaling for SCell configuration/reconfiguration may indicate the first active DL BWP and/or the first active UL BWP when the SCell is activated. In an example, the SCell activation signaling may not contain information related to a first active DL/UL BWP. In an example, for an SCell, active DL BWP and/or UL BWP may be deactivated in response to the SCell being deactivated.

In an example, a base station may configure BWPs on a cell for a wireless device considering the wireless device capabilities. The wireless device may transmit a capability message (e.g., using RRC), comprising/indicating bandwidth capabilities of the wireless device, to the base station, and the base station may configure bandwidth parts for a cell considering the wireless device bandwidth capabilities. In an example, the one or more RRC messages may configure a first BWP and a second BWP for the first cell in the one or more configured cells. In an example, a BWP of a cell may correspond to a transmission time interval (TTI)/numerology. The TTI/numerology of a BWP may indicate what logical channels/data/service types may be transmitted via the BWP. The first BWP of the first cell may correspond to a first TTI/numerology and the second BWP of the first cell may correspond to a second TTI/numerology.

In an example, a wireless device may be configured (e.g., using RRC configuration) with a BWP inactivity timer. The wireless device may switch from an active BWP of a cell to a default BWP of the cell in response to the BWP inactivity timer expiring. The default BWP of a cell may be configured via RRC. The wireless device may (re)start the BWP inactivity timer in response to activity on the active BWP. The activity may be in form receiving an uplink scheduling and/or downlink assignment DCI on and/or for the active BWP. In an example, receiving other DCIs and or receiving/transmitting other signals and/or other activities may (re)start the BWP inactivity timer.

In an example, for paired spectrum, the wireless device may start the inactivity timer in response to switching from its active DL BWP to a DL BWP other than the default BWP. The wireless device may restart the timer to the initial value in response to successfully decoding a DCI to schedule PDSCH(s) in its active DL BWP. In an example, the initial BWP inactivity timer value may be RRC configured. In an example, one timer value may be used for BWP switching. In an example, a plurality of timer values may be configured, for example for different BWPs, for example based on TTI/numerology of the BWPs. The wireless device may switch its active DL BWP to the default DL BWP in response to the timer expiring. In an example, for unpaired spectrum, the wireless device may start the timer in response to switching from its active DL/UL BWP pair to a DL/UL BWP pair other than the default DL/UL BWP pair. The wireless device may restart the timer to the initial value in response to successfully decoding PDSCH(s) in its active DL/UL BWP pair. The wireless device may switch its active DL/UL BWP pair to the default DL/UL BWP pair in response to the timer expiring.

In an example embodiment, the BWP inactivity timer may expire when as much as K times the time granularity of the BWP inactivity timer elapses. The value of K may be RRC configured.

In an example, in a serving cell that PUCCH is configured, each UL BWP may be configured with PUCCH resources.

In an example, for a wireless device common search space in PCell for at least RACH procedure may be configured in each BWP. In an example, for a wireless device common search space for group common PDCCH (e.g., SFI, preemption indication, etc.) may be configured in each BWP.

In an example, a DL (or UL) BWP may be configured for a wireless device by resource allocation Type 1 with a granularity of one PRB for starting frequency location and granularity of one PRB for bandwidth size.

In an example, resources with a TTI/numerology may be used for transmission of transport blocks comprising logical channels that are mappable to the TTI/numerology. In an example, the one or more RRC messages may comprise configuration parameters for one or more logical channels. In an example, the configuration parameters may indicate that one or more logical channels belong to a logical channel group. The configuration parameters may indicate whether a logical channel and/or a logical channel group may be mapped to and/or may use resources with a TTI/numerology. In an example, the configuration parameters may indicate what one or more TTI/numerology a logical channel and/or logical channel group may be mapped to. In an example, a logical channel and/or logical channel group may be mapped to zero or one SR configuration. The one or more RRC messages may indicate the mapping between a logical channel/logical channel group to a SR configuration. The wireless device may utilize SR resources configured for a SR configuration in response to the SR being triggered due to data becoming available for a logical channel/logical channel group corresponding to the SR configuration. In an example, PCell (e.g., one or more BWPs of PCell) may be configured with PUCCH and/or SR configurations/resources. In an example, PCell (e.g., one or more BWPs of PCell) and one or more SCells (e.g., one or more BWPs of the one or more SCells) may be configured with PUCCH and/or SR configurations/resources.

In an example, the one or more RRC messages may comprise configuration parameters for scheduling request (SR). The SR configuration parameters may comprise configuration parameters for a plurality of SR configurations. A SR configuration in the plurality of SR configurations may correspond to one or more logical channels and/or logical channel groups. A SR configuration may indicate resources for transmission of SR. The SR resources may be PUCCH resources. In an example, a SR configuration may indicate a SR configuration index. The SR configuration index may indicate a periodicity and an offset value. The periodicity and offset values may indicate the SR PUCCH resources corresponding to the SR configuration. The resources indicated by a SR configuration may be used for transmission of SR signal in response to SR being triggered due to data becoming available to a logical channel/logical channel group corresponding to the SR configuration. In an example, the logical channel configuration parameters may indicate whether a logical channel is mapped to a SR configuration or not. In an example, the logical channel configuration parameters may indicate which SR configuration a logical channel is mapped to. A logical channel may be mapped to zero or one SR configuration. In an example, a SR configuration may indicate which one or more logical channels are mapped to it. In an example, a SR configuration (e.g., a fall back SR configuration) may be used for transmission of SR due to data becoming available to any logical channel/logical channel group. In an example, the one or more RRC messages may comprise SR configurations and may indicate SR resources for one or more bandwidth parts in the plurality of bandwidth parts configured for a cell. In an example, one or more first SR configurations may be configured for a first bandwidth part and one or more second SR configurations may be configured for a second bandwidth part of the cell. In an example, the one or more first SR configurations may be different from the one or more second SR configurations. In an example, a bandwidth part in the plurality of bandwidth parts may not be configured with a SR configuration and/or SR resources.

In an example, the one or more RRC messages may comprise configuration parameters for random access. In an example, the one or more RRC messages may comprise random access configuration parameters for one or more bandwidth parts (BWPs) of a cell. In an example, one or more BWPs in the plurality of BWPs may be configured with random access channel (RACH) resources. In an example, the one or more RRC messages may comprise a PRACH configuration index and/or other parameters for a random access configuration. The PRACH configuration index and/or other parameters may indicate PRACH resources for the random access configuration. In an example, a same PRACH configuration index may be used for the first BWP and the second BWP of the first cell. In an example, the PRACH configuration index for the first BWP may be different from the PRACH configuration index for the second BWP. In an example, if random access is configured for a serving cell, all BWPs configured for the serving cell may be configured with RACH resources. In an example, one or more first BWP of a serving cell may be configured and one or more second BWP of the serving cell may not be configured with RACH resources.

In an example, a random access process on a cell may be independent of the active BWP of the cell. If a random access process is started on a first BWP of the cell, the random access process may continue on a second BWP in response to the wireless device switching from the first BWP to the second BWP. In an example, a wireless device may start a contention-free random access process in response to a PDCCH order or may start a contention-based random access on a first BWP of the first cell. The wireless device may switch from the first BWP to a second BWP of the first cell in response to a DCI or in response to a BWP inactivity timer expiring (e.g., the second BWP may be a default BWP). In an example, the same PRACH configuration index that was used for transmission of a preamble in the first BWP may be used for transmission of preamble in the second BWP.

In an example, the wireless device may trigger scheduling request due to data becoming available for a first logical channel/logical channel group. The wireless device may operate on the first BWP of the first cell as the active BWP when the SR is triggered. In an example, the wireless device may operate on the first BWP of the primary cell. In an example, the wireless device may operate on a first BWP of a SCell configured with PUCCH/SR resources. The wireless device may start a random access procedure in response to a valid SR resource, corresponding to the first logical channel (and/or logical channel group comprising the first logical channel) not being available on the first BWP. The wireless device may switch from the first BWP to the second BWP. In an example, the wireless device may have transmitted a random access preamble before the BWP switching. In an example, the wireless device may have started the random access process but may have not transmitted a random access preamble before the BWP switching.

In an example, the wireless device may switch from the first BWP of the first cell to a second BWP of the first cell. The first BWP may comprise a first DL BWP and a corresponding first uplink BWP. In an example, a DCI for DL (e.g., DL BWP) may be used for switching active DL BWP and a DCI for UL (e.g., UL BWP) may be used for switching UL active BWP. In an example, a single DCI may switch DL and UL BWP jointly (e.g., from the first DL/UL BWP pair to a second DL/UL BWP pair).

In an example embodiment, the switching from the first BWP/BWP pair to the second BWP/BWP pair may be in response to receiving a DCI indicating the switching. The DCI may comprise a field indicating an identifier of the second BWP/BWP pair. In an example, the field may comprise two bits indicating an identifier for the second BWP/BWP pair. The two-bit identifier may indicate one of k (e.g., four) possible BWPs/BWP pairs. In an example, the switching may be in response to expiration of a timer. The timer may be a BWP inactivity timer and the second BWP may be a default BWP.

Figure 15:
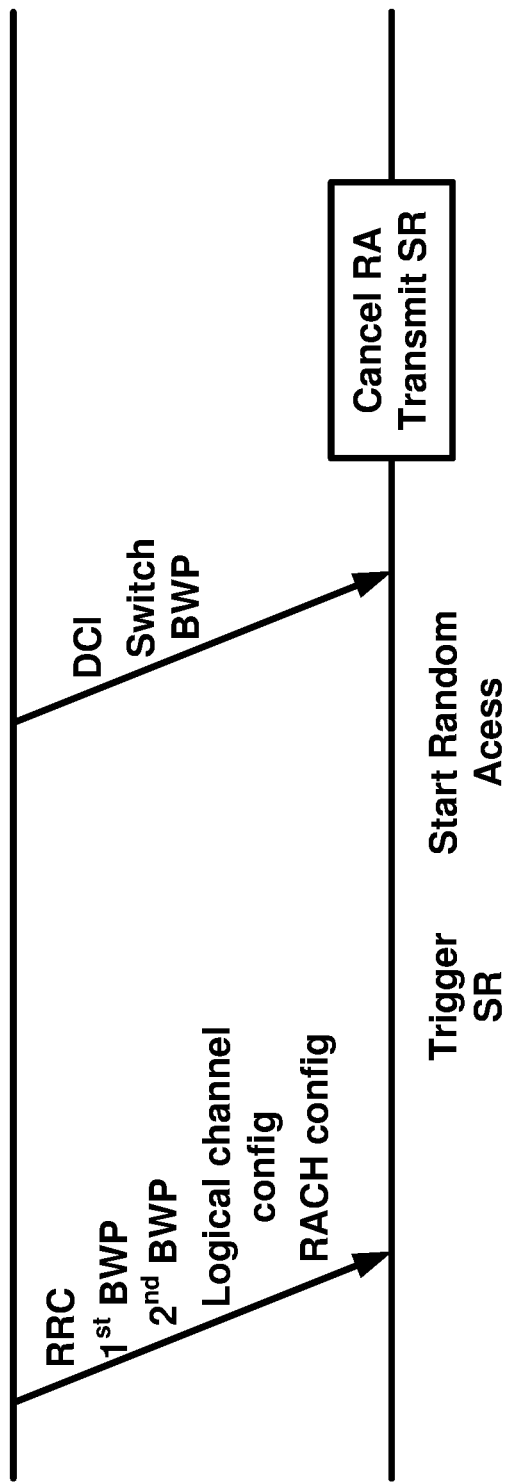
FIG. 15 is an example random access and scheduling request procedure as per an aspect of an embodiment of the present invention.

In an example embodiment, the first BWP may not comprise valid SR resource corresponding to the first logical channel (and/or logical channel group comprising the first logical channel) leading to the wireless device starting a random access process. The second BWP may comprise valid SR resource corresponding to the first logical channel (and/or logical channel group comprising the first logical channel). In response to the second BWP comprising valid SR resource corresponding to the first logical channel (and/or logical channel group comprising the first logical channel), the wireless device may cancel the random access process that was started while the wireless device operated on the first BWP. An example procedure is shown in FIG. 15. In an example, in response to the second BWP comprising valid SR resource corresponding to the first logical channel (and/or logical channel group comprising the first logical channel), the wireless device may cancel the random access process that was started while the wireless device operated on the first BWP and may transmit a SR signal via the valid SR resource in the second BWP.

In an example embodiment, the first BWP may not comprise valid SR resource corresponding to the first logical channel (and/or logical channel group comprising the first logical channel) and the second BWP may comprise valid SR resource corresponding to the first logical channel (and/or logical channel group comprising the first logical channel). An example procedure is shown in FIG. 15. In an example, in response to the second BWP comprising valid SR resource corresponding to the first logical channel (and/ or logical channel group comprising the first logical channel), the wireless device may cancel the random access process that was started while the wireless device operated on the first BWP. In an example, in response to the second BWP comprising valid SR resource corresponding to the first logical channel (and/or logical channel group comprising the first logical channel) and the first logical channel/logical channel group corresponding to a first service type (e.g., URLLC), the wireless device may cancel the random access process that was started while the wireless device operated on the first BWP. In an example, in response to the second BWP comprising valid SR resource corresponding to the first logical channel (and/or logical channel group comprising the first logical channel) and the valid SR resource occurring earlier than a RACH resource on the second BWP, the wireless device may cancel the random access process that was started while the wireless device operated on the first BWP and may transmit a SR signal via the valid SR resource in the second BWP. In an example, in response to the second BWP comprising valid SR resource corresponding to the first logical channel (and/or logical channel group comprising the first logical channel) and the valid SR resource occurring on and/or earlier than a threshold time before the RACH resource on the second BWP, the wireless device may cancel the random access process that was started while the wireless device operated on the first BWP and may transmit a SR signal via the valid SR resource in the second BWP. In an example, the value of the threshold may be configurable. In an example, the one or more RRC messages may indicate the value of the threshold. In an example, the value of the threshold may be pre-configured.

A cell of a wireless device may be configured with a plurality of bandwidth parts. For example, a cell of the wireless device may be configured with physical uplink control channel resources for its bandwidth parts. The physical uplink control channel resources may comprise scheduling request resources. The scheduling request resources of a scheduling request configuration may be applicable to one or more logical channels. The wireless device may start a random access process if there is no scheduling request resource configured for the logical channel that triggered a scheduling request and the random access is continued even if the wireless device switches its bandwidth part after the random access process is started. The legacy procedures lead to long delay for the wireless device before it is allocated resources useful for transmission of the logical channel. Example embodiments enhance the scheduling request and random access process when the wireless device receives a command for bandwidth part switching.

Figure 16:
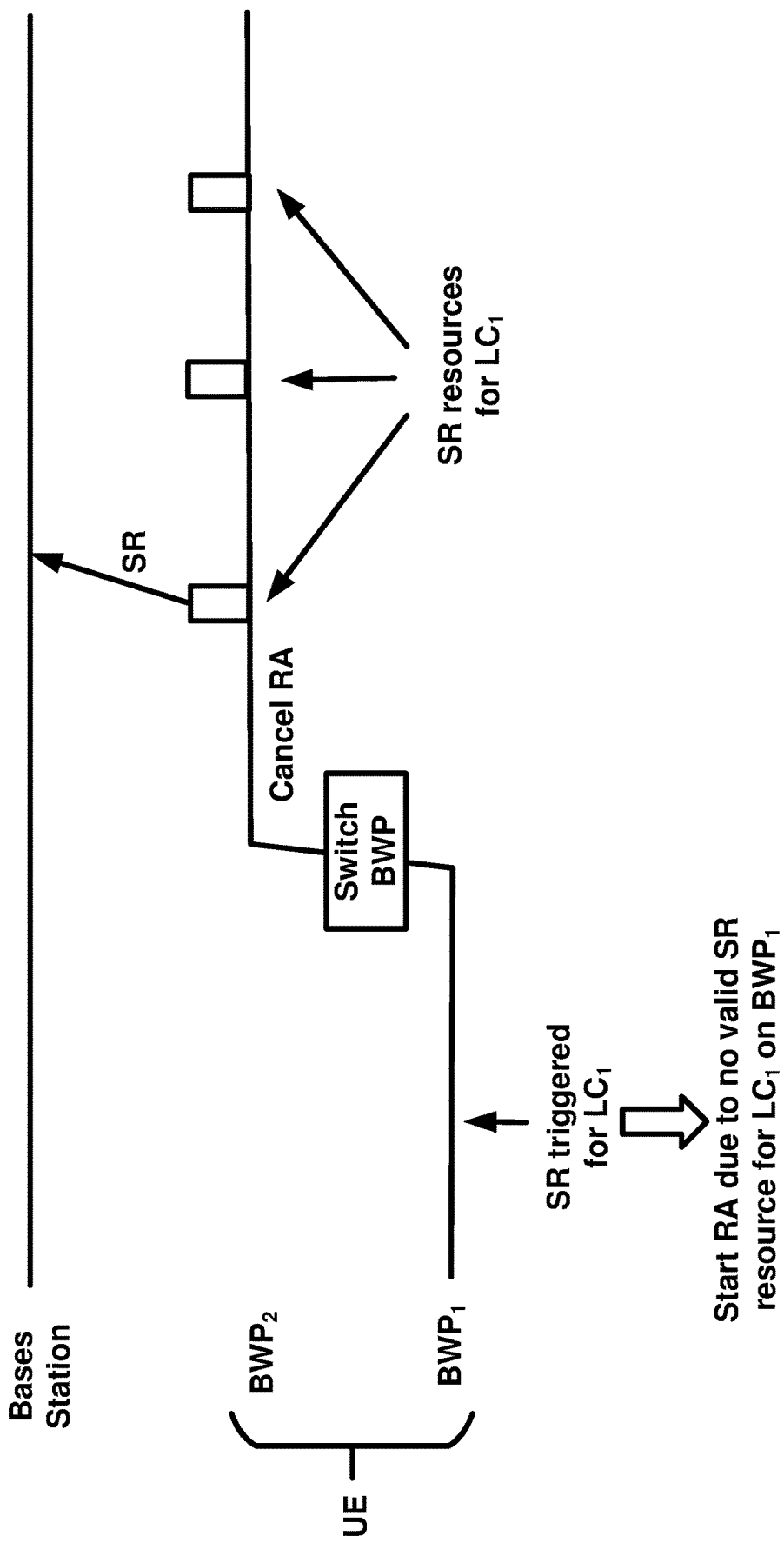
FIG. 16 is an example random access and scheduling request procedure as per an aspect of an embodiment of the present invention.

In an example, embodiment and as shown in FIG. 16, a wireless device may receive one or more messages comprising configuration parameters. In an example, the one or more messages may comprise one or more radio resource control (RRC) messages.

In an example, the one or more messages may comprise first configuration parameters of a first bandwidth part. The first configuration parameters of the first bandwidth part may indicate frequency domain and location of the first bandwidth part, e.g., the PRBs corresponding to the first bandwidth part. The first configuration parameters of the first bandwidth part may indicate a first numerology of the first bandwidth part. The first numerology of the first bandwidth part may indicate a subcarrier spacing and a cyclic prefix corresponding to the first numerology. In an example, the first configuration parameters of the first bandwidth part may indicate an identifier for the first bandwidth part. The first configuration parameters of the first bandwidth may comprise configuration parameters of physical uplink control channel and/or random access channel and/or physical uplink shared channel and/or sounding reference signal and/or other signals and channels for the first bandwidth part.

In an example, the one or more messages may comprise second configuration parameters of a second bandwidth part. The second configuration parameters of the second bandwidth part may indicate frequency domain and location of the second bandwidth part, e.g., the PRBs corresponding to the second bandwidth part. The second configuration parameters of the second bandwidth part may indicate a second numerology of the second bandwidth part. The second numerology of the second bandwidth part may indicate a subcarrier spacing and a cyclic prefix corresponding to the second numerology. In an example, the second configuration parameters of the second bandwidth part may indicate an identifier for the second bandwidth part. The second configuration parameters of the second bandwidth may comprise configuration parameters of physical uplink control channel and/or random access channel and/or physical uplink shared channel and/or sounding reference signal and/or other signals and channels for the second bandwidth part.

The second configuration parameters of the second bandwidth part may indicate a scheduling request configuration indicating a scheduling request resource for a logical channel. The scheduling request configuration parameters may comprise one or more timer (e.g., prohibit timer, etc.) or counter values (e.g., maximum scheduling request transmissions). In an example, the scheduling request configuration parameters may indicate a periodicity parameter and/or offset parameter and/or priority and offset parameter and/or physical uplink control channel resources for transmission of scheduling request. The scheduling request configuration parameters may comprise an identifier/index for the scheduling request configuration. In an example, the configuration parameters of the logical channel may comprise the identifier/index of the scheduling request.

In an example, the first bandwidth part and the second bandwidth part may be for a cell of the wireless device. In an example, the cell of the wireless device may be a primary cell. In an example, the cell may be a secondary cell with physical uplink control channel (e.g., PUCCH SCell). In an example, the first bandwidth part may be for a first cell and the second bandwidth part may be for a second cell. In an example, the first cell may be one of a PCell/PSCell or a PUCCH SCell. In an example, the second cell may be one of a PCell/PSCell or a PUCCH SCell.

The wireless device may trigger a scheduling request in response to data becoming available for the logical channel. In an example, the wireless device may trigger the scheduling request in response to triggering a buffer status report and no resource (and/or uplink grant) being available for transmission of the buffer status report. The buffer status report may be triggered in response to data becoming available to the logical channel.

In an example, the one or more messages may comprise random access configuration parameters. The random access configuration parameters may indicate random access channel (RACH) resources for transmission of random access preambles.

The wireless device may start a random access process in response to a valid scheduling request for the logical channel not being available on the first bandwidth part. In an example, the random access process may be a contention based random access process. The wireless device may transmit zero or more random access preambles in response to starting the random access process.

In an example, the wireless device may receive a downlink control information indicating switching from the first bandwidth part to the second bandwidth part. In an example, the wireless device may receive the downlink control information after starting the random access process. In an example, the wireless device may receive the downlink control information after starting the random access process and after transmitting one or more random access preambles. In an example, the wireless device may receive the downlink control information after starting the random access process and before transmitting a random access preamble. The downlink control information may comprise a field, a value of the field indicating an identifier of the second bandwidth part. The wireless device may receive the downlink control information while the first bandwidth part is an active bandwidth part of the wireless device. In an example, the downlink control information may indicate a resource allocation for the second bandwidth part. The wireless device may determine that the downlink control information indicates switching bandwidth part in response to a bandwidth part identifier indicated by downlink control information being different from the bandwidth part identifier of the active bandwidth part.

The second bandwidth part may be configured with scheduling request resources for the logical channel. In an example, in response to the scheduling request resource being available on the second bandwidth part, the wireless device may cancel the random access process (e.g., the random access process started while the first bandwidth part was the active bandwidth part). In an example, in response to the scheduling request resource being available on the second bandwidth part, the wireless device may cancel the random access process and may transmit a scheduling request signal via the scheduling request resources configured for the logical channel on the second bandwidth part.

In an example embodiment, a wireless device may receive one or more messages comprising one or more radio resource control (RRC) messages. The one or more RRC messages may comprise configuration parameters for one or more cells. The one or more cells may comprise a first cell. The one or more messages may configure a plurality of bandwidth parts (BWPs) for one or more cells in the one or more cells. In an example, a wireless device may be configured with a DL BWP and an UL BWP to form a DL/UL BWP pair on a cell. A wireless device may be configured with a plurality of DL/UL BWPs in a cell. In an example, for paired spectrum, the DL and UL BWPs may be configured separately and independently for a serving cell. In an example, for unpaired spectrum, a DL BWP and an UL BWP may be jointly configured as a pair. The DL BWP and the UL BWP of a DL/UL BWP pair may share the same center frequency. In an example, the DL BWP and the UL BWP of a DL/UL BWP in a serving cell may be have different bandwidths. A bandwidth part may comprise a plurality of frequency resources, e.g., resource blocks (e.g., contiguous resource blocks) within a cell. Two or more DL (or UL) BWPs configured for a cell may overlap in frequency domain. In an example, for paired spectrum up to four DL BWPs and up to four UL BWPs may be configured for a cell. For unpaired spectrum, up to four DL/UL BWP pair may be configured for a cell. In an example, at a given time, one BWP may be active within a cell. In an example, two or more BWPs may be active in a cell at a given time.

The plurality of bandwidth parts of a cell may comprise a default bandwidth part and a first/initial active bandwidth part. The first/initial active bandwidth part of a SCell may indicate the BWP that is activated in response to the SCell activation (e.g., in response to receiving a MAC CE activating the SCell). The default BWP may indicate a BWP that the wireless device switches to, from an active BWP, in response to inactivity on the active BWP (e.g., in response to a BWP inactivity timer expiring). In an example, for a secondary cell, RRC signaling for SCell configuration/reconfiguration may indicate the first active DL BWP and/or the first active UL BWP when the SCell is activated. In an example, the SCell activation signaling may not contain information related to a first active DL/UL BWP. In an example, for an SCell, active DL BWP and/or UL BWP may be deactivated in response to the SCell being deactivated.

In an example, a base station may configure BWPs on a cell for a wireless device considering the wireless device capabilities. The wireless device may transmit a capability message (e.g., using RRC), comprising/indicating bandwidth capabilities of the wireless device, to the base station, and the base station may configure bandwidth parts for a cell considering the wireless device bandwidth capabilities. In an example, the one or more RRC messages may configure a first BWP and a second BWP for the first cell in the one or more configured cells. In an example, a BWP of a cell may correspond to a transmission time interval (TTI)/numerology. The TTI/numerology of a BWP may indicate what logical channels/data/service types may be transmitted via the BWP. The first BWP of the first cell may correspond to a first TTI/numerology and the second BWP of the first cell may correspond to a second TTI/numerology.

In an example, a wireless device may be configured (e.g., using RRC configuration) with a BWP inactivity timer. The wireless device may switch from an active BWP of a cell to a default BWP of the cell in response to the BWP inactivity timer expiring. The default BWP of a cell may be configured via RRC. The wireless device may (re)start the BWP inactivity timer in response to activity on the active BWP. The activity may be in form receiving an uplink scheduling and/or downlink assignment DCI on and/or for the active BWP. In an example, receiving other DCIs and or receiving/transmitting other signals and/or other activities may (re)start the BWP inactivity timer.

In an example, for paired spectrum, the wireless device may start the inactivity timer in response to switching from its active DL BWP to a DL BWP other than the default BWP. The wireless device may restart the timer to the initial value in response to successfully decoding a DCI to schedule PDSCH(s) in its active DL BWP. In an example, the initial BWP inactivity timer value may be RRC configured. In an example, one timer value may be used for BWP switching. In an example, a plurality of timer values may be configured, for example for different BWPs, for example based on TTI/numerology of the BWPs. The wireless device may switch its active DL BWP to the default DL BWP in response to the timer expiring. In an example, for unpaired spectrum, the wireless device may start the timer in response to switching from its active DL/UL BWP pair to a DL/UL BWP pair other than the default DL/UL BWP pair. The wireless device may restart the timer to the initial value in response to successfully decoding PDSCH(s) in its active DL/UL BWP pair. The wireless device may switch its active DL/UL BWP pair to the default DL/UL BWP pair in response to the timer expiring.

In an example embodiment, the time granularity of the BWP inactivity timer may be based on a default value, e.g., a default TTI/numerology and/or OFDM symbol duration and/or slot duration. In an example, the time granularity of the inactivity timer may be one millisecond. The BWP inactivity timer may expire when as much as K times the BWP timer granularity elapses. The value of K may be RRC configured.

In an example embodiment, the time granularity of the BWP inactivity timer may be based on the TTI/numerology of the current active BWP. In an example, the time granularity of BWP inactivity timer may be based on TTI/numerology and/or OFDM symbol duration and/or slot duration of the current active BWP. The BWP inactivity timer may expire when as much as K times the BWP timer granularity elapses. The value of K may be RRC configured.

In an example embodiment, the time granularity of the BWP inactivity timer may be based on the TTI/numerology of the default BWP. In an example, the time granularity of BWP inactivity timer may be based on TTI/numerology and/or OFDM symbol duration and/or slot duration of the default BWP. The BWP inactivity timer may expire when as much as K times the BWP timer granularity elapses. The value of K may be RRC configured.

In an example, a wireless device may be configured with a timer for timer-based active DL BWP (or DL/UL BWP pair) switching and a default BWP (or a default DL/UL BWP pair) which may be used when the timer is expired. The default BWP may be different from the first active DL BWP. In an example, for PCell, the default DL BWP (or DL/UL BWP pair) may be configured/reconfigured for a wireless device. If no default BWP is configured, the default BWP may be the initial active DL BWP.

In an example, in a serving cell that PUCCH is configured, each UL BWP may be configured with PUCCH resources.

In an example, for a wireless device common search space in PCell for at least RACH procedure may be configured in each BWP. In an example, for a wireless device common search space for group common PDCCH (e.g., SFI, pre-emption indication, etc.) may be configured in each BWP.

In an example, a DL (or UL) BWP may be configured for a wireless device by resource allocation Type 1 with a granularity of one PRB for starting frequency location and granularity of one PRB for bandwidth size.

In an example, resources with a TTI/numerology may be used for transmission of transport blocks comprising logical channels that are mappable to the TTI/numerology. In an example, the one or more RRC messages may comprise configuration parameters for one or more logical channels. In an example, the configuration parameters may indicate that one or more logical channels belong to a logical channel group. The configuration parameters may indicate whether a logical channel and/or a logical channel group may be mapped to and/or may use resources with a TTI/numerology. In an example, the configuration parameters may indicate what one or more TTI/numerology is a logical channel and/or logical channel group may be mapped to.

In an example embodiment, the wireless device may receive a first downlink control information (DCI). The first DCI may comprise scheduling information. The wireless device may receive the first DCI using a physical downlink control channel (PDCCH) or an enhanced PDCCH (EPDCCH). The first DCI may indicate a grant for the first cell on the first BWP of the first cell in the one or more configured cells for the wireless device. The first DCI may comprise transmission parameters comprising resource allocation parameters (e.g., resource blocks for transmission of a transport block (TB)), hybrid automatic repeat request (HARQ) related parameters (e.g., HARQ process number, NDI, etc.), power control parameters, transmission timing, TTI/numerology, etc. The wireless device (e.g., the multiplexing and assembly entity of the wireless device) may create a first transport block (TB) based on the transmission parameters indicated by first DCI. The TB may comprise one or more logical channels that are mapped to the first TTI/numerology. In an example, the TB may further comprise one or more medium access control (MAC) control elements (MAC CEs). The wireless device may store the TB in a HARQ buffer of the HARQ process associated with the TB. In an example, the wireless device may transmit the TB (e.g., a first redundancy version of the first TB) stored in the HARQ buffer, on the resources of the first BWP indicated in the first DCI. The wireless device may then switch from the first BWP to a second BWP. In an example, the wireless device may create the first TB and/or may store the first TB in its associated HARQ buffer. The wireless device may switch from the first BWP to a different BWP before transmitting the first TB (e.g., a redundancy version of the first TB).

In an example, the wireless device may switch from the first BWP of the first cell to a second BWP of the first cell. The first BWP may comprise a first DL BWP and a corresponding first uplink BWP. In an example, a DCI for DL (e.g., DL BWP) may be used for switching active DL BWP and a DCI for UL (e.g., UL BWP) may be used for switching UL active BWP. In an example, a single DCI may switch DL and UL BWP jointly (e.g., from the first DL/UL BWP pair to a second DL/UL BWP pair).

In an example embodiment, the switching from the first BWP/BWP pair to the second BWP/BWP pair may be in response to receiving a second DCI indicating the switching. The second DCI may comprise a field indicating an identifier of the second BWP/BWP pair. In an example, the field may comprise two bits indicating an identifier for the second BWP/BWP pair. The two-bit identifier may indicate one of four possible BWPs/BWP pairs. In an example, the switching may be in response to expiration of a timer. The timer may be a BWP inactivity timer and the second BWP may be a default BWP.

Figure 17:
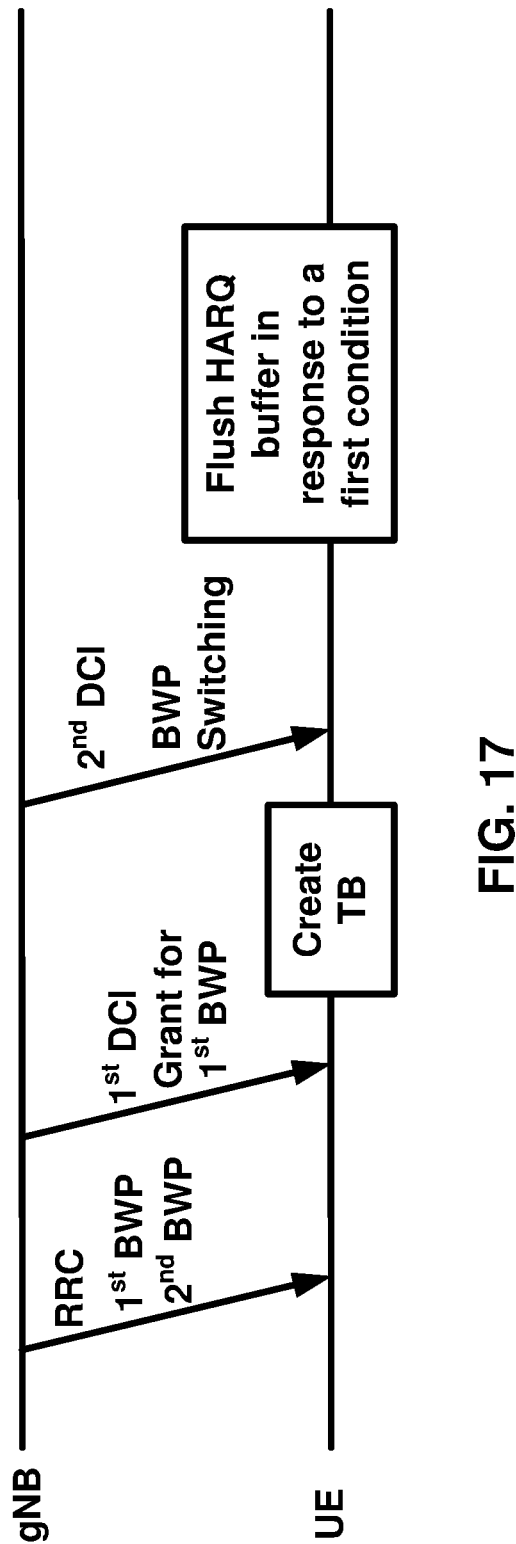
FIG. 17 is an example HARQ buffer management procedure as per an aspect of an embodiment of the present invention.

An example HARQ buffer management scenario is shown in FIG. 17. In an example embodiment, the wireless device may flush the HARQ buffer associated with the first TB in response to a first condition. An example, first condition may be that the first TB is not mappable to TTI/numerology of the second BWP (e.g., the second TTI/numerology). In an example, the TB may comprise one or more logical channels and/or MAC CEs that may not be mapped to/transmitted via the second TTI/numerology (e.g., the TTI/numerology of the second BWP). The base station may schedule the wireless device on the second BWP on the HARQ process of the first TB for transmission of a new TB in response to switching from the first BWP to the second BWP and the first TB not being mappable to the second TTI/numerology.

In an example embodiment, the one or more RRC messages may comprise configuration parameters for at least one timer comprising at least one timer value. In an example, at least one timer may be configured for a BWP of a cell. In an example, each BWP of a cell may be configured with at least one timer. In an example, the at least one timer may correspond to one timer value. In an example, each of the at least timer may correspond to a corresponding timer value. In an example, each of the at least one timer may correspond to a BWP and/or TTI/numerology (e.g., of the BWP) and/or a logical channel and/or a logical channel group and/or a service type (e.g., mapped to the BWP and/or TTI/numerology of the BWP), etc. In an example, the wireless device may be operating on the first BWP of the first cell. The wireless device may receive a first downlink control information (DCI). The first DCI may comprise scheduling information. The wireless device may receive the first DCI using a physical downlink control channel (PDCCH) or an enhanced PDCCH (EPDCCH). The first DCI may indicate a grant for the first cell on the first BWP of the first cell in the one or more configured cells for the wireless device. The first DCI may comprise transmission parameters comprising resource allocation parameters (e.g., resource blocks for transmission of a transport block (TB)), hybrid automatic repeat request (HARQ) related parameters (e.g., HARQ process number, NDI, etc.), power control parameters, transmission timing, TTI/numerology, etc. The wireless device (e.g., the multiplexing and assembly entity of the wireless device) may create a first transport block (TB) based on the transmission parameters indicated by first DCI. The TB may comprise one or more logical channels that are mapped to the first TTI/numerology. In an example, the TB may further comprise one or more medium access control (MAC) control elements (MAC CEs). The wireless device may store the TB in a HARQ buffer of the HARQ process associated with the TB. In an example, the wireless device may transmit the TB (e.g., a first redundancy version of the first TB) stored in the HARQ buffer, on the resources of the first BWP indicated in the first DCI. The wireless device may then switch from the first BWP to a different BWP. In an example, the wireless device may create the first TB and/or may store the first TB in its associated HARQ buffer. The wireless device may switch from the first BWP to a different BWP before transmitting the first TB (e.g., a redundancy version of the first TB).

Figure 18:
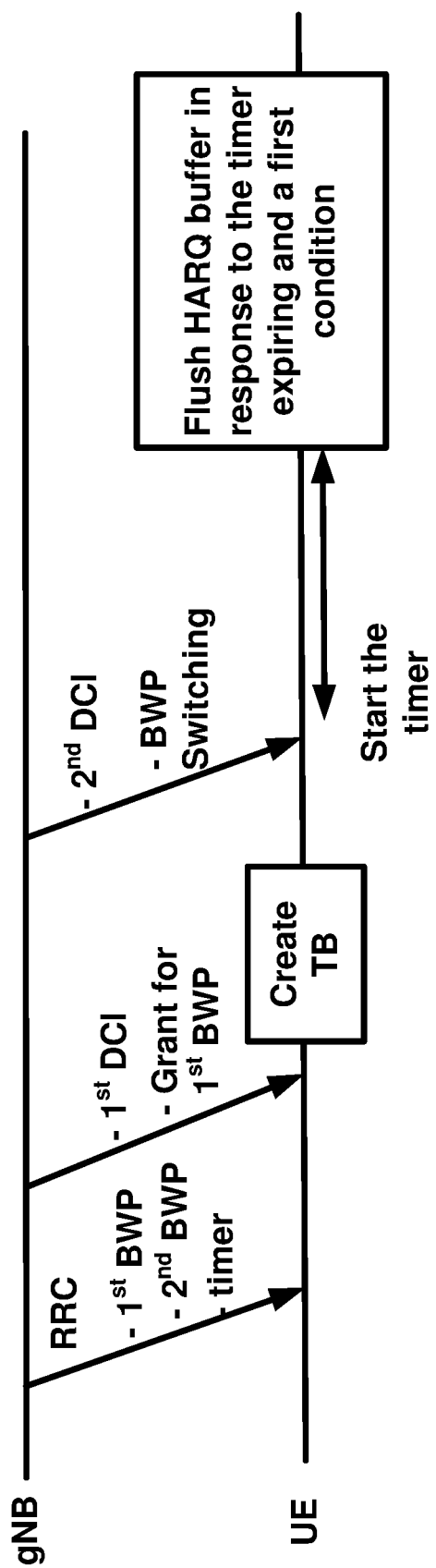
FIG. 18 is an example HARQ buffer management procedure as per an aspect of an embodiment of the present invention.

The wireless device may receive one or more second DCIs indicating switching from the first BWP to one or more second BWPs. The one or more second BWPs may correspond to one or more second TTI/numerology. In an example, in response to receiving the earliest DCI in the one or more second DCIs, the wireless device may start a timer for the first HARQ process corresponding the first TB. An example procedure is shown in FIG. 18. The wireless device may flush the HARQ buffer associated with the first TB/first HARQ process in response to the timer expiring and a first condition. In an example, the first condition may be that the first TB is not mappable to a TTI/numerology of an active BWP while the timer is running. In an example, the TB may comprise one or more logical channels and/or MAC CEs that may not be mapped to/transmitted via the TTI/numerology of an active BWP while the timer is running. In an example, the wireless device may start a timer associated with a HARQ process in response to switching active BWP. The wireless may flush the HARQ buffer associated with the HARQ process in response to the timer associated with the HARQ buffer expiring and the TB stored in the HARQ buffer not being mappable to TTI/numerology of an active BWP while the timer is running. The base station may schedule the wireless device on the active BWP on the HARQ process of the first TB for transmission of a new TB in response to the timer expiring and the HARQ buffer being flushed.

A wireless device may receive a command from a base station indicating switching from a first bandwidth part to a second bandwidth part. The legacy procedures for management of HARQ processes may lead to inefficient utilization of HARQ processes as a transport block created while a first bandwidth is an active bandwidth part may not be transmitted after switching from the first bandwidth to the second bandwidth. The corresponding HARQ process may remain unused. Example embodiments enhance the HARQ management process due to bandwidth part switching.

Figure 19:
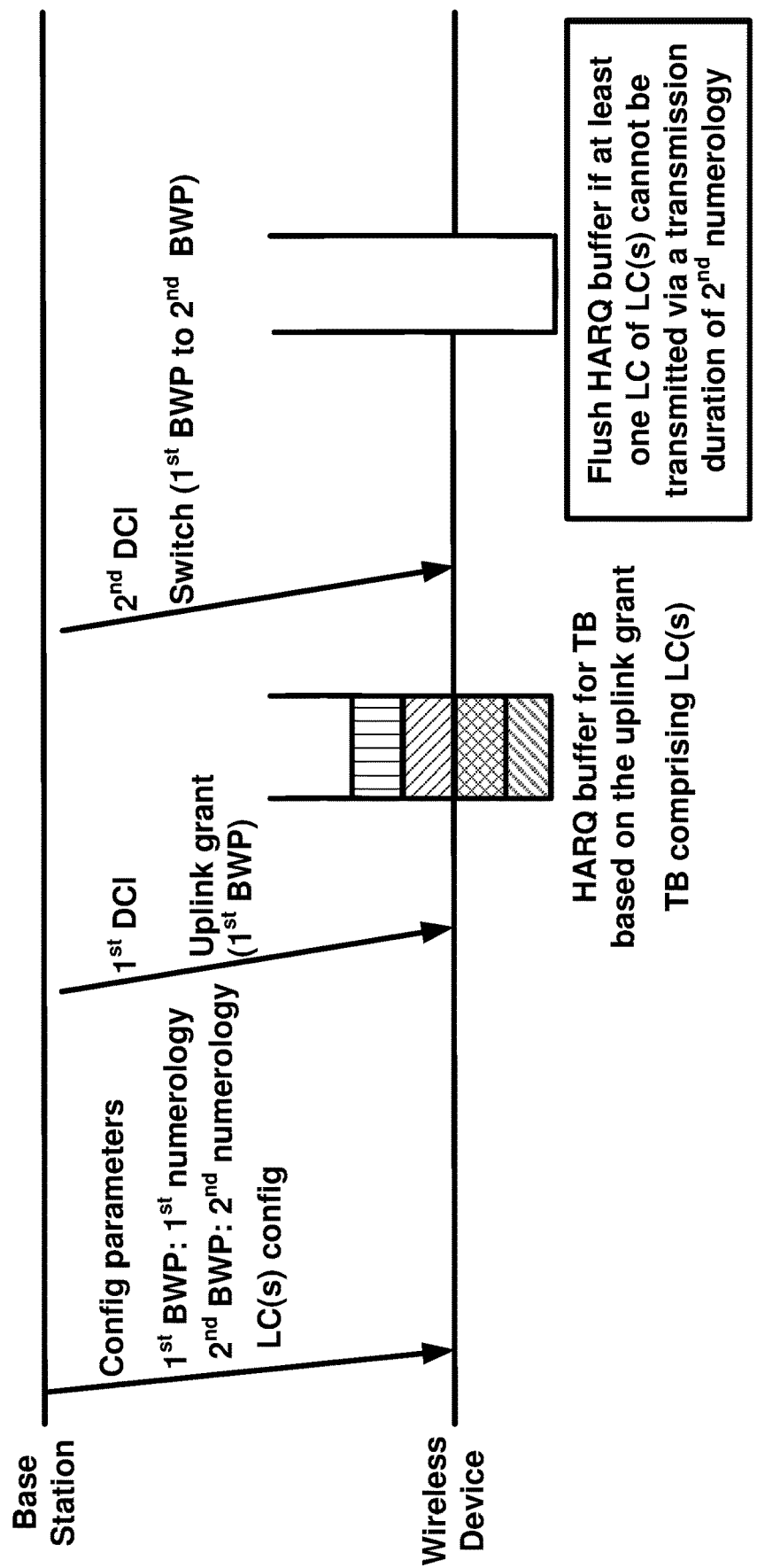
FIG. 19 is an example HARQ buffer management procedure as per an aspect of an embodiment of the present invention.

In an example embodiment as shown in FIG. 19, the wireless device may receive one or more messages comprising configuration parameters. In an example, the one or more messages may comprise one or more radio resource control (RRC) messages.

In an example, the one or more messages may comprise first configuration parameters of a first bandwidth part. The first configuration parameters of the first bandwidth part may indicate frequency domain and location of the first bandwidth part, e.g., the PRBs corresponding to the first bandwidth part. The first configuration parameters of the first bandwidth part may indicate a first numerology of the first bandwidth part. The first numerology of the first bandwidth part may indicate a subcarrier spacing and a cyclic prefix corresponding to the first numerology and/or other parameters.

In an example, the one or more messages may comprise second configuration parameters of a second bandwidth part. The second configuration parameters of the second bandwidth part may indicate frequency domain and location of the second bandwidth part, e.g., the PRBs corresponding to the second bandwidth part. The second configuration parameters of the second bandwidth part may indicate a second numerology of the second bandwidth part. The second numerology of the second bandwidth part may indicate a subcarrier spacing and a cyclic prefix corresponding to the second numerology and/or other parameters. In an example, the second numerology may be different from the first numerology.

In an example, the one or more messages may comprise configuration parameters of one or more logical channels. The configuration parameters of a logical channel in the one or more logical channels may indicate one or more transmission durations of transmission (e.g., uplink channel e.g., PUSCH) that the logical channel may be transmitted. In an example, the configuration parameters of a logical channel in the one or more logical channels may indicate a maximum transmission duration of transmission (e.g., uplink channel e.g., PUSCH) that the logical channel may be transmitted. In an example, a transmission duration may be a physical uplink shared channel (PUSCH) duration. The transmission duration of a transmission (e.g., PUSCH transmission) may be based on a DCI scheduling the transmission and based on a numerology of the transmission. In an example, the numerology of the transmission may indicate a symbol duration and the transmission duration may be based on the symbol duration. In an example, a transmission duration may correspond to the numerology of the transmission.

In an example, the one or more messages may comprise configuration parameters of one or more logical channels. The configuration parameters of a logical channel in the one or more logical channels may indicate one or more allowed subcarrier spacing and/or one or more other allowed parameters, wherein the one or more parameters may be based on the numerology of the transmission.

In an example, the first bandwidth part and the second bandwidth part may be for a cell of the wireless device. In an example, the first bandwidth part may be for a first cell and the second bandwidth part may be for a second cell.

The wireless device may receive a first downlink control information indicating an uplink grant for transmission of a transport block via the first bandwidth part, wherein the first bandwidth part corresponds to the first numerology. The first downlink control information may comprise transmission parameters for transmission of the transport block. In an example, the transmission parameters may comprise a first hybrid automatic repeat request (HARQ) process number. In an example, the wireless device may store one or more redundancy versions of the transport block in a HARQ buffer associated with the transport block (e.g., the HARQ buffer for the first HARQ process).

The transport block may comprise data of the one or more logical channels. The wireless device may multiplex data of the one or more logical channels in the transport block based on a logical channel prioritization procedure. In an example, the wireless device may multiplex data of the one or more logical channels and one or more MAC control elements in the transport block based on a logical channel prioritization procedure. The configuration parameters of the one or more logical channels may indicate that the one or more logical channels can be transmitted via the transmission duration corresponding to the transport block. In an example, the maximum transmission duration configured for the one or more logical channels may be smaller than the transmission duration of the transport block. In an example, the transmission duration of the transport block may be based on the downlink control information and the first numerology. In an example, the transmission duration of the transport block may correspond to the first numerology.

The wireless device may receive a second downlink control information indicating switching from the first bandwidth part to the second bandwidth part. The second downlink control information may comprise a field, a value of the field indicating an identifier of the second bandwidth part. The wireless device may receive the second downlink control information while the first bandwidth part is the active bandwidth part. In an example, the second downlink control information may indicate resource allocation via the second bandwidth part.

In an example, the wireless device may flush a buffer (e.g., HARQ buffer) associated with the transport block in response to the receiving the downlink control information and at least one of the one or more logical channels cannot be transmitted via a transmission duration corresponding to the second numerology. In an example, the buffer associated with the transport block may be for the first HARQ process corresponding to the transport block.

In an example, the wireless device may receive a third downlink control information indicating transmission of a second transport block. In an example, in response to the flushing the buffer associated with the transport block, the wireless device may receive a third downlink control information indicating transmission of a second transport block. The second transport block may be associated with the first HARQ process and the first transport block may be associated with the first HARQ process.

According to various embodiments, a device such as, for example, a wireless device, off-network wireless device, a base station, a core network device, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 20:
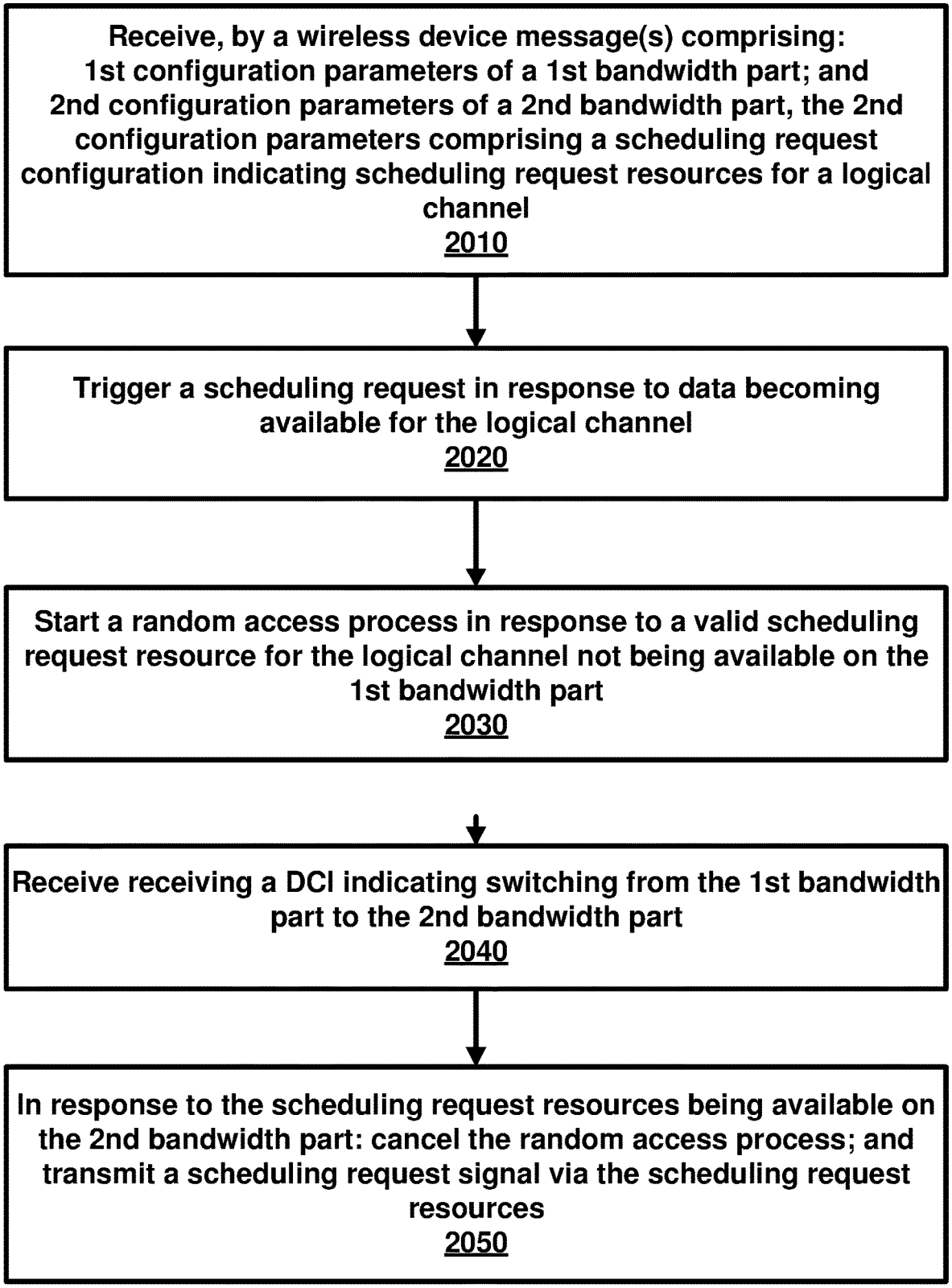
FIG. 20 is a flow diagram of an aspect of an embodiment of the present disclosure.

FIG. 20 is a flow diagram of an aspect of an embodiment of the present disclosure. At 2010, a wireless device may receive at least one message. The at least one message may comprise: first configuration parameters of a first bandwidth part, and second configuration parameters of a second bandwidth part. The second configuration parameters may comprise a scheduling request configuration indicating scheduling request resources for a logical channel. At 2020, a scheduling request may be triggered in response to data becoming available for the logical channel. At 2030, a random access process may be started in response to a valid scheduling request resource for the logical channel not being available on the first bandwidth part. At 2040, a downlink control information may be received. The downlink control information may indicate switching from the first bandwidth part to the second bandwidth part. At 2050, in response to the scheduling request resources being available on the second bandwidth part: the random access process may be cancelled, and a scheduling request signal may be transmitted via the scheduling request resources.

According to an example embodiment, the first bandwidth part and the second bandwidth part may be for a primary cell. According to an example embodiment, the downlink control information may comprise a field indicating an identifier of the second bandwidth part. According to an example embodiment, the first bandwidth part may be an active bandwidth part when the wireless device receives the downlink control information. According to an example embodiment, the at least one message may indicate that the scheduling request configuration is applicable for the logical channel. According to an example embodiment, the at least one message may comprise random access configuration parameters indicating random access resources for the random access process. According to an example embodiment, the wireless device may transmit a random access preamble before the switching from the first bandwidth part to the second bandwidth part.

According to an example embodiment, the first bandwidth part and the second bandwidth part may be for a secondary cell configured with uplink control channel resources. According to an example embodiment, the downlink control information may comprise a field indicating an identifier of the second bandwidth part. According to an example embodiment, the first bandwidth part may be an active bandwidth part when the wireless device receives the downlink control information. According to an example embodiment, the at least one message may indicate that the scheduling request configuration is applicable for the logical channel. According to an example embodiment, the at least one message may comprise random access configuration parameters indicating random access resources for the random access process. According to an example embodiment, the wireless device may transmit a random access preamble before the switching from the first bandwidth part to the second bandwidth part.

According to an example embodiment, the at least one message may indicate that the scheduling request configuration is applicable for the logical channel. According to an example embodiment, the at least one message may comprise random access configuration parameters indicating random access resources for the random access process. According to an example embodiment, the first bandwidth part may be an active bandwidth part when the wireless device receives the downlink control information. According to an example embodiment, the downlink control information may comprise a field indicating an identifier of the second bandwidth part. According to an example embodiment, the wireless device may transmit a random access preamble before the switching from the first bandwidth part to the second bandwidth part. According to an example embodiment, the scheduling request configuration may indicate a periodicity and offset parameter indicating the scheduling request resources for the logical channel. According to an example embodiment, the random access process may be a contention-based random access process.

Figure 21:
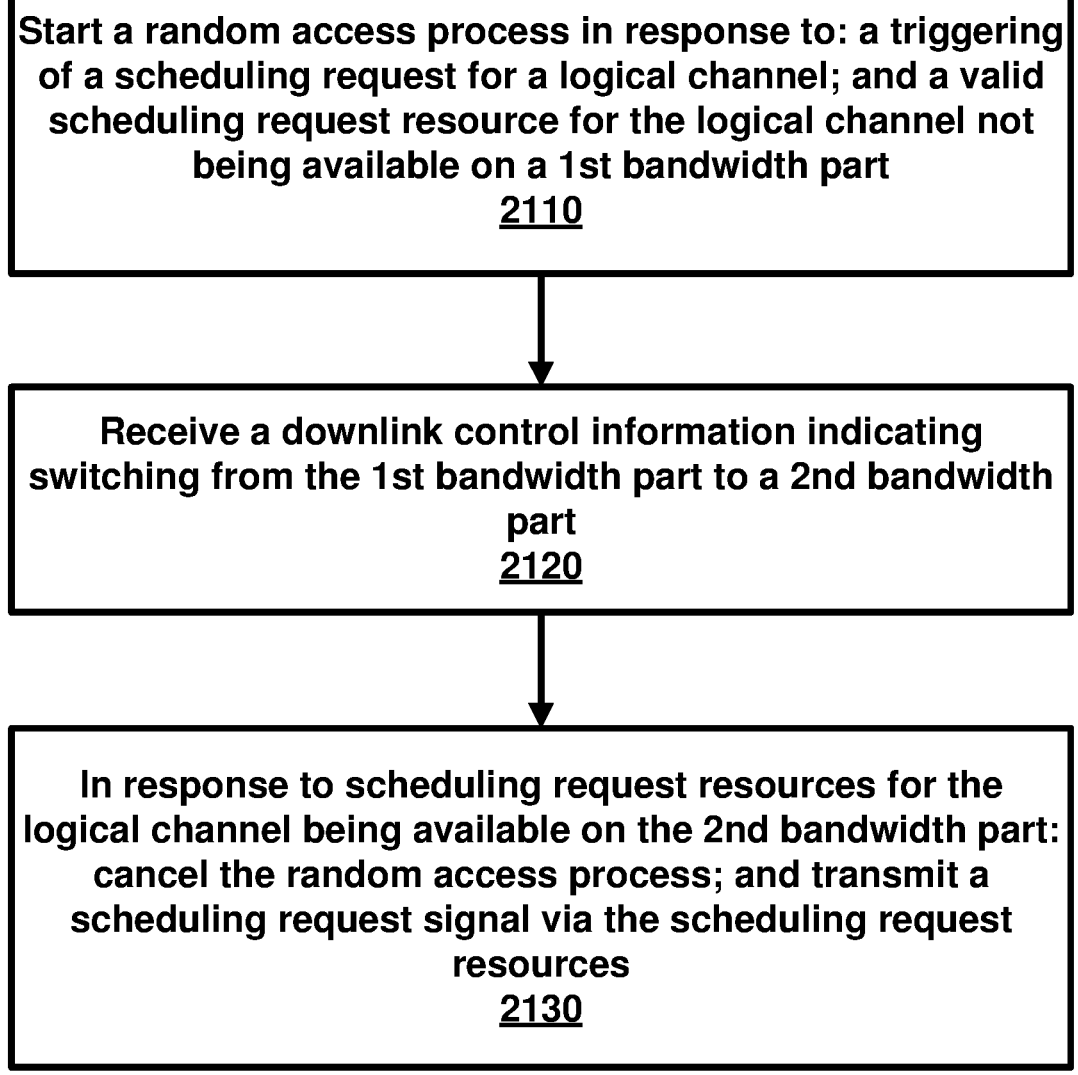
FIG. 21 is a flow diagram of an aspect of an embodiment of the present disclosure.

FIG. 21 is a flow diagram of an aspect of an embodiment of the present disclosure. At 2110, a random access process may be started in response to: a triggering of a scheduling request for a logical channel; and a valid scheduling request resource for the logical channel not being available on a first bandwidth part. At 2120, a downlink control information may be received. The downlink control information may indicate switching from the first bandwidth part to a second bandwidth part. At 2130, in response to scheduling request resources for the logical channel being available on the second bandwidth part: the random access process may be canceled, and a scheduling request signal may be transmitted via the scheduling request resources.

FIG. 22 is a flow diagram of an aspect of an embodiment of the present disclosure. At 2210, a wireless device may receive configuration parameters of: a first bandwidth part corresponding to a first numerology; a second bandwidth part corresponding to a second numerology; and one or more logical channels. At 2220, a first downlink control information may be received. The first downlink control information may indicate an uplink grant for transmission of a transport block via the first bandwidth part. The transport block may comprise data from the one or more logical channels. At 2230, a second downlink control information may be received. The second downlink control information may indicate switching from the first bandwidth part to the second bandwidth part. At 2240, a buffer associated with the transport block may be flushed in response to: receiving the second downlink control information; and at least one of the one or more logical channels cannot be transmitted via a transmission duration corresponding to the second numerology.

According to an example embodiment, the second downlink control information may comprise a field. A value of the field may indicate an identifier of the second bandwidth part. According to an example embodiment, the transport block may be created by multiplexing data of the one or more logical channels in the transport block based on a first transmission duration corresponding to the first numerology. According to an example embodiment, the first downlink control information may comprise transmission parameters of the transport block. According to an example embodiment, the transmission parameters may comprise a first hybrid automatic repeat request process number. According to an example embodiment, the buffer associated with the transport block may be for the first hybrid automatic repeat request process number. According to an example embodiment, the configuration parameters of the one or more logical channels may indicate that the one or more logical channels can be transmitted in a first transmission duration corresponding to the first numerology. According to an example embodiment, the configuration parameters of the one or more logical channels may indicate that the at least one of the one or more logical channels cannot be transmitted via the transmission duration corresponding to the second numerology. According to an example embodiment, the second numerology may be different from the first numerology. According to an example embodiment, the first bandwidth part and the second bandwidth part may be for a cell of the wireless device. According to an example embodiment, one or more redundancy versions of the transport block may be stored in the buffer associated with the transport block. According to an example embodiment, a third downlink control information may be received in response to the flushing. The third downlink control information may indicate transmission of a second transport block via the second bandwidth part. The second transport block may be associated with a first hybrid automatic repeat request number. The transport block may be associated with the first hybrid automatic repeat request number.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a wireless device, at least one message comprising:
     first configuration parameters of a first bandwidth part; and
     second configuration parameters of a second bandwidth part, the second configuration parameters comprising a scheduling request configuration indicating scheduling request resources for a logical channel;
   triggering a scheduling request in response to data becoming available for the logical channel;
   starting a random access process, by transmitting a random access preamble, in response to a valid scheduling request resource for the logical channel not being available on the first bandwidth part;
   receiving a downlink control information indicating switching from the first bandwidth part to the second bandwidth part; and
   in response to the scheduling request resources being available on the second bandwidth part:
     canceling the random access process; and
     transmitting a scheduling request signal via the scheduling request resources.

2. The method of claim 1, wherein the first bandwidth part and the second bandwidth part are for a primary cell.

3. The method of claim 2, wherein the downlink control information comprises a field indicating an identifier of the second bandwidth part.

4. The method of claim 2, wherein the first bandwidth part is an active bandwidth part when the wireless device receives the downlink control information.

5. The method of claim 2, wherein the at least one message indicates that the scheduling request configuration is applicable for the logical channel.

6. The method of claim 5, wherein the at least one message comprises random access configuration parameters indicating random access resources for the random access process.

7. The method of claim 5, further comprising, transmitting, by the wireless device, the random access preamble before the switching from the first bandwidth part to the second bandwidth part.

8. The method of claim 1, wherein the first bandwidth part and the second bandwidth part are for a secondary cell configured with uplink control channel resources.

9. The method of claim 8, wherein the downlink control information comprises a field indicating an identifier of the second bandwidth part.

10. The method of claim 8, wherein the first bandwidth part is an active bandwidth part when the wireless device receives the downlink control information.

11. The method of claim 8, wherein the at least one message indicates that the scheduling request configuration is applicable for the logical channel.

12. The method of claim 11, wherein the at least one message comprises random access configuration parameters indicating random access resources for the random access process.

13. The method of claim 11, further comprising, transmitting, by the wireless device, the random access preamble before the switching from the first bandwidth part to the second bandwidth part.

14. The method of claim 1, wherein the at least one message indicates that the scheduling request configuration is applicable for the logical channel.

15. The method of claim 1, wherein the at least one message comprises random access configuration parameters indicating random access resources for the random access process.

16. The method of claim 1, wherein the first bandwidth part is an active bandwidth part when the wireless device receives the downlink control information.

17. The method of claim 1, wherein the downlink control information comprises a field indicating an identifier of the second bandwidth part.

18. The method of claim 1, further comprising, transmitting, by the wireless device, the random access preamble before the switching from the first bandwidth part to the second bandwidth part.

19. The method of claim 1, wherein the scheduling request configuration indicates a periodicity and offset parameter indicating the scheduling request resources for the logical channel.

20. The method of claim 1, wherein the random access process is a contention-based random access process.

* * * * *